US008369883B2

(12) United States Patent
Kuroda et al.

(10) Patent No.: US 8,369,883 B2
(45) Date of Patent: Feb. 5, 2013

(54) TRANSMISSION POWER CONTROL TECHNIQUE AND WIRELESS COMMUNICATIONS SYSTEM USING THE SAME

(75) Inventors: Nahoko Kuroda, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 765 days.

(21) Appl. No.: 11/655,087

(22) Filed: Jan. 19, 2007

(65) Prior Publication Data

US 2007/0173279 A1 Jul. 26, 2007

(30) Foreign Application Priority Data

Jan. 20, 2006 (JP) .................................. 2006-013248

(51) Int. Cl.
*H04B 7/00* (2006.01)

(52) U.S. Cl. ........ 455/522; 370/311; 370/321; 370/337; 370/338

(58) Field of Classification Search .................... 455/522
See application file for complete search history.

(56) References Cited

U.S. PATENT DOCUMENTS

| | | | | |
|---|---|---|---|---|
| 5,751,725 A * | 5/1998 | Chen | ............................ | 714/708 |
| 6,029,268 A * | 2/2000 | Kong et al. | .................... | 714/795 |
| 6,198,910 B1 * | 3/2001 | Hanley | ....................... | 455/67.11 |
| 6,208,699 B1 * | 3/2001 | Chen et al. | .................... | 375/340 |
| 6,334,047 B1 * | 12/2001 | Andersson et al. | ............. | 455/69 |
| 6,560,744 B1 * | 5/2003 | Burshtein | ..................... | 714/774 |
| 6,564,067 B1 * | 5/2003 | Agin | ............................. | 455/522 |
| 6,603,773 B2 * | 8/2003 | Laakso et al. | ................. | 370/441 |
| 6,633,552 B1 * | 10/2003 | Ling et al. | ..................... | 370/318 |
| 6,650,691 B2 * | 11/2003 | Cramer, III | .................... | 375/146 |
| 6,704,286 B2 * | 3/2004 | Zeira et al. | ..................... | 370/241 |
| 6,823,193 B1 * | 11/2004 | Persson et al. | ................ | 455/522 |
| 6,845,237 B2 * | 1/2005 | Moulsley | ................... | 455/422.1 |
| 6,856,812 B1 * | 2/2005 | Budka et al. | ................. | 455/522 |
| 6,865,168 B1 * | 3/2005 | Sekine | ......................... | 370/335 |
| 6,879,813 B2 * | 4/2005 | Reznik | ....................... | 455/67.11 |

(Continued)

FOREIGN PATENT DOCUMENTS

JP 2002-528997 A 9/2002
JP 2003-18090 A 1/2003

(Continued)

OTHER PUBLICATIONS

3rd Generation Partnership Project; Technical Specification Group Radio Access Network; Physical layer procedures (FDD) (Release 6) 3GPP TS 25.214 V6.6.0 (Jun. 2005), pp. 1-10.

(Continued)

*Primary Examiner* — Hai Nguyen
(74) *Attorney, Agent, or Firm* — Foley & Lardner LLP

(57) ABSTRACT

A transmission power control method that reduces the possibility of going out of synchronization is presented. In a reduced power mode, a target SIR is set equal to or higher than SIR_reduced where deemed appropriate, whereby frequent issues of Out-of-sync and the probability of generation of RL_Failure are suppressed. To raise a reception SIR to a value equal to or higher than SIR_reduced, the target SIR may be periodically set at SIR_temp that is a value equal to or higher than SIR_reduced. Alternatively, when brought in the reduced power mode, a mobile station itself may periodically set its transmission power such that a value equal to or higher than SIR_reduced can be achieved.

14 Claims, 29 Drawing Sheets

U.S. PATENT DOCUMENTS

| | | | |
|---|---|---|---|
| 6,885,652 B1 * | 4/2005 | Ozukturk et al. | 370/342 |
| 6,937,874 B2 * | 8/2005 | Cramer, III | 455/522 |
| 6,944,468 B2 * | 9/2005 | Okumura | 455/522 |
| 6,950,671 B2 * | 9/2005 | Hamabe | 455/522 |
| 6,967,987 B2 * | 11/2005 | Higuchi et al. | 375/130 |
| 6,978,150 B2 * | 12/2005 | Hamabe | 455/522 |
| 6,985,457 B2 * | 1/2006 | Zeira et al. | 370/318 |
| 7,020,127 B2 * | 3/2006 | Iacono et al. | 370/342 |
| 7,027,829 B1 * | 4/2006 | Laakso et al. | 455/522 |
| 7,072,380 B2 * | 7/2006 | Ozluturk et al. | 375/141 |
| 7,072,681 B2 * | 7/2006 | Hamabe | 455/522 |
| 7,110,786 B2 * | 9/2006 | Moulsley et al. | 455/522 |
| 7,123,600 B2 * | 10/2006 | Ozluturk et al. | 370/335 |
| RE39,381 E * | 11/2006 | Hakkinen et al. | 455/525 |
| 7,133,366 B2 * | 11/2006 | Zeira et al. | 370/241 |
| 7,159,164 B1 * | 1/2007 | Saifuddin et al. | 714/755 |
| 7,181,170 B2 * | 2/2007 | Love et al. | 455/67.13 |
| 7,197,327 B2 * | 3/2007 | Koo et al. | 455/522 |
| 7,197,692 B2 * | 3/2007 | Sutivong et al. | 714/796 |
| 7,206,291 B2 * | 4/2007 | Soldani et al. | 370/252 |
| 7,218,946 B2 * | 5/2007 | Chang et al. | 455/522 |
| 7,260,001 B2 * | 8/2007 | Bull | 365/189.07 |
| 7,278,080 B2 * | 10/2007 | Flautner et al. | 714/746 |
| 7,310,755 B2 * | 12/2007 | Mudge et al. | 714/724 |
| 7,320,091 B2 * | 1/2008 | Blaauw et al. | 714/30 |
| 7,337,356 B2 * | 2/2008 | Mudge et al. | 714/10 |
| 7,408,893 B2 * | 8/2008 | Kwak et al. | 370/318 |
| 7,411,895 B2 * | 8/2008 | Laroia et al. | 370/203 |
| 7,412,252 B2 * | 8/2008 | Anderson | 455/522 |
| 7,423,976 B2 * | 9/2008 | Wang et al. | 370/252 |
| 7,433,460 B2 * | 10/2008 | Budka et al. | 379/332 |
| 7,437,160 B2 * | 10/2008 | Hamalainen et al. | 455/436 |
| 7,457,632 B2 * | 11/2008 | Takagi et al. | 455/507 |
| 7,460,879 B2 * | 12/2008 | Furuya | 455/522 |
| 7,536,154 B2 * | 5/2009 | Rudolf et al. | 455/69 |
| 7,603,135 B2 * | 10/2009 | Takaki | 455/522 |
| 7,609,667 B2 * | 10/2009 | Kwak et al. | 370/318 |
| 7,626,970 B2 * | 12/2009 | Agin | 370/342 |
| 7,634,290 B2 * | 12/2009 | Kelton et al. | 455/522 |
| 7,653,856 B2 * | 1/2010 | Ahn et al. | 714/748 |
| 7,660,362 B2 * | 2/2010 | Kim | 375/267 |
| 7,664,523 B2 * | 2/2010 | Kaneko et al. | 455/522 |
| 7,706,824 B2 * | 4/2010 | Schulist et al. | 455/517 |
| 7,738,902 B2 * | 6/2010 | Murata et al. | 455/522 |
| 7,738,910 B2 * | 6/2010 | Kobayashi | 455/525 |
| 7,769,391 B2 * | 8/2010 | Andersson et al. | 455/453 |
| 7,778,656 B2 * | 8/2010 | Murata et al. | 455/522 |
| 7,979,782 B2 * | 7/2011 | Eder et al. | 714/795 |
| 8,010,053 B2 * | 8/2011 | Rudolf et al. | 455/69 |
| 8,036,719 B2 * | 10/2011 | Ying | 455/574 |
| 8,073,077 B2 * | 12/2011 | Nibe | 375/316 |
| 8,204,450 B2 * | 6/2012 | Rudolf et al. | 455/69 |
| 2002/0027897 A1 * | 3/2002 | Moulsley et al. | 370/342 |
| 2002/0028691 A1 * | 3/2002 | Moulsley et al. | 455/522 |
| 2002/0042283 A1 * | 4/2002 | Moulsley | 455/517 |
| 2002/0115467 A1 * | 8/2002 | Hamabe | 455/522 |
| 2003/0014728 A1 * | 1/2003 | Shaeffer et al. | 716/15 |
| 2003/0099209 A1 * | 5/2003 | Laakso et al. | 370/311 |
| 2003/0119452 A1 * | 6/2003 | Kim et al. | 455/69 |
| 2003/0134655 A1 * | 7/2003 | Chen et al. | 455/522 |
| 2003/0152135 A1 * | 8/2003 | Cramer, III | 375/140 |
| 2003/0223389 A1 * | 12/2003 | Zeira et al. | 370/332 |
| 2004/0095918 A1 * | 5/2004 | Dominique et al. | 370/342 |
| 2004/0166869 A1 * | 8/2004 | Laroia et al. | 455/450 |
| 2004/0185790 A1 * | 9/2004 | Zeira et al. | 455/67.11 |
| 2004/0218567 A1 * | 11/2004 | Budka et al. | 370/332 |
| 2004/0224692 A1 * | 11/2004 | Hamabe | 455/442 |
| 2004/0248608 A1 * | 12/2004 | Kobayashi | 455/522 |
| 2004/0259584 A1 * | 12/2004 | Murata et al. | 455/522 |
| 2005/0099968 A1 * | 5/2005 | Yamano | 370/311 |
| 2005/0123059 A1 * | 6/2005 | Harris et al. | 375/244 |
| 2005/0276248 A1 * | 12/2005 | Butala et al. | 370/332 |
| 2005/0277415 A1 * | 12/2005 | Hamalainen et al. | 455/436 |
| 2006/0003789 A1 * | 1/2006 | Murata et al. | 455/522 |
| 2006/0087994 A1 * | 4/2006 | Barth et al. | 370/310 |
| 2006/0126577 A1 * | 6/2006 | Yano et al. | 370/337 |
| 2007/0054621 A1 * | 3/2007 | Larsson | 455/67.11 |
| 2007/0155401 A1 * | 7/2007 | Ward et al. | 455/456.1 |
| 2007/0173280 A1 * | 7/2007 | Nakayauchi et al. | 455/522 |
| 2008/0014978 A1 * | 1/2008 | Kaneko et al. | 455/522 |
| 2008/0107215 A1 * | 5/2008 | Nibe | 375/346 |
| 2008/0214230 A1 * | 9/2008 | Shinozaki | 455/522 |
| 2009/0264146 A1 * | 10/2009 | Koo et al. | 455/522 |
| 2009/0296662 A1 * | 12/2009 | Laroia et al. | 370/335 |
| 2010/0002654 A1 * | 1/2010 | Lindoff et al. | 370/332 |
| 2011/0075645 A1 * | 3/2011 | Yano et al. | 370/338 |
| 2011/0299447 A1 * | 12/2011 | Rudolf et al. | 370/311 |

FOREIGN PATENT DOCUMENTS

| | | |
|---|---|---|
| JP | 2005-5762 A | 1/2005 |
| JP | 2005-518113 A | 6/2005 |
| WO | WO 00/25443 A1 | 5/2000 |
| WO | WO 03/058829 A2 | 7/2003 |

OTHER PUBLICATIONS

3rd Generation Partnership Project; Technical Specification Group Radio Access Network; Continuous Connectivity for Packet Data Users; (Release 7) 3GPP TR 25.903 V0.2.0 (Nov. 2005), pp. 1-7.

* cited by examiner

CONTROL FLOW OF BASE STATION

FIG.13 CONTROL FLOW OF BASE STATION (SECOND EMBODIMENT)

BASE STATION (SEVENTH EMBODIMENT)

FIG.24 CONTROL FLOW OF BASE STATION (SEVENTH EMBODIMENT)

ADDED POWER MODE DETERMINATION FLOW OF MOBILE STATION

TRANSMISSION POWER CONTROL TECHNIQUE AND WIRELESS COMMUNICATIONS SYSTEM USING THE SAME

BACKGROUND OF THE INVENTION

1. Field of the Invention

The present invention relates to a wireless (or radio) communications system and, more particularly, to a transmission power control method and device in the wireless communications system.

2. Description of the Related Art

In a W-CDMA (Wide band-Code Division Multiple Access) system, which is a typical wireless communications system, HSDPA (High Speed Downlink Packet Access), which is a high-speed packet transmission system for downlink, and EUDCH (Enhanced Uplink Dedicated Channel), which is a high-speed packet transmission system for uplink, have been standardized. According to these packet transmission systems, a base station (Node B) carries out scheduling and, only when data transmission/reception is performed, allocates wireless resources to a plurality of mobile stations (VEs) according to time multiplexing or code multiplexing, resulting in the enhanced efficiency of use of the wireless resources. This W-CDMA system will be described briefly with reference to the accompanying drawings.

FIG. 1 schematically shows a mobile communications network as an example of the W-CDMA system. Here, a plurality of base stations 11 and 12 are connected to a base station controller 10, and the base station controller 10 can be further connected to an external network (not shown). Each of the plurality of base stations can accommodate a plurality of mobile stations. Here, it is assumed that mobile stations 21 and 22 are connecting to the base station 11, a mobile station 24 is connecting to the base station 12, and a mobile station 23 is in soft handover (hereinafter, referred to as SHO where deemed appropriate) and therefore is connecting to both the base stations 11 and 12.

Each of the mobile stations 21 to 24 always uses a dedicated channel (DPCCH: Dedicated Physical Control Channel) for transmission/reception to/from its corresponding base station. Further, the mobile stations 22 and 24 are performing data reception using HSDPA, and the mobile stations 23 and 24 are performing data transmission using EUDCH. The mobile stations 22 and 24, which are performing data reception using HSDPA, use HS-SCCH (High Speed-Shared Control Channel) and HS-PDSCH (High Speed-Physical Downlink Shared Channel) for reception and HS-DPCCH (High Speed-Dedicated Physical Control Channel) for transmission. The mobile stations 23 and 24, which are performing data transmission by using EUDCH, use E-HICH (Enhanced-Hybrid ARQ Indicator Channel), E-AGCH (Enhanced-Absolute Grant Channel), and E-RGCH (Enhanced-Relative Grant Channel) for reception and E-DPCCH (Enhanced-Dedicated Physical Control Channel) and E-DPDCH (Enhanced-Dedicated Physical Data Channel) for transmission. In other words, a mobile station that is executing HSDPA or EUDCH, always uses a channel called a dedicated channel for transmission and reception, apart from channels for data transmission and reception. The dedicated channel is used to transmit a pilot signal, which is used for channel estimation in order for mobile and base stations to secure synchronization and carry out demodulation, and a TPC (Transmission Power Control) signal, which is a control signal for closed-loop power control (inner loop power control).

Closed-loop power control is performed on the transmission power for a dedicated channel so that the quality of the dedicated channel becomes closer to target quality (here, target SIR (Signal to Interference Ratio)). For example, in the transmission power control of an uplink dedicated channel, a base station compares the SIR of the dedicated channel actually received from a mobile station in question with a target SIR set by the base station controller 10. If the reception SIR actually received is smaller than the target SIR, the base station transmits a TPC signal instructing that the transmission power be increased, through a downlink dedicated channel. Otherwise, the base station transmits a TPC signal instructing that the transmission power be reduced. The mobile station increases or reduces the power for the dedicated channel in accordance with the instruction of the TPC signal received through the dedicated channel.

Here, in the case where a mobile station uses dedicated channels for transmission/reception to/from a plurality of base stations, that is, where a mobile station is in a soft handover (SHO) state like the mobile station 23, the mobile station receives a plurality of TPC signals. Among the received TPC signals, if the mobile station receives at least one TPC signal giving an instruction to reduce the power, the mobile station is controlled to reduce its transmission power. This is because during SHO, communications can be carried out as long as any one of the plurality of base stations meets desired quality, and because increasing transmission power to make all the base stations receive sufficient quality leads to increased interference with another user, which is not favorable.

In addition, the physical layer of a base station generates Out-of-sync when the reception quality of a dedicated channel has deteriorated below a predetermined level. Hereinafter, generation of Out-of-sync and notification of RL_Failure for indicating an out-of-sync state will be described concretely based on the description of 3GPP TS25.214 v6.6.0 3rd Generation Partnership Project; Technical Specification Group Radio Access Network; Physical layer procedures (FDD); (Release 6).

FIG. 2A is a time chart for describing a process of RL_Failure generation in a base station (Node B), and FIG. 2B is a time chart showing changes in received quality, for describing a conventional transmission power control method. Referring to FIG. 2A, in a normal-mode, when the target SIR of a dedicated channel is set at a value (SIR_normal) notified from the base station controller 10, a reception SIR (dotted line) of a mobile station (UE: User Equipment) in question is changed to be closer to the target SIR through the above-described closed-loop power control.

In this closed-loop power control, if the reception SIR of this mobile station deteriorates and falls below a sync-securing quality threshold SIR_th (dashed-and-dotted line), which is set by the base station on its own, a sync detection section starts a timer and, when a predetermined period of time T_timer1 [ms] has elapsed, notifies Out-of-sync to a sync state management section. When the sync state management section is notified of Out-of-sync a predetermined number of times (N_OUTSYNC_IND), the sync state management section starts a timer. If the sync state management section does not receive In-sync notifying that the reception SIR of the dedicated channel is at the predetermined level or above before the timer exceeds a predetermined period of time (T_RLFAILURE), the sync state management section transmits a signal RL_Failure notifying of an out-of-sync state to the base station controller 10. Note that the predetermined number of times N_OUTSYNC_IND and the timer's predetermined period T_RLRAILURE are values determined by the base station controller 10 and notified to each base station beforehand. When the base station controller 10 receives RL_Failure from the base station, the base station controller 10 determines that there is a problem in a propagation path between the base station and mobile station in question or in the mobile station itself, and carries out a countermeasure such as disconnecting the dedicated channel in connection.

In such control of a dedicated channel, a state such that a mobile station is carrying out the transmission/reception of a dedicated channel is referred to as a Cell_DCH state. On the other hand, when no data transmission/reception is carried out for a long time, the mobile station changes to a state other than the Cell_DCH state, for example, a Cell_FACH state. In the Cell_FACH state, the mobile station only receives a predetermined downlink channel at predetermined time intervals and carries out no transmission/reception of a dedicated channel. Therefore, for the mobile station in the Cell_FACH state, uplink synchronization is not established.

When the mobile station in such a Cell_EACH state starts transmitting/receiving a predetermined amount of data or more, the mobile station changes to the Cell_DCH state. However, a considerable delay may be created by the time that elapses before the state change is finished and then data transmission/reception is started. The reason is as follows: a dedicated channel resource needs to be allocated to the mobile station through the base station controller 10; predetermined control parameters need to be notified to the mobile station and base station; and uplink synchronization needs to be established. Therefore, if a change from the cell_DCH state to the cell_FACH state or vice versa occurs frequently, a data transmission delay increases, resulting in the degraded quality of service to a user. In addition, the processing load on the base station controller 10 is increased, and the number of control signals exchanged between the base station controller 10 and the base station is increased, which are not favorable.

To improve such circumstances, 3GPP (3rd Generation Partnership Project) defining the W-CDMA specifications is conducting studies about allowing a mobile station that has not performed data transmission for a long time also to maintain the Cell_DCH state and thus allowing data transmission/reception to be started without a state-change delay. In this case, however, as mentioned above, since the number of mobile stations that transmit dedicated channels increases by a large amount, the apprehension arises that uplink interferences are increased and the system capacity is reduced.

Therefore, there have been proposed several methods to reduce the power of an uplink dedicated channel when no data transmission/reception is being carried out (see 3GPP TR25.903 v0.2.0 (2005-11) 3rd Generation Partnership Project; Technical Specification Group Radio Access Network; Continuous Connectivity for Packet Data Users; (Release 7)). For example, proposed is a method of changing a target SIR depending on whether or not data transmission/reception is being carried out. Specifically, as shown in FIG. 26, when data transmission/reception has not been carried out for a certain period of time, a base station that is conducting scheduling (serving base station) decreases the target SIR to a predetermined reduced quality level (SIR_reduced) capable of TPC detection. Because of this decrease in the target SIR, the transmission power of the mobile station for the dedicated channel is also reduced through the closed-loop power control. As a result, it is possible to effectively reduce the amount of uplink interference this mobile station might exert on another mobile station. Such a state of a mobile station whose transmission power for a dedicated channel is reduced by decreasing the target SIR as described above is referred to as reduced power mode, idle traffic mode, or the like. In addition, the state of a mobile station that maintains the Cell_DCH state and is not in the reduced power mode is referred to as normal mode, active mode, or the like.

Additionally, the above-mentioned modes are determined depending on the relative magnitude of transmission power. Therefore, reversely, the normal mode can be called increased power mode, and the reduced power mode can be called normal mode.

Incidentally, a serving base station is generally determined by a base station controller connected to base stations. As an example of the method of determining the serving base station, a mobile station first measures the reception quality of a pilot signal from each base station and notifies the measurement results, through the respective base stations, to the base station controller connected to the base stations. The base station controller estimates a path loss for each base station based on the reception quality of each pilot signal and determines, as the serving base station, a base station whose estimated path loss is small. This determination result is notified to each base station.

However, when the reception quality of a dedicated channel has deteriorated below a predetermined level, the sync detection section in a base station sends Out-of-sync to the sync state management section to notify that the quality of the dedicated channel has deteriorated and sync precision has declined (or is likely to decline). During the above-described reduced power mode, since the reception SIR of the dedicated channel decreases, the reception SIR becomes equal to or lower than the predetermined deterioration threshold SIR_th set in the sync detection section, leading to the possibility that Out-of-sync is generated frequently.

Moreover, the sync-securing quality threshold SIR_th, which is a criterion for sync determination used by the sync detection section, is a value preset by a base station on its own, and therefore there is no guarantee that all base stations have the same sync-securing quality threshold SIR_th. In such an environment, when a serving base station that is being used by a mobile station decreases the target SIR by a predetermined value, a reduction occurs in the transmission power of a dedicated channel from the mobile station in the reduced power mode. For another base station (non-serving base station), there might be a possibility that the reception SIR of its corresponding dedicated channel deteriorates below the sync-securing quality threshold SIR_th of this non-serving base station.

As described above, if the reception SIR becomes equal to or lower than the predetermined deterioration threshold SIR_th and thereby Out-of-sync is generated frequently, then the sync state management section transmits to the base station controller RL_Failure notifying that the wireless link with the mobile station is likely to go out of sync, and thereby the base station controller disconnects (releases) the dedicated channel between the base station in question and the mobile station. In the case where the base station controller is connected to a plurality of base stations through a network, if the notifications of RL_Failure are frequent, the problem arises that the number of control signals exchanged between the base station controller and the base stations is increased, resulting in the increased load on the network.

If a dedicated channel is disconnected, it is needed to carry out again the allocation of a dedicated channel resource, notification of predetermined control parameters, establishing of uplink synchronization, and the like when transmission data occurs. Therefore, data transmission/reception cannot be performed immediately.

For a non-serving base station during soft handover in particular, it is more serious that RL_Failure is generated frequently. In general, since a path loss occurring between a mobile station and each base station during soft handover varies from one base station to another, the reception quality of the uplink each base station receives also varies. In addition, a base station providing a better propagation environment, that is, a base station having a smaller path loss is generally selected as a serving base station, because the serving base station transmits control signals related to scheduling. Therefore, in many cases, a non-serving base station principally receives lower reception quality than a serving base station. Accordingly, if the serving base station decreases the target SIR during the reduced power mode, the non-serving base station will receive even lower reception quality and hence have a higher possibility of going out of sync than the serving base station.

SUMMARY OF THE INVENTION

An object of the present invention is to provide a transmission power control method and device that can achieve highly reliable wireless channel, as well as a wireless communications system using the same.

Another object of the present invention is to provide a transmission power control method and device that can reduce the possibility of going out of sync, as well as a wireless communications system using the same.

Still another object of the present invention is to provide a transmission power control method and device that can suppress the generation of a notification of deterioration in a wireless channel for maintaining synchronization, as well as a wireless communications system using the same.

According to the present invention, an operation mode is changed from a first operation mode in which a target value of quality of the wireless channel is set to a first value to a second operation mode in which the target value is set to a second value, and then the target value is set to a value different from the second value in the second operation mode.

The target value can be intermittently changed in the second operation mode. Further, a specified range in which the second value in the second operation mode can be changed may be previously set. The specified range is preferably changed depending on quality of another wireless channel.

According to the present invention, mode change is performed from the first operation mode to the second operation mode, and then a mode change notification is sent to the mobile station, which autonomously controls transmission power of the wireless channel. It is preferable that the mobile station intermittently changes the transmission power of the wireless channel.

According to the present invention, an operation mode is changed from a first operation mode in which a target value of quality of the wireless channel is set to a first value to a second operation mode in which the target value is set to a second value, and the target value is set to a value falling into a specified range.

According to the present invention, an operation mode is changed from the first operation mode to the second operation mode. However, if the mobile station is connected to a plurality of base stations, then the mode change from the first operation mode to the second operation mode is not performed.

According to the present invention, an operation mode is changed from the first operation mode to the second operation mode. However, at least one of parameters for detecting an out-of-sync state is set to different values between a base station which determines the mode change and another base station.

According to an embodiment of the present invention, the quality of reception from a mobile station which is in an operation mode of reducing transmission power is controlled so as not to disconnect a dedicated channel for maintaining synchronization with the mobile station. The control of reception quality in the reduced transmission power operation mode can be performed by variable settings of target quality or target quality and sync-securing quality threshold, autonomous transmission power setting of the mobile station, and/or, higher-priority transmission power setting by the base station.

According to a first aspect of the present invention, the reception quality in the reduced transmission power operation mode is appropriately set to a value that is not smaller than the reduced value, thereby suppressing a frequency of generating Out-of-sync or the possibility of generating RL_Failure, allowing the dedicated channel to be effectively maintained. The reception quality can be set to the reduced value or more by, for example, intermittently setting the target quality to the reduced value or more, or by the mobile station, when changed to the reduced transmission power operation mode, intermittently changing its own transmission power so that the reception quality becomes the reduced value or more. Preferably, the target quality or the transmission power of the mobile station itself may be changed to that value before a predetermined period of time has elapsed or the base station generates Out-of-sync or RL_Failure.

According to a second aspect of the present invention, by referring to a sync-securing quality value previously set in a base station, a reduced value of target quality which is set in the reduced transmission power operation mode is controlled so as to be kept at the sync-securing quality value or more. Even in the reduced transmission power operation mode, the reduced value of target quality is set to the sync-securing quality value or more. Accordingly, the reception quality is also more likely to be kept at the sync-securing quality value or more, allowing the dedicated channel to be effectively maintained.

According to a third aspect of the present invention, by previously setting a range in which a reduced value can be set at the reduced transmission power operation mode, a base station can determine the reduced value falling into the setting possible range when the mobile station is in the reduced transmission power operation mode. The setting possible range of the reduced value is preferably equal to or higher than the sync-securing quality value preset in the base station. Moreover, the setting possible range is preferably set by a base station controller. Further, when the base station controller is notified by the base station and/or another base station that the base station and/or another base station are out of synchronization with the mobile station, the base station controller preferably updates the setting possible range so as to maintain the dedicated channel effectively.

According to a fourth aspect of the present invention, when a soft handover state is notified in the case of the reduced transmission power operation mode, the base station changes the target quality to a level higher than the reduced value. Since the target quality is increased to a level higher than the reduced value in the case of soft handover, it is a high possibility that dedicated channels with not only the current base station but also another base station are effectively maintained.

According to a fifth aspect of the present invention, when the base station detects an out-of-sync state of a mobile station, a higher-priority transmission power control signal is sent to the mobile station. When receiving the higher-priority transmission power control signal, the mobile station preferably maintains an added power mode during a predetermined period of time.

According to a sixth aspect of the present invention, when the target quality is lowered to the reduced value in the reduced transmission power operation mode, the sync-securing quality value which is previously set in the base station is also lowered in synchronization with the target quality. In this manner, by synchronizing the target quality with the sync-securing quality value, frequent occurrences of Out-of-sync or the possibility of generating RL_Failure can be suppressed, allowing the dedicated channel to be effectively maintained.

As described above, according to the present invention, the target value of transmission power of the wireless channel in the second operation mode is set to a value different from the second value or to a value falling to a specified range. If the mobile station is connected to a plurality of base stations, the mode change from the first operation mode to the second operation mode is not performed. Alternatively, at least one of parameters for detecting an out-of-sync state is set to different values between a base station which determines the mode change and another base station.

By setting the target value to a value different from the second value preset in the second operation mode or setting it to a value falling to a specified range, the possibility of causing a loss of synchronization can be reduced. Since the mode change from the first operation mode to the second operation mode is not performed in the case of the mobile station being connected to a plurality of base stations, the possibility of causing a loss of synchronization can be suppressed. Alternatively, by setting at least one of parameters for detecting an out-of-sync state to different values between a base station which determines the mode change and another base station, the possibility of causing a loss of synchronization can be suppressed at base stations other than the base station which determines the operation mode change. Such reduced possibility of going out of synchronization can reduce, for example, the possibility of notification of RL_Failure from a base station in the reduced transmission power operation mode. Accordingly, the wireless channel for maintaining synchronization can be maintain, improving the performance of data transmission and reception and further avoiding unnecessary transmission of control signals into a network, resulting in reduced load on the network.

DETAILED DESCRIPTION OF THE PREFERRED EMBODIMENTS

Figure 3:
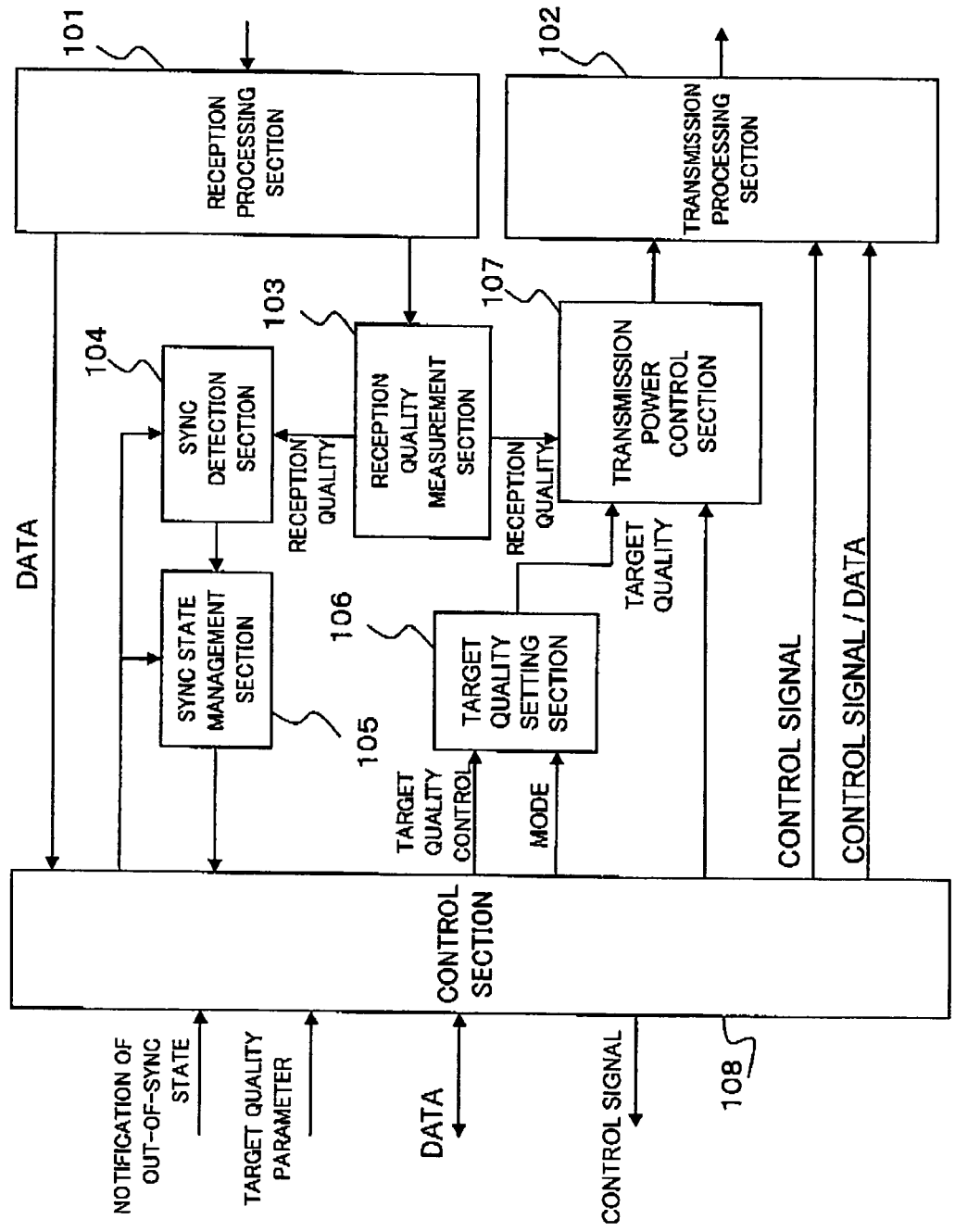
FIG. 3 is a block diagram schematically showing a functional configuration of a wireless communication device according to a mode of the present invention.

FIG. 3 is a block diagram schematically showing a functional configuration of a wireless (radio) communication device according to a mode of the present invention. However, FIG. 3 shows only major functions related to the present invention here, and each block does not always correspond to a hardware component.

A reception processing section 101 can receive respective signals from a plurality of other wireless communication devices and separate data and control signal from each received signal. A transmission processing section 102 can multiplex control signals and data to transmit them to a plurality of wireless communication devices that are destinations. It is assumed that the wireless communication deice transmits and receives control signals and the like to/from the other wireless communication devices to wirelessly communicate with, through respective dedicated channels that are connecting to the other wireless communication devices.

A reception quality measurement section 103 measures the reception quality of each wireless communication device by using the control signal received from that wireless communication device, which has been separated by the reception processing section 101, and outputs the measurement result to each of a sync detection section 104 and a transmission power control section 107. The reception quality can be obtained from, for example, the ratio of reception power to interference power (SIR) of a received control signal channel, the result of error detection using an error detection code, and the like.

The sync detection section 104 and a sync state management section 105 determine whether or not the reception quality inputted from the reception quality measurement section 103 meets a preset sync condition. When the reception quality does not meet the sync condition, it is notified to a control section 108 that the wireless link with the wireless communication device (e.g. mobile station or UE) in question is in an out-of-sync state. This sync condition can be determined based on the performance of the wireless communication device, but may be notified from a wireless communication device controller (not shown). For example, the determination as to whether or not the reception quality meets the sync condition is carried out as follows.

The sync detection section 104 has a predetermined normal target quality and a sync-securing quality threshold of this wireless communication device and compares the reception quality inputted from the reception quality measurement section 103 with the sync-securing quality threshold. If the reception quality is equal to or higher than the sync-securing quality threshold, the sync detection section 104 notifies a sync detection result to the sync state management section 105. If a state where the reception quality is lower than the sync-securing quality threshold continues for a predetermined period of time, the sync detection section 104 notifies an out-of-sync detection result to the sync state management section 105.

The sync state management section 105 monitors the number of generations of the out-of-sync detection result. The sync state management section 105 notifies an out-of-sync state to the control section 108 unless the sync state management section 105 inputted a sync detection result within a given period of time after having exceeded a predetermined number of generations of the out-of-sync detection result. The control section 108 notifies the out-of-sync state to the wireless communication device controller (not shown).

Incidentally, the normal target quality may be notified as a target quality parameter from the not-shown wireless communication device controller. The sync-securing quality threshold and the predetermined period of time for sync detection, used by the sync detection section 104, may be parameters determined by this wireless communication device on its own. The predetermined number and the given period of time used by the sync state management section 105 may be notified from the not-shown wireless communication device controller as part of target quality parameters.

In addition, as to these parameters, the following settings or the like may also be made. Specifically, a base station in charge of determining a switch of operation modes and another base station have different values for at least one parameter for detecting the out-of-sync state, such as the predetermined period of time. Specific examples will be shown in the under-mentioned embodiments.

A target quality setting section 106 sets the target quality at a normal value during a normal mode and gives this value to the transmission power control section 107. During a reduced power mode, the target quality setting section 106 sets the target quality at a lower, predetermined reduced power quality and gives this value to the transmission power control section 107. The control section 108 notifies the target quality setting section 106 which mode another wireless communication device for which the transmission power control is performed is brought in, the normal mode or reduced power mode.

The transmission power control section 107 compares the reception quality inputted from the reception quality measurement section 103 with the target quality inputted from the target quality setting section 106 and transmits a transmission power control signal to the another wireless communication device in question so that the reception quality becomes close to the target quality. In accordance with the received transmission power control signal, this wireless communication device adjusts its transmission power.

When the reduced power mode is set, the target quality setting section 106 sets the target quality to be given to the transmission power control section 107, in accordance with target quality control from the control section 108, such that a dedicated channel in question will not be disconnected. For the transmission power control method through the target quality control, any of the following methods can be used: increasing the target quality at least once, intermittently, or periodically during the reduced power mode; setting the target value at a given value during the reduced power mode; not switching from a first operation mode to a second operation mode during the reduced power mode; and the like. The details will be described specifically in the undermentioned embodiments.

As another method, the following is also possible. When the reduced power mode is set, the control section 108 transmits to another wireless communication device, via the transmission processing section 102, a notification to the effect that the mode has been changed to the reduce power mode. Then, the other wireless communication device itself, when receiving the notification, controls its transmission power so that a dedicated channel in question will not be disconnected.

The control section 108 performs control required to carry out the transmission power control method. For example, the control section 108 determines whether or not to bring another wireless communication device into the reduced power mode. However, the determination method is not specified. For example, the determination can be made based on any of the following criteria. Specifically, the control section 108 sets the reduced power mode in which the transmission power of another wireless communication device for a dedicated channel is reduced, when no data to be transmitted to or received from the other wireless communication device is stored, or when no data has been transmitted to or received from the other wireless communication device for a predetermined period of time, or when data transmission/reception to/from the other wireless communication device has not been carried out (or is not scheduled to be carried out) for a predetermined period of time according to the scheduling of the control section 108, or the like.

Transmission power control as will be described in the undermentioned embodiments can be carried out under the control of the control section 108. Additionally, the reception quality measurement section 103, sync detection section 104, sync state management section 105, target quality setting section 106, and control section 108 can also be implemented by executing a program for transmission power control on a program-controlled processor.

Figure 1:
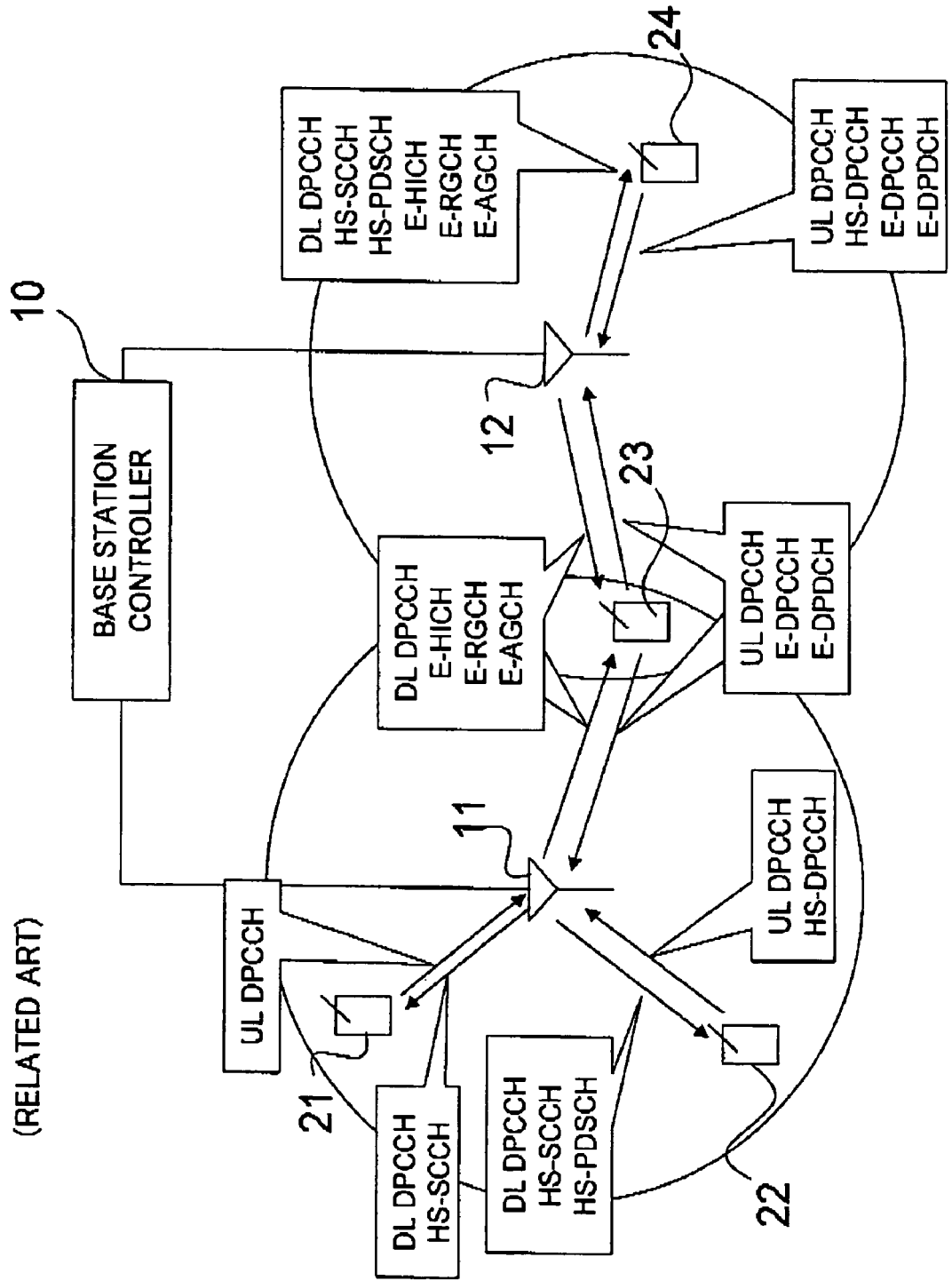
FIG. 1 is a schematic diagram of a network structure showing an example of a W-CDMA system.
Figure 2A:
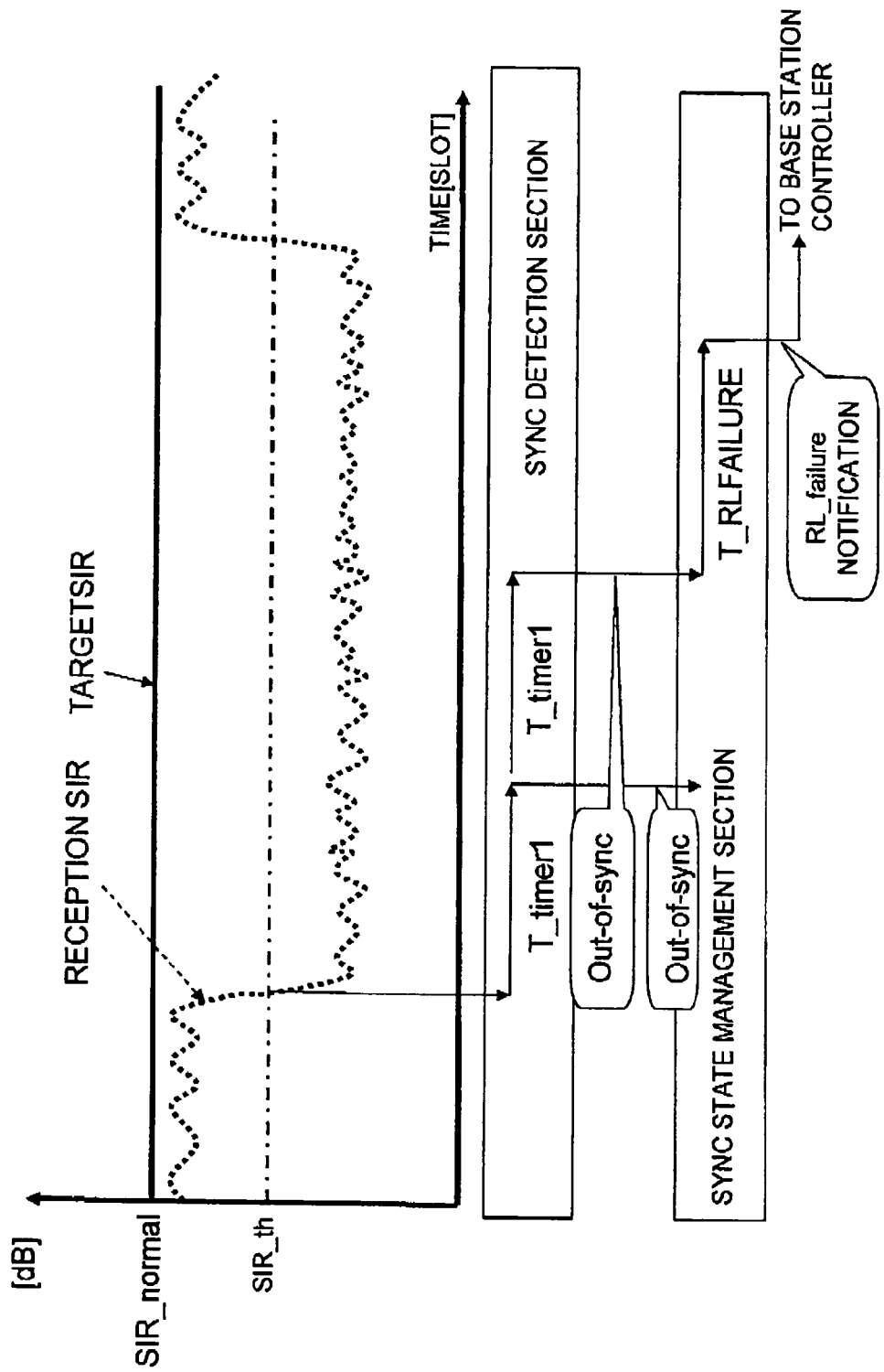
FIG. 2A is a time chart for describing a process of RL_Failure generation in a base station.
Figure 2B:
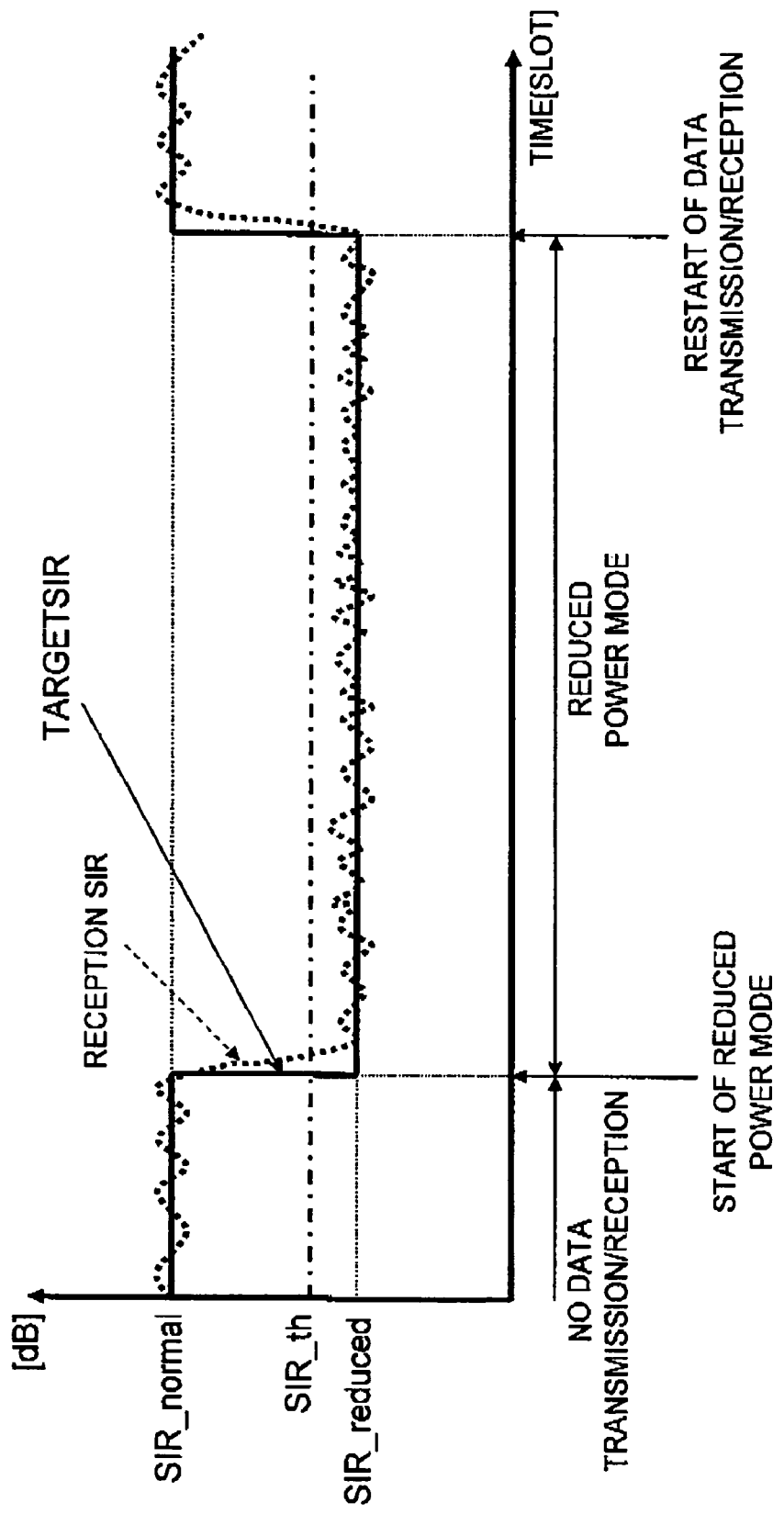
FIG. 2B is a time chart showing changes in reception quality, for describing a conventional transmission power control method.

An example of a system to which an embodiment of the present is concretely applied is as shown in FIG. 1. However, a base station controller 10 may be connected to a plurality of base stations 11 and 12, or may be individually provided as a control device to each of the base stations, which are connected to each other through communication lines. Before embodiments of the present invention are described below, the system shown in FIG. 1 will be described more specifically. Although both HSDPA and EUDCH are used in this example, the present invention is not limited to such a case. The system may use only HSDPA or only EUDCH.

Referring to FIG. 1, each of the mobile stations 21 to 24 uses a dedicated channel (DPCCH: Dedicated Physical Control Channel) for transmission/reception to/from its corresponding base station. Moreover, the mobile stations 22 and 24, which are performing data reception using HSDPA, each use HS-SCCH (High Speed-Shared Control Channel) and HS-PDSCH (High Speed-Physical Downlink Shared Channel) for reception and use HS-DPCCH (High Speed-Dedicated Physical Control Channel) for transmission. The mobile stations 23 and 24, which are performing data transmission using EUDCH, each use E-HICH (Enhanced-Hybrid ARQ Indicator Channel), E-AGCH (Enhanced-Absolute Grant Channel) and E-RGCH (Enhanced-Relative Grant Channel) for reception and use E-DPCCH (Enhanced-Dedicated Physical Control Channel) and E-DPDCH (Enhanced-Dedicated Physical Data Channel) for transmission. Note that the unit of transmission time in DPCCH is called a slot, and the unit of transmission time in HSDPA and EUDCH is called a subframe. It is assumed that one subframe is equivalent to three slots.

A single slot of DPCCH includes a pilot signal, which is used for channel estimation to secure synchronization between a mobile station and a base station and to carry out demodulation, and a TPC signal, which is a control signal for closed-loop power control (inner loop power control). Each base station maintains a target SIR, set by the base station controller 10, for each mobile station. As described above, a base station generates a TPC signal instructing that the power be increased (hereinafter, "TPC_UP") or a TPC signal instructing that the power be reduced (hereinafter, "TPC_DOWN") so that the reception SIR of a pilot signal transmitted through uplink DPCCH becomes close to the target SIR for a mobile station in question, and transmits the TPC signal to the mobile station in question through downlink DPCCH.

The mobile station, in accordance with the received TPC signal, increases or reduces the transmission power for uplink DPCCH by a predetermined value. Note that although the TPC signal instructs that the transmission power be either increased or reduced here, the present invention is not limited to these cases. TPC signals may also include a TPC signal instructing that the transmission power be neither increased nor reduced.

The mobile station 23 is in a state of soft handover (SHO) in which the mobile station 23 is setting up DPCCH with a plurality of base stations. If even one TPC_DOWN is among a plurality of TPC signals received, the mobile station 23 reduces the transmission power for DPCCH. However, there are some cases where the mobile station 23 increases the transmission power when receiving a priority TPC signal as described later. A base station and a mobile station carry out the operations as described above repeatedly for each slot.

Data transmission using HSDPA and EUDCH is performed in one-subframe units by a scheduler located in a base station. Each mobile station is notified of the scheduling result using the respective control channels for HSDPA (HS-SCCH) and EUDCH (E-AGCH and E-RGCH). A mobile station, based on the received scheduling result, receives or transmits one coded block for one subframe through HS-PDSCH or E-DPDCH. The mobile station or base station transmits, using HS-DPCCH or E-HIGH respectively, a signal notifying whether or not the data block has been properly received, that is, an ACK/NACK signal.

Each mobile station is allocated only one serving base station which is a base station that conducts the scheduling of HSDPA and EUDCH. When the serving base station detects that there is no data to transmit through both HSDPA and EUDHC or any one of them, the serving base station sets the target SIR of uplink DPCCH at a predetermined reduced power quality SIR_reduced that is lower than a value SIR_normal notified from the base station controller. As described above, a mobile station for which the target SIR is set at SIR_reduced is in the reduced power mode.

Additionally, when a state where the reception SIR is lower than a predetermined sync-securing quality threshold SIR_th [dBm] continues for T_timer1 [ms] or longer, the sync detection section in each base station is assumed to notify Out-of-sync to the sync state management section, as an out-of-sync detection result. When Out-of-sync is generated a predetermined number of times (N_OUTSYNC_IND), the sync state management section is assumed to start a timer. When In-sync, as a sync detection result notifying that the reception quality of a dedicated channel in question is at a predetermined level or higher, is not received before the timer exceeds a predetermined period of time (T_RLFAILURE), the sync state management section is assumed to notify RL_Failure to the base station controller 10, as an out-of-sync determination result.

According to an embodiment of the present invention as described later, it can be avoided that the reception quality of a dedicated channel deteriorates below the sync-securing quality threshold SIR_th for a long time during the reduced power mode, which is started when there is no data transmission/reception, in order to reduce interferences due to the transmissions of dedicated channels. Accordingly, it is possible to reduce the frequency with which serving and non-serving base stations notify RL_Failure to the base station controller.

As a result, it is possible to effectively avoid it occurring that the base station controller disconnects (releases) a dedicated channel, eliminating the need to set a dedicated channel again when data transmission/reception is restarted or when the mode is returned to the normal mode. Accordingly, data transmission/reception can be immediately started when data is generated. Hence, a data transmission delay can be reduced, and service quality can be improved.

Further, during soft handover (SHO) as well, a dedicated channel can be maintained without being disconnected. Therefore, it is possible to immediately obtain a gain attributable to the soft handover when data transmission/reception is started, and hence it is possible to improve the quality of the dedicated channel. In addition, since the frequency of notifications of RL_Failure can be reduced, control signals exchanged between the base station controller and base stations can be reduced. Accordingly, the load on the network also can be reduced.

By taking such a system as a preferred example, transmission power control methods according to embodiments of the present invention will be described below in detail, as well as base stations, base station controllers, and mobile stations using the methods, with reference to the accompanying drawings.

1. First Embodiment
1.1) Basic Principle

Figure 4:
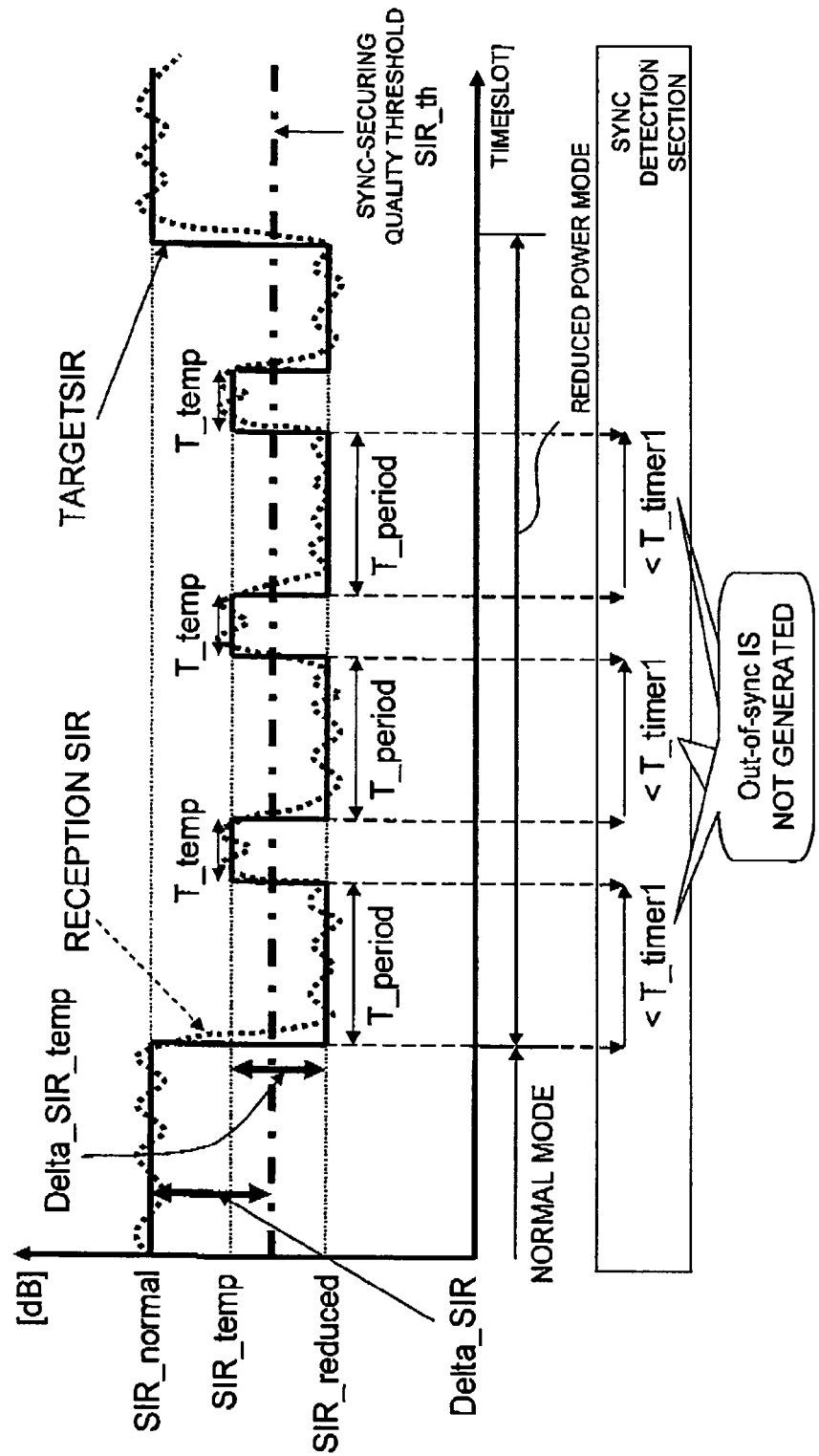
FIG. 4 is a time chart showing changes in a target SIR and a reception SIR over time, for describing the principle of transmission power control according to a first embodiment of the present invention.

FIG. 4 is a time chart showing changes in the target SIR and the reception SIR over time, for describing the principle of transmission power control according to a first embodiment of the present invention. Here, shown are the variations of the target SIR and the reception SIR over time at a serving base station (serving Node B) in use. According to the present embodiment, the serving base station increases the target SIR up to a temporarily increased quality SIR_temp only for a predetermined duration, at every predetermined period during the reduced power mode. The predetermined period and the predetermined duration may be determined beforehand, or may be changed as occasion requires. Thereby, since the transmission power for DPCCH is periodically increased even during the reduced power mode, the reception SIR at a base station (Node B) is also periodically improved. Accordingly, it is possible to reduce the probability that the reception SIR stays equal to or lower than the sync-securing quality threshold SIR_th for a long time. Hence, it is possible to solve the problem that Out-of-sync is generated frequently as described earlier. Parameters required to set the temporarily increased quality SIR temp include the following, for example.

Temporary increase period (every T_period [slot])
Temporary increase duration (T_temp [slot])
Increase amount (Delta_SIR_temp [dB])

These parameters are determined by the base station controller 10 and notified to a base station. Here, it is preferable that the temporary increase period T_period be set to a period of time shorter than a period of time T_timer1 that has been set in the sync detection section as the time-out period of the timer. Moreover, it is preferable that the temporarily increased quality SIR_temp be set not greater than a normal mode quality SIR_normal and not smaller than a predetermined reduced power quality SIR_reduced. With these settings, before the timer exceeds T_timer1 and Out-of-sync is generated, the target SIR is raised up to the temporarily increased quality SIR temp, increasing the probability that the reception SIR becomes above the sync-securing quality threshold SIR_th.

It is assumed here that the sync-securing quality threshold SIR_th is a fixed value determined beforehand by a base station. However, according to the present invention, the sync-securing quality threshold SIR_th is not limited to a fixed value. For example, a difference Delta_SIR from the target quality in the normal mode SIR_normal is determined by a base station, and a value that is lower than the target quality in the normal mode by Delta_SIR may be used as the sync-securing quality threshold SIR_th.

According to the present embodiment, control is performed such that the target SIR is increased at every predetermined period during the reduced power mode. It should be noted, however, that the principle is that the target SIR is increased so that the reception quality becomes higher than the sync-securing quality threshold SIR_th before a base station generates RL_Failure. Therefore, for example, the serving base station may increase the target SIR up to SIR_temp for a predetermined period of time only when Out-of-sync has been generated a predetermined number of times. Alternatively, the serving base station may keep the target SIR at SIR_temp until the reception SIR becomes equal to or higher than the sync-securing quality threshold SIR_th.

1.2) Base Station

Figure 5:
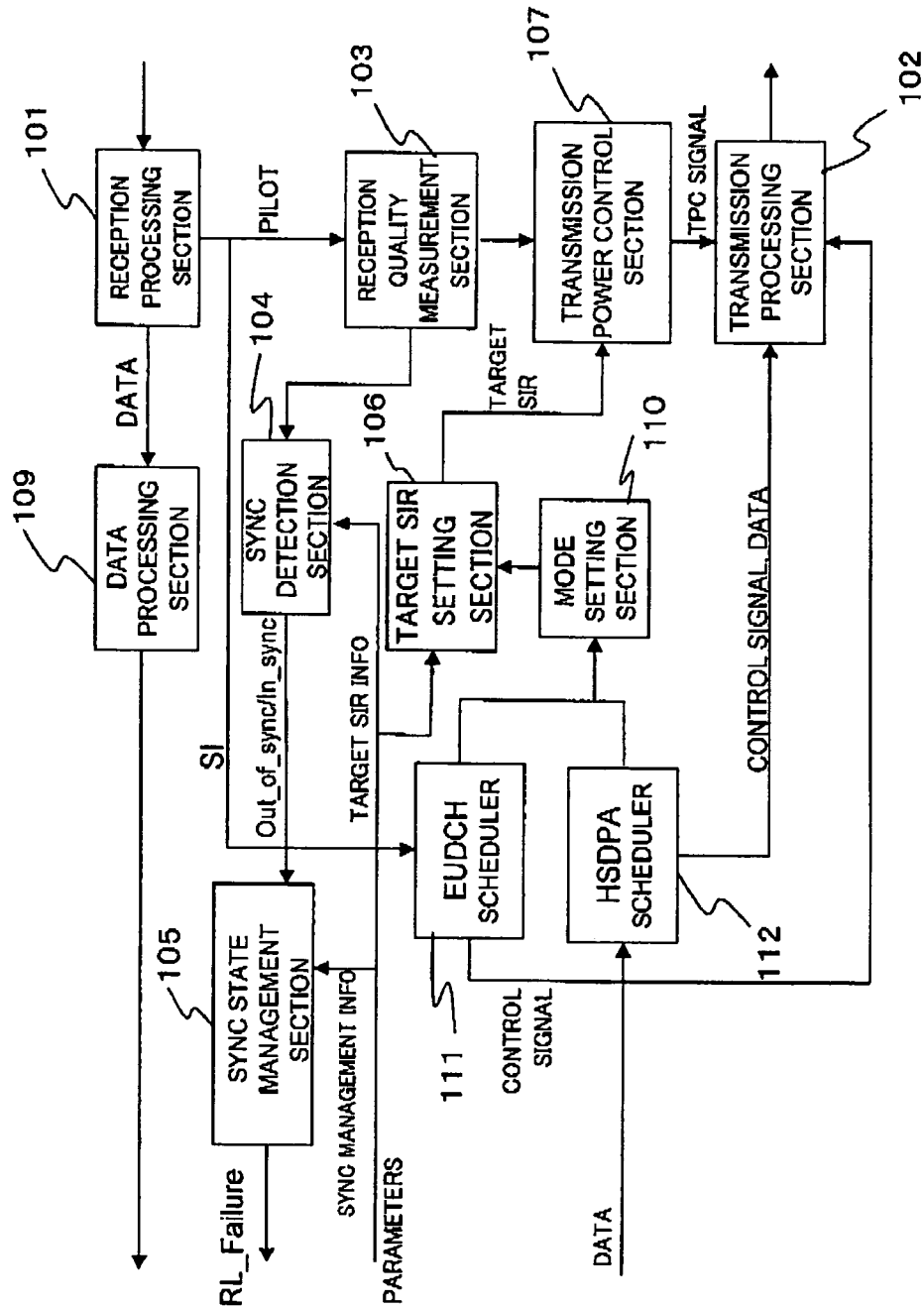
FIG. 5 is a block diagram showing a functional configuration of a base station according to the first embodiment of the present invention.

FIG. 5 is a block diagram showing a functional configuration of a base station according to the first embodiment of the present invention. Here, shown is an example of the functional configuration related to the present invention. The same reference numerals as in FIG. 3 are used for the blocks having functions similar to the functional blocks shown in FIG. 3.

The base station as shown in FIG. 5 includes: a reception processing section 101 that performs signal receiving, dispreading, signal separation, and the like; a transmission processing section 102 that performs coding, spreading, signal combining, and the like to transmit a transmission signal; a reception quality measurement section 103; a sync detection section 104; a sync state management section 105; a target SIR setting section 106; and a transmission power control section 107. In addition to these, the base station also includes: a data processing section 109 that performs decoding, error detection, and the like; a mode setting section 110; an EUDCH scheduler 111; and a HSDPA scheduler 112. Note that a control section for controlling the operations of the entire base station is not shown. In addition, a memory (not shown) stores information that is notified from a base station controller and is used to determine whether or not the self base station is a serving base station to a mobile station.

The reception quality measurement section 103 measures the reception SIR of a pilot signal transmitted through uplink DPCCH and sends the measurement result to each of the transmission power control section 107 and the sync detection section 104.

Based on the information stored in the memory (not shown), used to determine whether or not the self base station is a serving base station to a mobile station (UE), the mode setting section 110 determines whether or not the self base station is a serving base station to a mobile station in question. When the self base station is a serving base station to the mobile station in question, the mode setting section 110 determines whether or not there is data to be transmitted or received to/from this mobile station, based on the amounts of data, for each mobile station, managed by the HSDPA scheduler 111 and the EUDCH scheduler 112. When there is no data transmission/reception for the mobile station, the mode setting section 110 determines that the mobile station should be in the reduced power mode and sets the mobile station in the reduced power mode and determines that the other mobile stations should be in the normal mode and sets them in the normal mode. Moreover, in the case where the self base station is a non-serving base station to the mobile station in question, the mode setting section 110 determines that the mobile station should be in the normal mode and sets the mobile station in the normal mode. When the mode of the mobile station is changed, the mode setting section 110 notifies the target SIR setting section 106 of the ID of the mobile station and a new mode after change.

Here, the method by which the mode setting section 110 determines whether or not there is data transmission/reception to/from the mobile station is irrelevant to the principle of the present invention, and various methods are conceivable. In the present embodiment, for example, the following method is assumed to be used.

The amount of data managed by the HSDPA scheduler 112 is assumed to be the amount of data that is stored in a buffer (not shown) present in the HSDPA scheduler 112 and is scheduled to be transmitted to the mobile station through a downlink channel. The amount of data managed by the EUDCH scheduler 111 is assumed to be the amount of data that is scheduled to be transmitted from the mobile station through an uplink channel and is recorded on a memory (not shown) present in the EUDCH scheduler 111, and this value is assumed to be updated based on buffer information included in the scheduling information (SI) transmitted from the mobile station using E-DPDCH. The mode setting section 116 checks these amounts of data for each subframe. When detecting that there is no data on both the uplink and downlink or any one of them, the mode setting section 110 starts a timer (not shown). When the state of there being no data continues for a predetermined period of time (e.g., 10 subframes) or longer, the mode setting section 110 determines that there is no data transmission/reception to/from the mobile station in question, and carries out control to switch the mobile station to the reduced power mode. When data is generated for the mobile station in the reduced power mode, the mode setting section 10 performs control to switch the mobile station to the normal mode.

Based on the information that is notified from the base station controller, is stored in the memory (not shown), and is used to determine whether or not the self base station is a serving base station to a mobile station, the target SIR setting section 106 determines whether or not the self base station is a serving base station to the mobile station in question. Moreover, prior to the start of communication with the mobile station, the target SIR setting section 106 receives, from the base station controller, information related to the target SIR control on the mobile station in question (target SIR information), including here SIR_normal [dB], T_period [slot], T_temp [dB], Delta_SIR_temp [dB], and the like, and stores the target SIR information in a memory (not shown). Additionally, the target SIR in the reduced power mode, that is, SIR_reduced [dB] is determined beforehand based on the decoding performance of the base station and stored in, for example, a memory (not shown) in the target SIR setting section 106.

The base station controller can notify the target SIR setting section 106, as deemed appropriate, that SIR_normal will be changed, depending on the communication state of a mobile station. Based on the mode of each mobile station notified from the mode setting section 110, the target SIR setting section 106 sets the target SIR at SIR_normal for a mobile station in the normal mode, and sets the target SIR at SIR_reduced for a mobile station in the reduced power mode. Further, the target SIR setting section 106 may add Delta_SIR_temp depending on the measurement value of a timer (not shown) for each mobile station. The detailed control will be described later by using a diagram of an operation flow.

The transmission power control section 107 compares the reception SIR inputted from the reception quality measurement section 103 with the target SIR iputted from the target SIR setting section 106. When the reception SIR is lower than the target SIR, the transmission power control section 107 generates a TPC signal instructing that the power be increased. Otherwise, the transmission power control section 107 generates a TPC signal instructing that the power be reduced. The transmission power control section 107 sends the TPC signal to the transmission processing section 102.

The sync detection section 104 receives from the base station controller part of the target SIR information, that is, the value SIR_normal. When a state where the reception SIR inputted from the reception quality measurement section 103 is equal to or lower than the sync-securing quality threshold SIR_th continues for the predetermined period of time T_timer1 or longer, the sync detection section 104 notifies Out-of-sync to the sync state management section 105. Note that SIR_th and T_timer1 are parameters determined by a base station on its own before communication is started.

The sync state management section 105 receives from the base station controller and stores, as sync management information, N_OUTSYNC_IND (the number of generations of Out-of-sync, serving as a trigger for the sync state management section 105 to start a timer) and T_RLFAILURE [ms] (a period of time, serving as a trigger for the sync state management section 105 to notify RL_Failure). When Out-of-sync is generated N_OUTSYNC-IND times, the sync state management section 105 starts the timer when In-sync, as a sync detection result notifying that the reception quality of the dedicated channel is a predetermined level or higher, is not received before the timer exceeds T_RLFAILURE [ms], the sync state management section 105 notifies RL_Failure to the base station controller 10, as an out-of-sync determination result.

1.3) Base Station Controller

Figure 6:
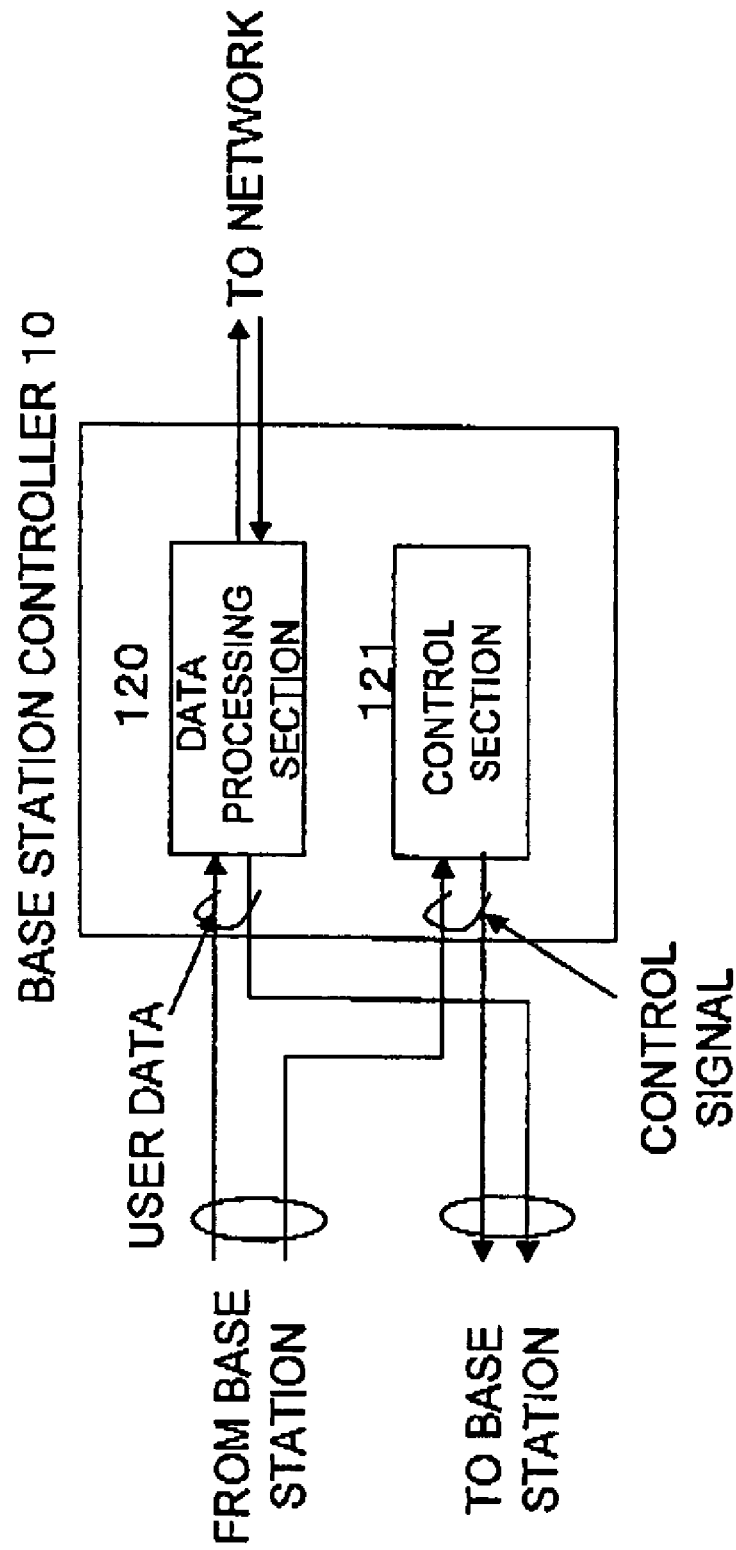
FIG. 6 is a block diagram showing a functional configuration of a base station controller according to the first embodiment of the present invention.

FIG. 6 is a block diagram showing a functional configuration of a base station controller according to the first embodiment of the present invention. The base station controller 10 principally has a data processing section 120 and a control section 121. The data processing section 120 receives from the network user data to be transmitted through a downlink channel and transmits it to a base station after performing required processing on it. In addition, the data processing section 120 receives uplink user data from a base station and transmits it to the network after performing required processing on it. The control section 121 receives control signals from a base station, such as a result of measuring the quality of a wireless link and other measurement values required to control communication setting between a base station and a mobile station, and transmits control signals related to set-up values required by a base station and/or a mobile station. The control section 121 according to the present embodiment determines the following parameters for example and notifies them to a base station.

Number of generations of Out-of-sync serving as trigger for sync state management section to start timer: N_OUTSYNC_IND Period of time serving as trigger for sync state management section to notify RL_Failure: T_RLFAILURE [ms]

Temporary increase period (every T_period [slot])

Temporary increase duration (T_temp [slot])

Temporary increase amount (Delta_SIR_temp [dB])

Target SIR during normal mode (SIR_normal [dB])

1.4) Mobile Station

Figure 7:
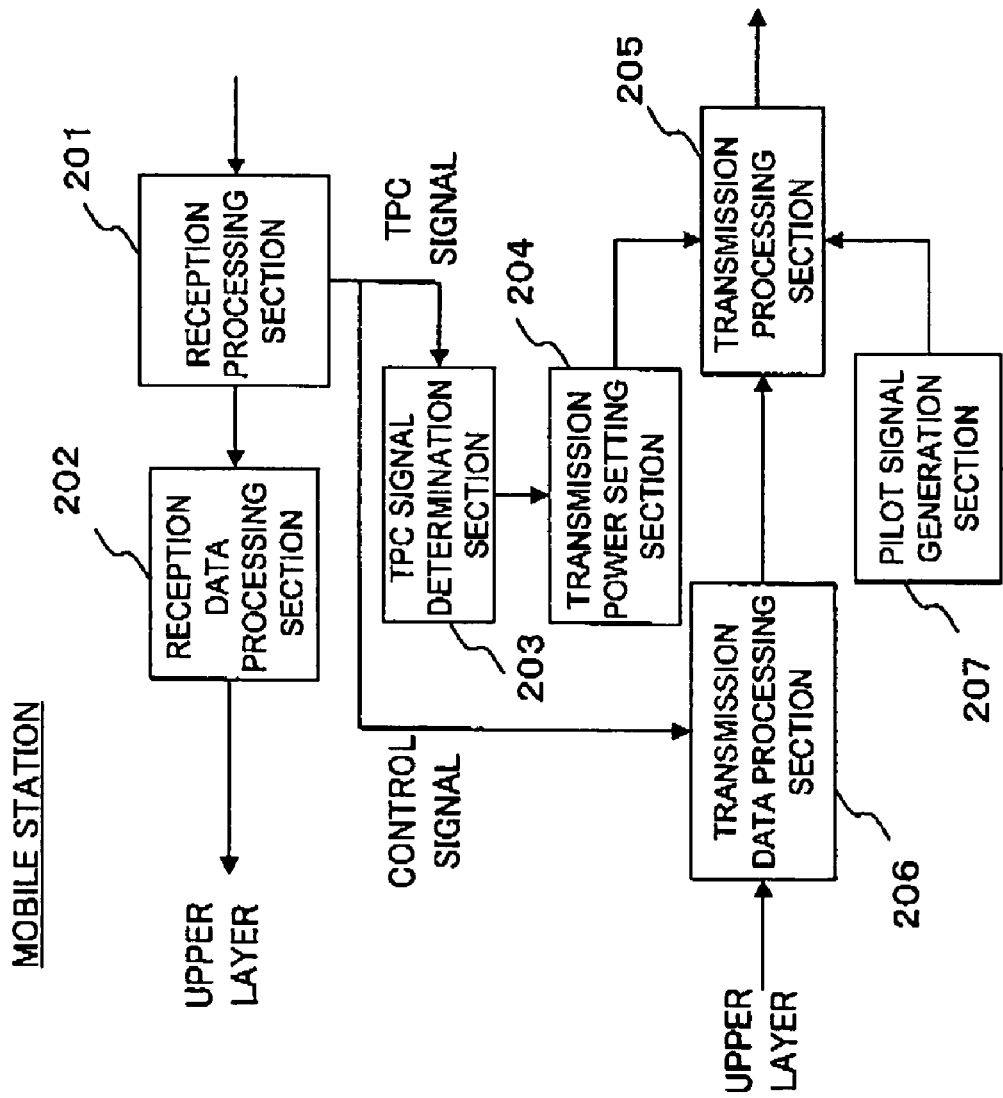
FIG. 7 is a block diagram showing a functional configuration of a mobile station according to the first embodiment of the present invention.

FIG. 7 is a block diagram showing a functional configuration of a mobile station according to the first embodiment of the present invention. Here, shown is an example of the functional configuration related to the present invention.

In the mobile station shown in FIG. 7, a reception processing section 201 carries out despreading of received signal, signal separation, and the like. A reception data processing section 202 carries out processing, such as demodulation of user data and error detection after signal separation. Furthermore, a TPC signal determination section 203 receives a TPC signal included in a control signal after signal separation, and determines the content of the received signal. Based on this determination result inputted from the TPC signal determination section 203, a transmission power setting section 204 determines the transmission power for an uplink pilot signal to be transmitted at the next transmission timing.

A transmission data-processing section 206 receives a control signal for control of EUDCH data transmission, included in the control signal after signal separation, determines the size of an uplink data block to be transmitted at the next transmission timing, and carries out processing required for data transmission such as rate matching. A pilot signal generation section 207 generates a pilot signal at a predetermined transmission timing and sends it to a transmission processing section 205, where the pilot signal and data are subjected to required processing such as spreading and multiplexing and then transmitted. Note that a control section for controlling the operations of the entire mobile station is not shown in FIG. 7.

More specifically, the TPC signal determination section 203 measures the reception quality of a TPC signal. If the TPC signal has a low level of reliability that is lower than a predetermined reception quality threshold, the TPC signal determination section 203 discards the TPC signal. Otherwise, the TPC signal determination section 203 determines the content of the TPC signal in accordance with a predetermined mapping method. For example, in the case of a TPC signal composed of two bits, it is designed that "00" indicates a power increase and "11" indicates a power decrease. Moreover, in a state of soft handover (SHO) where a mobile station is setting up dedicated channels to a plurality of base stations, the mobile station receives a plurality of TPC signals from the respective SHO base stations in respective slots. In this case, as described earlier, if even one TPC_DOWN is among the received TPC signals, TPC_DOWN is the ultimate result of the TPC signal determination.

1.5) Operation of Base Station

Figure 8:
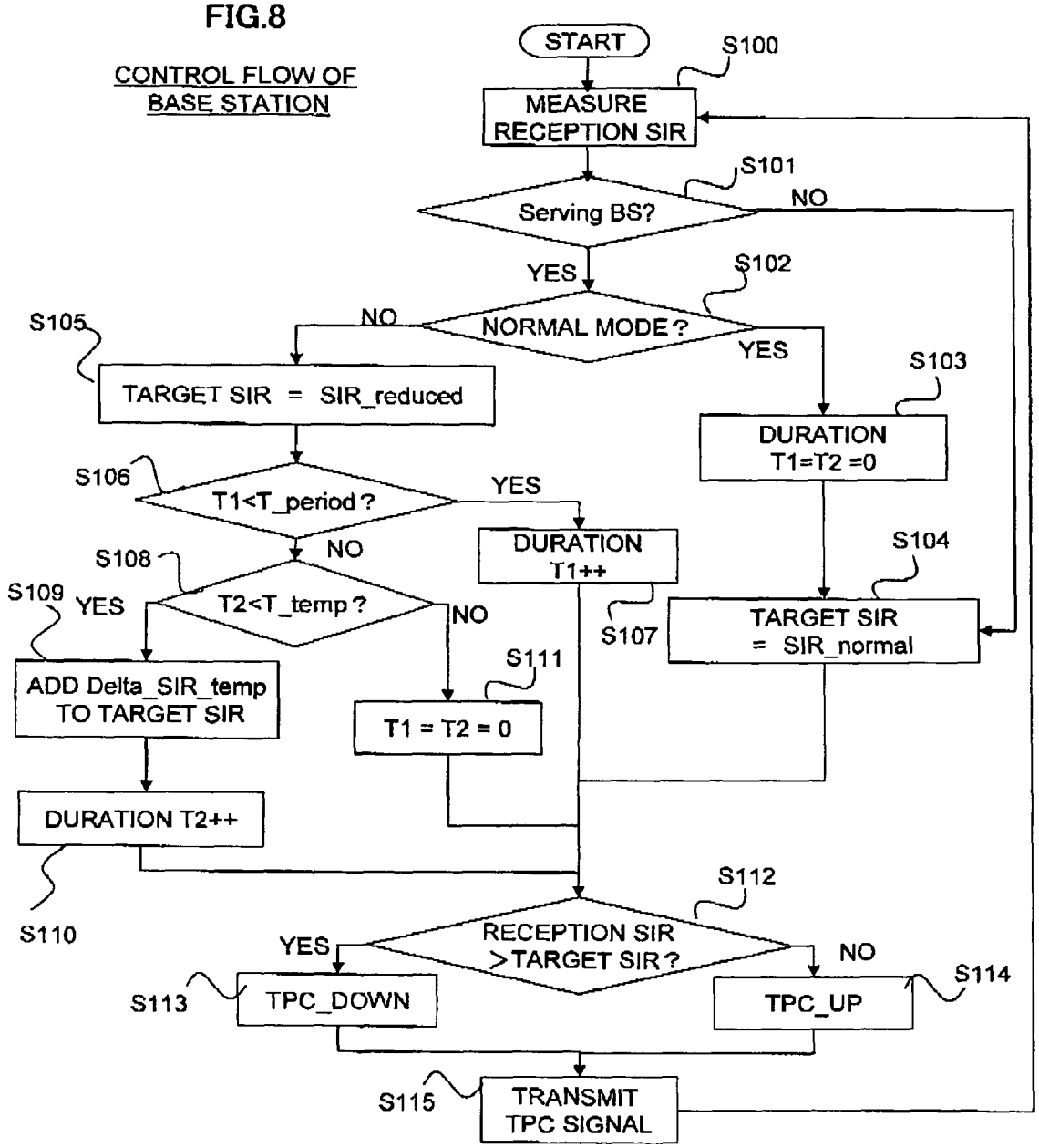
FIG. 8 is a flow chart showing an operation flow of mobile station uplink transmission power control performed for each slot by the base station according the first embodiment of the present invention.

FIG. 8 is a flow chart showing an operation flow of mobile station uplink transmission power control performed by the base station according the first embodiment of the present invention. The reception quality measurement section 103 in the base station measures the reception SIR of a pilot signal transmitted through DPCCH (step S100). The target SIR setting section 106 determines whether or not the self base station is a serving base station to the mobile station in question, based on the information that is notified from the base station controller, wherein the information is stored in the memory (not shown) and is used to determine whether or not the self base station is a serving base station to a mobile station. When it is determined that the self base station is not a serving base station to the mobile station in question (NO in step S101), the target SIR setting section 106 sets the target SIR at SIR_normal (step S104), and the control moves to step S112.

On the other hand, the mode setting section 110 determines whether or not the self base station is a serving base station to the mobile station in question, based on the information that is notified from the base station controller, is stored in the memory (not shown), and is used to determine whether or not the self base station is a serving base station to a mobile station. When the self base station is a serving base station to the mobile station in question (YES in step S101), the mode setting section 110 determines which of the normal mode and reduced power mode the mobile station is in, based on the amount of uplink data and the amount of downlink data managed by the EUDCH scheduler 111 and the HSDPA scheduler 112, respectively (S102). Note that the method of determining whether or not a mobile station is in the reduced power mode has no essential influence on the principle of the present invention, and various determination methods can be used. An example of the methods has already been described, and therefore description thereof will be omitted.

When it is determined by the mode setting section 110 that the mobile station is in the normal mode (YES in' step S102), durations T1 and T2, managed for each mobile station, are both set at zero (step S103). The target SIR setting section 106 sets the target SIR at SIR_normal (step S104), and the control moves to step S112.

When it is determined by the mode setting section 110 that the mobile station is in the reduced power mode (NO in step S102), the target SIR setting section 106 temporarily determines that the target SIR is SIR_reduced (step S105). Thereafter, the target SIR setting section 106 compares the duration T1 with the temporary increase period T_period (step S106). When T1 is shorter than T_period (YES in step S106), T1 is incremented by one (step S107), and the control moves to step S112.

On the other hand, when T1 is not shorter than T_period (NO in step S106), the target SIR setting section 106 compares the duration T2 with the temporary increase duration T_temp (step S108). When T2 is shorter than T_temp (YES in step S108), Delta_SIR_temp is added to the temporarily determined value of the target SIR (step 109). That is, Target SIR=SIR_reduced+Delta_SIR_temp [dB]. Thereafter, the target SIR setting section 106 increments T2 by one (step S110), and the control moves to step S112. On the other hand, when T2 is not shorter than T_temp (NO in step S108), T1 and T2 are both reset to zero (step S111), and the control moves to step S112.

In step S112, the transmission power control section 107 compares the value of the target SIR determined by the target SIR setting section 106 with the reception SIR measured in step S100. When the reception SIR is higher than the target SIR (YES in step S112), the transmission power control section 107 generates a TPC signal (TPC_DOWN) instructing that the transmission power be reduced (step S113). When the reception SIR is lower than the target SIR, the transmission power control section 107 generates a TPC signal (TPC_UP) instructing that the transmission power be increased (step S114). The transmission processing section 102 maps the generated TPC signal to downlink DPCCH and transmits it to the mobile station (step S115).

As described above, according to the present embodiment, for a mobile station as to which a base station has determined that the base station itself is a serving base station and that the mobile station is in the reduced power mode, the base station sets the target SIR at a value that is not smaller than SIR-reduced and not larger than SIR_normal, only for the predetermined duration (T_temp), at every predetermined period (T_period). Therefore, it can be avoided that the reception SIR of DPCCH from the mobile station in question stays equal to or lower than the sync-securing quality threshold SIR_th for a long time (see FIG. 4). Accordingly, the probability of generating Out-of-sync can be reduced, making it possible to solve the problem that RL_Failure is notified to the base station controller.

1.6) Operation of Base Station Controller

Figure 9:
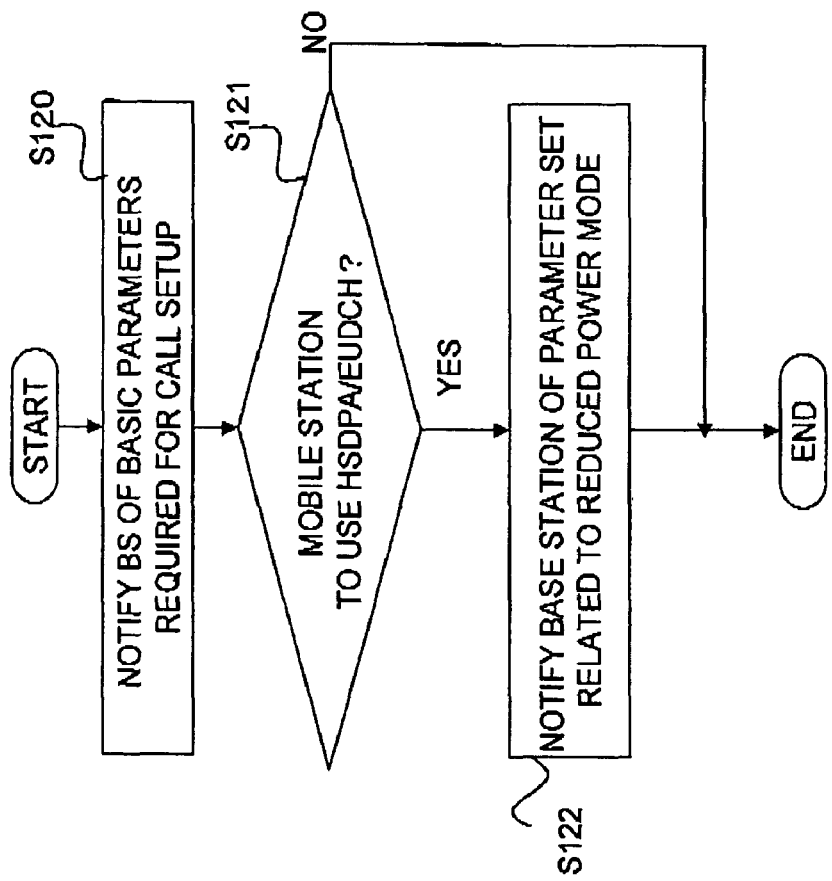
FIG. 9 is a flow chart showing an operation flow of parameter setting performed by the base station controller according to the first embodiment of the present invention when data transmission/reception to/from a mobile station is started.

FIG. 9 is a flow chart showing an operation flow of parameter setting performed by the base station controller when a mobile station starts data transmission/reception, according to the first embodiment of the present invention. The control section 121 in the base station controller 10 notifies a base station of basic parameters required for call setup when data transmission/reception to/from a mobile station in question is started (step S120). For example, the parameters related to the present invention include the target SIR in the normal mode (SIR_normal), the number of generations of Out-of-sync (N_OUTSYNC_IND) serving as a trigger for the sync station management section to start a timer, the timer's period threshold value (T_RLFAILURE) serving as a trigger to notify RL_Failure, and the like.

Moreover, the control section 121 determines whether or not HSDPA or EUDCH is used for this data transmission/reception, based on the service of the data to start to transmit/receive and wireless resource information transmitted from the base station (step S121). When it is determined that HSDPA or EUDCH is used (YES in step S121), the control section 121 notifies the base station of a set of parameters related to the reduced power mode, as information about the mobile station in question (step S122). Here, the set of parameters related to the reduced power mode includes the following, for example.

Temporary increase period (every T_period [slot])
Temporary increase duration (T_temp [slot])
Temporary increase amount (Delta_SIR_temp [dB])

It suffices that these parameters related to the reduced power mode are notified to a serving base station, and these parameters do not need to be notified to a non-serving base station. In addition, when the control section 121 determines that neither HSDPA nor EUDCH is used for the mobile station in question (NO in step S121), the set of parameters related to the reduced power mode is not notified as information about the mobile station.

1.7) Operation of Mobile Station

Figure 10:
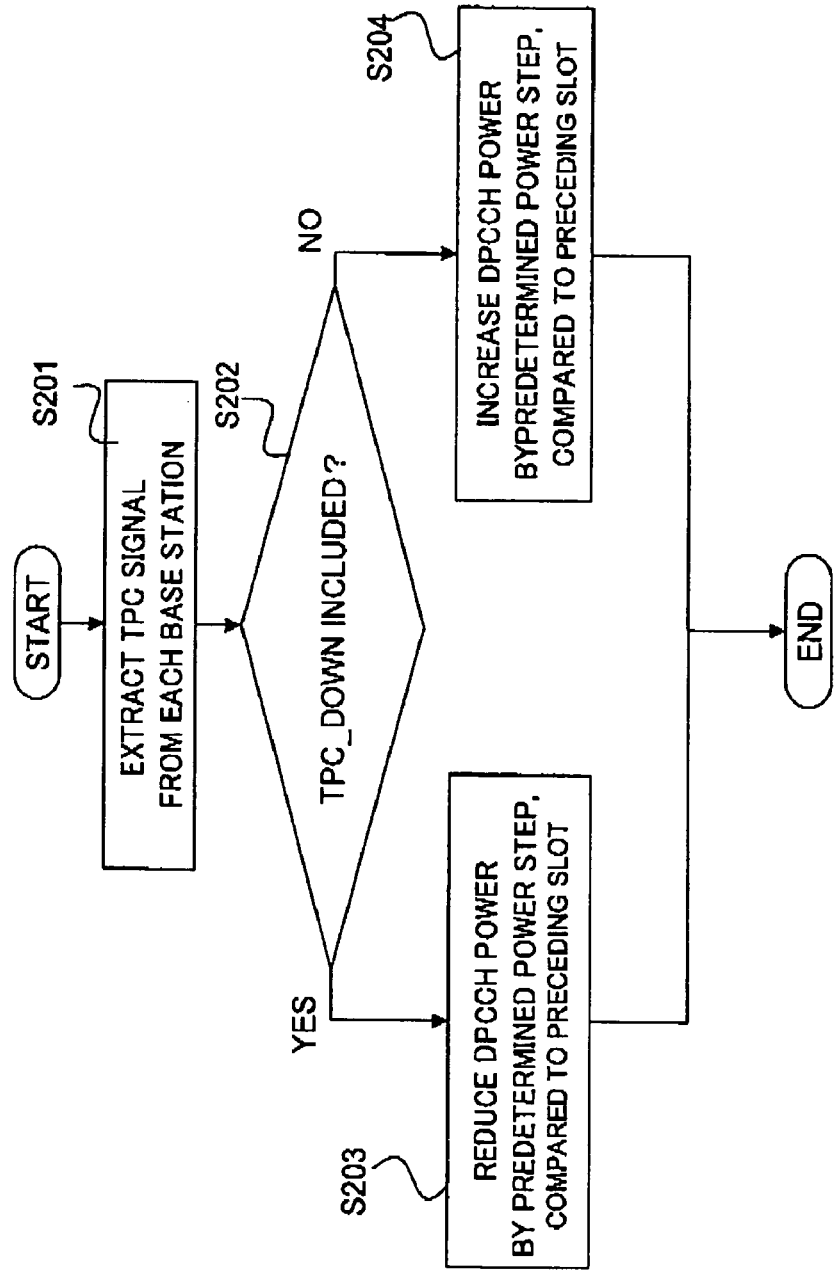
FIG. 10 is a flow chart showing an operation flow of the mobile station according to the first embodiment of the present invention when the mobile station determines DPCCH transmission power for each slot.

FIG. 10 is a flow chart showing an operation flow of the mobile station when the mobile station determines DPCCH transmission power for each slot, according to the first embodiment of the present invention. The reception processing section 201 in the mobile station extracts a TPC signal included in a slot of DPCCH transmitted from each base station (step 9201). The TPC signal determination section 203 determines whether or not TPC_DOWN is included in the extracted TPC signals (step S202). When TPC_DOWN is included (YES in step S202), the transmission power setting section 204 determines that the DPCCH transmission power is a power value obtained by reducing a power value for the preceding slot by a predetermined power value (step S203). Otherwise (NO in step S202), the transmission power setting section 204 determines that the DPCCH transmission power is a power value obtained by increasing the power value for the preceding slot by a predetermined power value (step S204). The mobile station repeats the above operations for each slot.

1.8) Advantages of First Embodiment

As described above, according to the first embodiment of the present invention, during the reduced power mode, the serving base station operates so as to set the target SIR at a value higher than SIR_reduced, which is a value of the target SIR in the reduced power mode, at every predetermined period. By doing so, the DPCCH transmission power of the mobile station is periodically increased even during the reduced power mode. Therefore, the reception SIR of this mobile station is also periodically improved both at the serving and non-serving base stations, making it possible to reduce the probability that the reception SIR deteriorates below the sync-securing quality threshold SIR_th for a long time. Consequently, the frequency with which the serving and non-serving stations generate Out-of-sync can be reduced, making it possible to solve the problem that the base station controller disconnects a dedicated channel, and the like as described earlier. In addition, since the number of control signals exchanged between the base station controller and base stations can be reduced, the load on a network can be reduced.

Incidentally, in the present embodiment, the base station controller determines the parameters (Delta_SIR_temp, T_period, T_temp) required for a temporary increase in the target SIR during the reduced power mode and notifies them to a base station. However, the present invention is not limited to this. The base station may determine some or all of these parameters on its own.

Moreover, although SIR_reduced, which is a value of the target SIR in the reduced power mode, is determined by each base station on its own in the present embodiment, the base station controller may determine SIR_reduced as an absolute value, or as a value relative to a value of the target SIR in the normal mode, and notify it to a base station.

Further, in the present embodiment, the parameter Delta_SIR_temp, required to set SIR_temp, is a difference by which SIR_reduced is increased. However, the present invention is not limited to this. The parameter Delta_SIR_temp may be a difference by which SIR_normal is decreased. That is, it can be set that SIR_temp=SIR_normal−Delta_SIR_ temp.

Furthermore, in the present embodiment, the temporary increase period and the temporary increase duration are designated in terms of the number of slots, and the corresponding periods of time is measured in terms of the number of slots. However, the present invention is not limited to this. The temporary increase period and the temporary increase duration may be designated on a time basis, and the measurement may be carried out by measuring time. In addition, although the sync detection section 104 carries out sync detection based on the reception SIR of a pilot signal, sync detection can also be carried out based on, for example, the reception quality of a TPC signal transmitted through uplink DPCCH.

Note that in the present embodiment, it suffices that the target SIR can be intermittently increased so that a dedicated channel is not disconnected during the reduced power mode. The present invention does not depend on the base technology of the above-described system.

2. Second Embodiment

In the above-described first embodiment, a serving base station increases the target SIR of uplink DPCCH for a mobile station being in the reduced power mode, by a predetermined amount at every predetermined period, whereby the DPCCH transmission power of the mobile station is increased, and the reception SIR at a base station is improved. However, according to a second embodiment of the present invention, a mobile station autonomously increases the DPCCH power by a predetermined amount at every predetermined period. Thereby, effects similar to the first embodiment can be obtained.

2.1) Base Station

Figure 11:
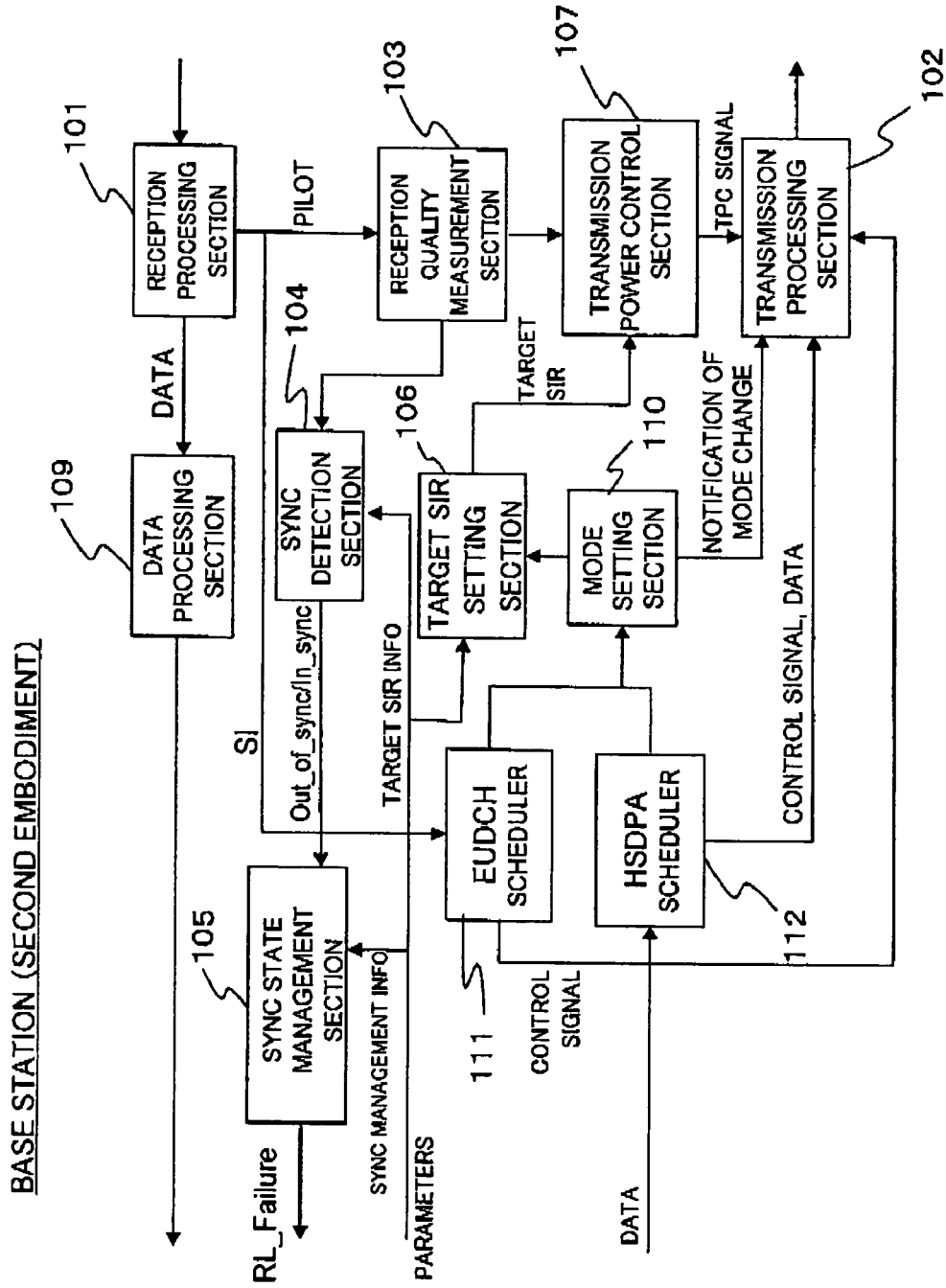
FIG. 11 is a block diagram showing a functional configuration of a base station according to a second embodiment of the present invention.

FIG. 11 is a block diagram showing a functional configuration of a base station according to the second embodiment of the present invention. Here, shown is an example of the functional configuration related to the present invention. Note that the same reference numerals as in FIG. 5 are used for the blocks having functions similar to the functional blocks of the first embodiment shown in FIG. 5, and description thereof will be omitted.

The base station according to the second embodiment is different from the base station according to the first embodiment in the following points. In the first embodiment, when the mode of a mobile station is changed, the mode setting section 110 notifies the target SIR setting section 106 of the ID of the mobile station and the new mode after change. In the base station according to the second embodiment, in addition to the above operation of the mode setting section 110, the mode setting section 110 generates a mode change notification signal and outputs it to the transmission processing section 102.

Moreover, in the case of the base station according to the first embodiment, the base station controller notifies the target SIR setting section 106 of the parameters required to set SIR_temp as the target SIR information, specifically, information about the temporary increase period, temporary increase duration, and temporary increase amount. However, in the second embodiment, this information is not notified. Therefore, a serving base station according to the second embodiment, unlike a serving base station according to the first embodiment, does not increase the target SIR by Delta_SIR_temp at every T_period for a mobile station in the reduced power mode, but always sets the target SIR at SIR_reduced for a mobile station in the reduced power mode.

Prior to the start of data transmission/reception, the transmission processing section 102 transmits information required to set SIR_temp to a mobile station in question. Moreover, upon receipt of a mode change notification, the transmission processing section 102 multiplexes this notification with other data and control signals and transmits them to the mobile station in question.

2.2) Base Station Controller

The configuration of a base station controller according to the second embodiment is the same as the base station controller according to the first embodiment shown in FIG. 6, and therefore description thereof will be omitted. The base station controller according to the second embodiment is different from the base station controller according to the first embodiment in that the control section 121 does not transmit the temporary increase period, temporary increase duration, and temporary increase amount, which are transmitted to a base station as the parameters related to sync detection in the first embodiment. Instead, the base station controller according to the second embodiment notifies each mobile station, via a base station, of parameters related to a power increase during the reduced power mode, as part of data.

2.3) Mobile Station

Figure 12:
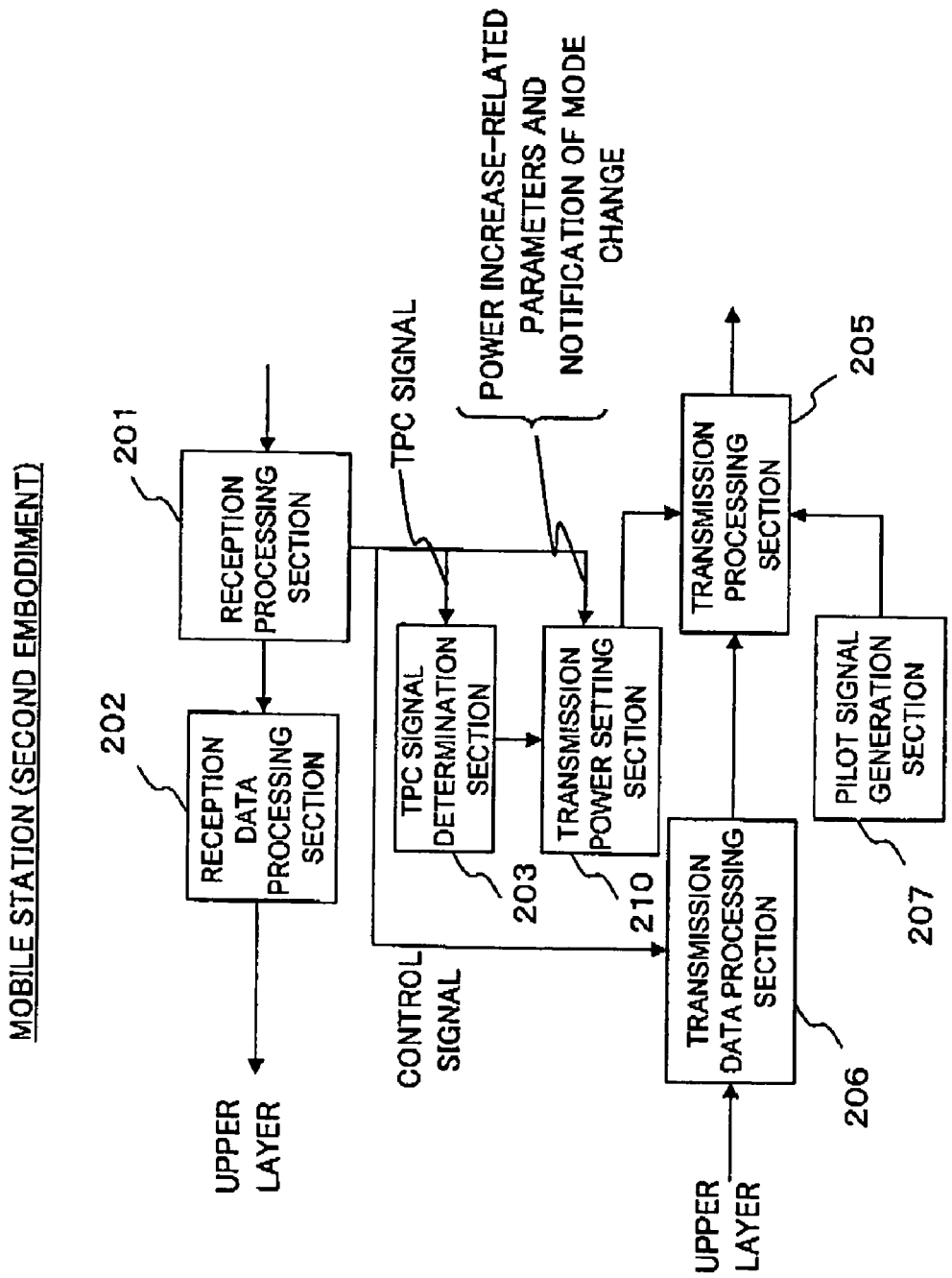
FIG. 12 is a block diagram showing a functional configuration of a mobile station according to the second embodiment of the present invention.

FIG. 12 is a block diagram showing a functional configuration of a mobile station according to the second embodiment of the present invention. Note that the same reference numerals as in FIG. 7 are used for the blocks having functions similar to those of the mobile station according to the first embodiment shown in FIG. 7, and description thereof will be omitted.

In the mobile station according to the second embodiment shown in FIG. 12, the reception processing section 201 separates out the power increase-related parameters (temporary increase period T_period, temporary increase duration T_temp, and temporary increase amount Delta_SIR_temp) transmitted from a base station, and outputs them to a transmission power setting section 210. Moreover, when receiving a mode change notification from a base station, the reception processing section 201 also outputs it to the transmission power setting section 210. The transmission power setting section 210 records a current mode on a memory (not shown) based on the mode change notification. When the current mode is the reduced power mode, the mobile station transmits DPCCH at a power value obtained by adding the temporary increase amount Delta_SIR_temp to the DPCCH transmission power, only for the temporary increase duration T_temp, at every temporary increase period T_period according to the measurement value of a timer (not shown). Note that a control section for controlling the operations of the entire mobile station is not shown in FIG. 12.

2.4) Operation of Base Station

Figure 13:
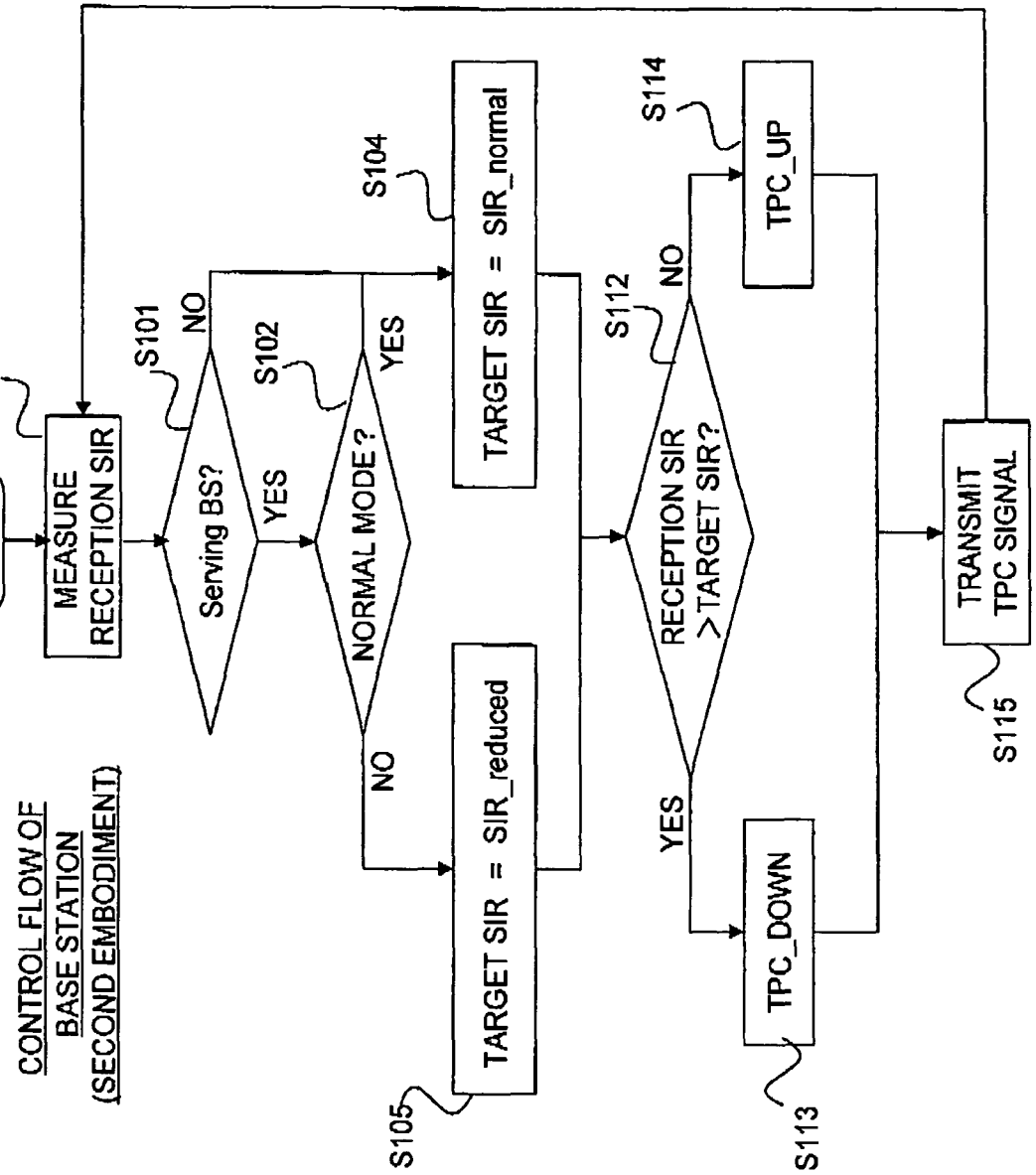
FIG. 13 is a flow chart showing an operation flow of mobile station uplink transmission power control performed for each slot by the base station according to the second embodiment of the present invention.

FIG. 13 is a flow chart showing an operation flow of mobile station uplink transmission power control performed for each slot by the base station according to the second embodiment of the present invention. Note that the same reference symbols and numerals as in FIG. 8 are used for the steps of the same operations as those of the base station according to the first embodiment shown in FIG. 8. The operations of the base station according to the second embodiment are different from the operations of the base station according to the first embodiment in the following point. In the first embodiment, when the base station determines that the base station itself is a serving base station to a mobile station in question and that the mobile station is in the reduced power mode, the target SIR is set at SIR_reduced in step S105, followed by the steps of measuring the durations T1 and T2. However, the second embodiment has no such steps. Instead, in the second embodiment, the target SIR is always set at SIR_reduced while the mobile station in question is in the reduced power mode. The specific operations are as follows.

Referring to FIG. 13, the reception quality measurement section 103 in the base station measures the reception SIR of a pilot signal transmitted through DPCCH (step S100). When the self base station is not a serving base station to a mobile station in question (NO in step S101), the target SIR setting section 106 sets the target SIR at SIR_reduced (step S104), and the control moves to step S112.

On the other hand, when the self base station is a serving base station to the mobile station in question (YES in step S101), the mode setting section 110 determines which of the normal mode and reduced power mode the mobile station is in, based on the amount of uplink data and the amount of downlink data managed by the EUDCH scheduler 111 and the HSDPA scheduler 112, respectively (step S102). Note that the method of determining whether or not a mobile station is in the reduced power mode has no influence on the principle of the present invention, and various determination methods can be used. An example of the methods has already been described, and therefore description thereof will be omitted.

When it is determined that the mobile station is in the normal mode (YES in step S102), the target SIR setting section 106 sets the target SIR at SIR_normal (step S104), and the control moves to step S112.

When it is determined that the mobile station is in the reduced power mode (NO in step S102), the target SIR setting section 106 temporarily determines that the target SIR is SIR_reduced (step S105), and the control moves to step S112.

In step S112, the transmission power control section 107 compares the value of the target SIR determined by the target SIR setting section 106 with the reception SIR measured in step S100. When the reception SIR is higher than the target SIR (YES in step S112), the transmission power control section 107 generates a TPC signal (TPC_DOWN) instructing that the transmission power be reduced (step S113). When the reception SIR is lower than the target SIR, the transmission power control section 107 generates a TPC signal (TPC_UP) instructing that the transmission power be increased (step S114). The transmission processing section 102 maps the generated TPC signal on downlink DPCCH and transmits it to the mobile station (step S115). As described above, the target SIR is always set at SIR_reduced while the mobile station is in the reduced power mode.

2.5) Operation of Base Station Controller

An operation flow of the base station controller according to the second embodiment is basically the same as the operation flow of the base station controller according to the first embodiment shown in FIG. 9, and therefore detailed description thereof will be omitted. The operations of the base station controller according to the second embodiment is different from the operations of the base station controller according to the first embodiment only in that the temporary increase amount included in the set of parameters related to the reduced power mode is not an amount by which the target SIR is increased at a base station, but an amount by which the DPCCH power is increased at a mobile station.

2.6) Operation of Mobile Station

Figure 14:
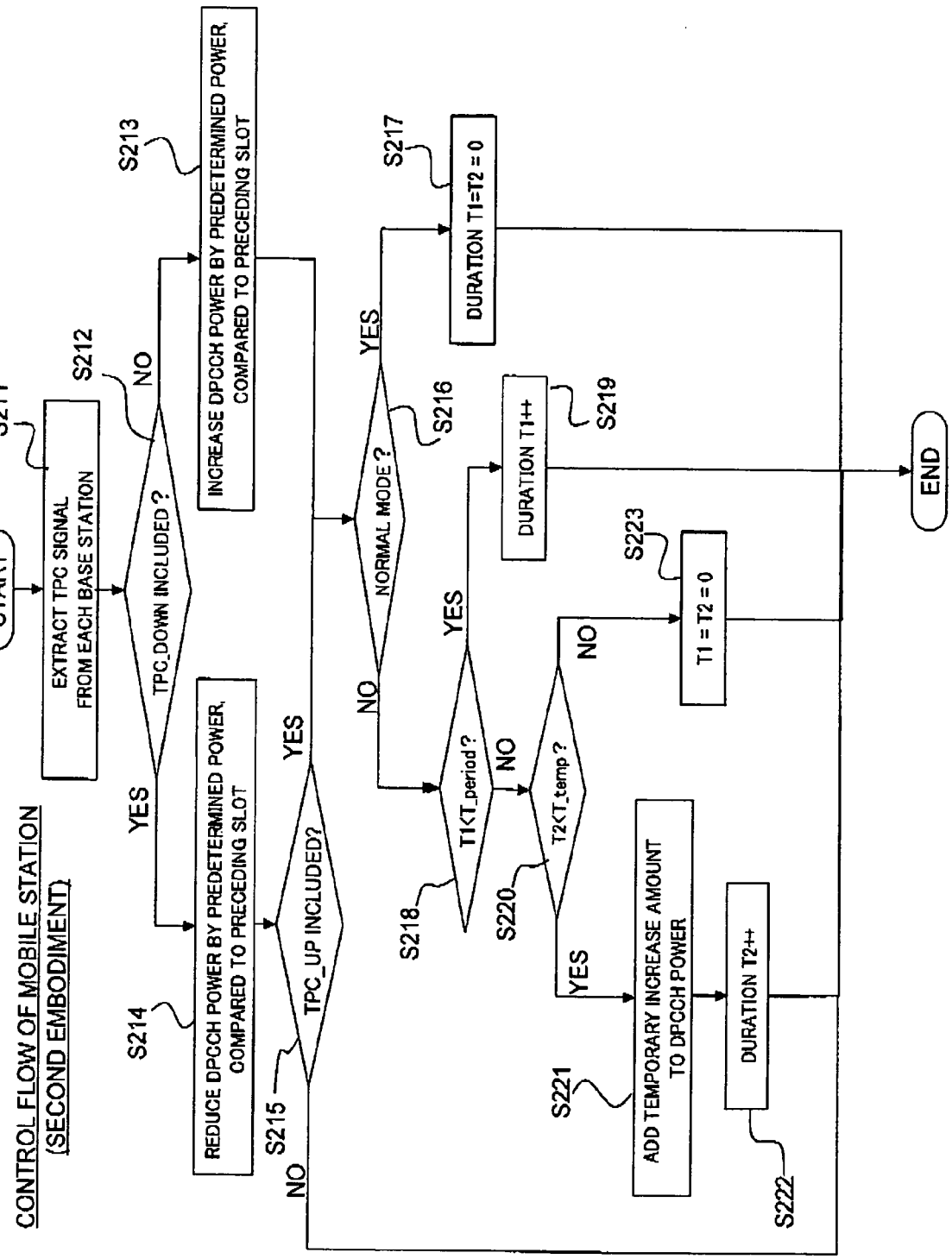
FIG. 14 is a flow chart showing an operation flow of the mobile station according to the second embodiment of the present invention when the mobile station determines DPCCH transmission power for each slot.

FIG. 14 is a flow chart showing an operation flow of the mobile station when the mobile station determines DPCCH transmission power for each slot, according to the second embodiment of the present invention. The operations of the mobile station according to the second embodiment are different from the operations of the mobile station according to the first embodiment in the following point. The DPCCH power for the next slot is temporarily determined based on an extracted TPC signal (steps S213 and S214), and when no TPC_UP is included in the extracted TPC signal (No in step S215), this temporarily determined DPCCH power is formally determined. Otherwise, the value of the DPCCH power is adjusted depending on whether or not the mobile station is in the normal mode (step S216 and thereafter).

Referring to FIG. 14, the reception processing section 201 in the mobile station extracts a TPC signal included in a slot of DPCCH transmitted from each base station (step S211), and the TPC signal determination section 203 determines whether or not TPC_DOWN is included in the extracted TPC signals (step S212). When TPC_DOWN is included (YES in step S212), the transmission power setting section 204 temporarily determines that the DPCCH transmission power is a power value obtained by reducing the power for the preceding slot by a predetermined power (step S214). Otherwise (NO in step S212), the transmission power setting section 204 temporarily determines that the DPCCH transmission power is a power value obtained by increasing the power for the preceding slot by a predetermined power (steps S213). The predetermined power, which is the amount of an increase or a decrease, may be a fixed value determined beforehand, or may be changed as occasion requires.

After the reduced DPCCH transmission power is temporarily determined in step S214, the TPC signal determination section 203 determines whether or not TPC_UP is included in the extracted TPC signals (step S215). When TPC_UP is included (YES in step S215), the transmission power setting section 210 determines whether or not the current mode recorded on the memory in the transmission power setting section 210 is the normal node (step S216). When the current mode is the normal mode (YES in step S216), the durations T1 and T2, managed in the transmission power control, are both set at zero (step S217), and the temporarily determined power value is formally determined.

On the other hand, when the current mode recorded on the memory is the reduced power mode (NO in step S216), the transmission power setting section 210 compares the managed duration T1 with the temporary increase period T_period. When T1 is shorter than T_period (YES in step S218), T1 is incremented by one (step S219), and the temporarily determined power value is formally determined.

On the other hand, when T1 is not shorter than T_period (NO in step S218), the transmission power setting section 210 compares the duration T2 with the temporary increase duration T_temp. When T2 is shorter than T_temp (YES in step S220), the temporary increase amount is added to the temporarily determined power value (step S221). Then, the transmission power setting section 210 increments T2 by one (step S222). When T2 is not shorter than T_temp (NO in step S220), T1 and T2 are both reset to zero (step S223), and the temporarily determined power value is formally determined. At the transmission power value thus determined, the mobile station transmits the next slot of DPCCH.

2.7) Advantages of Second Embodiment

As described above, according to the second embodiment of the present invention, in the reduced power mode, a mobile station transmits DPCCH while increasing the DPCCH transmission power by a predetermined value at every predetermined period. Therefore, it can be avoided that the reception SIR of DPCCH from the mobile station, at a base station, deteriorates below the sync-securing quality threshold SIR_th for a long time. Accordingly, the probability that the serving and non-serving base stations generate Out-of-sync can be reduced, making it possible to solve the problem that RL_Failure is notified to the base station controller.

Incidentally, in the present embodiment, when the mode is changed to the reduced power mode, the base station notifies the mode change to the mobile station. However, the present invention is not limited to this. For example, when any one, or both, of the transmission and reception of data has not been performed for a predetermined period of time, the mobile station may periodically perform the temporary power increase, as in the case where the mobile station receives from the base station a notification of changing to the reduced power mode in the present embodiment.

Moreover, in the present embodiment, the base station controller determines the parameters (Delta_SIR_temp, T_period, and T_temp) required for the temporary power increase during the reduced power mode and notifies them to the mobile station. However, the present invention is not limited to this. For example, the base station may determine some or all of these parameters and notify them to the mobile station. Alternatively, the mobile station may determine some or all of these parameters on its own.

Further, although the reduced quality SIR_reduced in the reduced power mode is determined by each base station on its own in the present embodiment, the base station controller may determine SIR_reduced as an absolute value or a value relative to SIR_normal, which is a value of the target SIR in the normal mode, and notify it to each base station.

Note that in the present embodiment, it suffices that a mobile station can autonomously increase the transmission power periodically so that the dedicated channel is not disconnected during the reduced power mode. Accordingly, the present invention does not depend on the base technology of the above-described system.

3. Third Embodiment

In a third embodiment, a base station determines the value of the reduced quality SIR_reduced in the reduced power mode. In this event, the base station determines SIR_reduced based on the information about the sync-securing quality threshold SIR_th of the base station itself so that the reception SIR during the reduced power mode does not become equal to or lower than the sync-securing quality threshold SIR_th. Thereby, the probability that a serving base station generates Out-of-sync during the reduced power mode can be reduced, making it possible to solve the problem that the load on a network is increased due to a disconnection of a dedicated channel and increased control signals.

Figure 15:
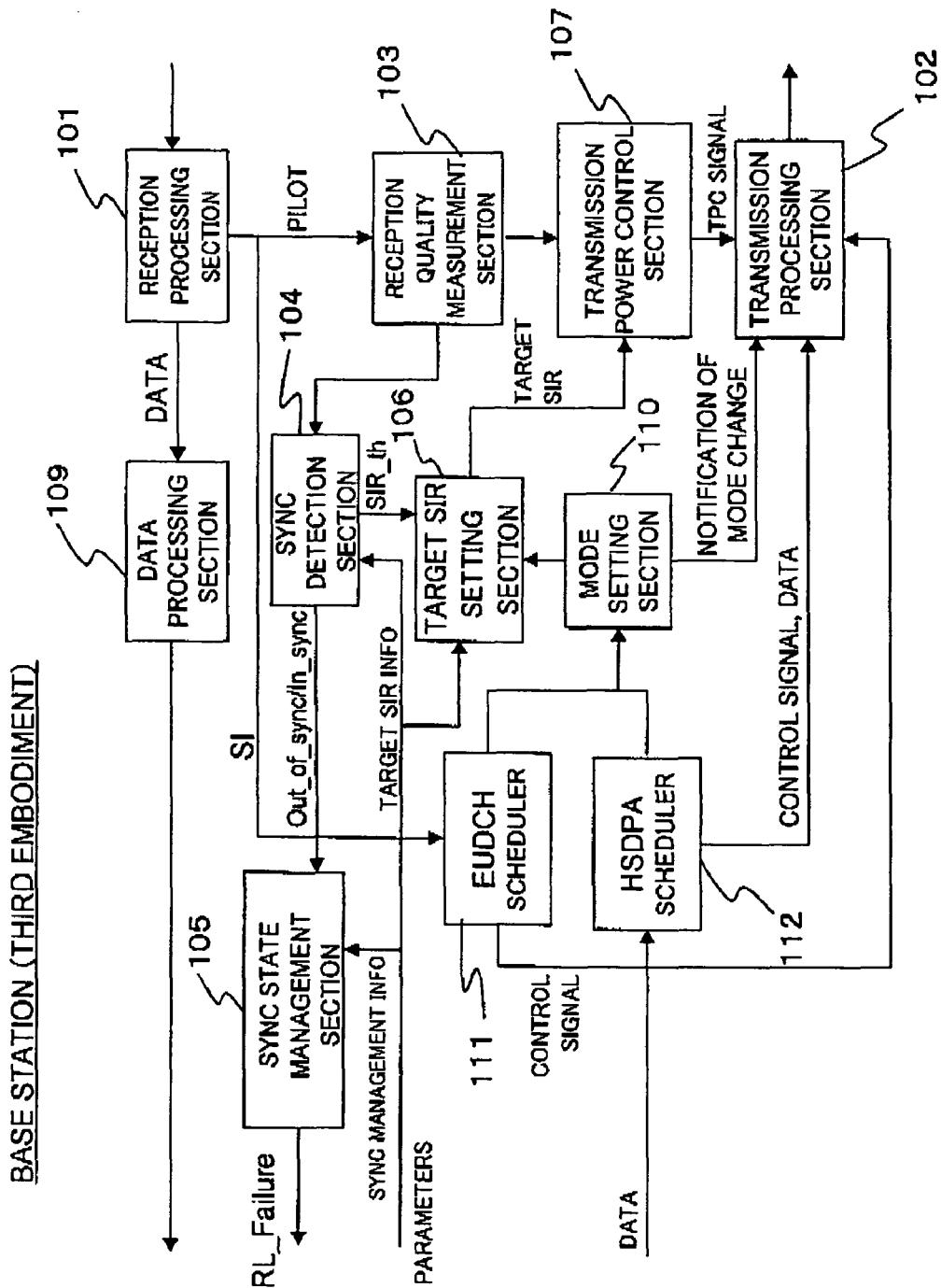
FIG. 15 is a block diagram showing a functional configuration of a base station according to a third embodiment of the present invention.

FIG. 15 is a block diagram showing a functional configuration of a base station according to the third embodiment of the present invention. Here, shown is an example of the functional configuration related to the present invention. Note that the same reference numerals as in FIG. 5 are used for the blocks having functions similar to the functional blocks of the first embodiment shown in FIG. 5, and description thereof will be omitted.

The point different from the first embodiment is that the target SIR setting section 106 refers to the sync-securing quality threshold SIR_th in the sync detection section 104 and determines SIR_reduced so that SIR_reduced does not fall below SIR_th. The rest of the configuration and operations according to the third embodiment are similar to the first embodiment, and therefore description thereof will be omitted. Moreover, the configurations and operation flows of a base station controller and a mobile station according to the third embodiment are also similar to the first embodiment, and therefore description thereof will be omitted.

Note that in the present embodiment, it suffices that SIR_reduced equal to or higher than the sync-securing quality threshold SIR_th can be determined so that a dedicated channel is not disconnected during the reduced power mode. The present invention does not depend on the base technology of the above-described system.

4. Fourth Embodiment

According to a fourth embodiment of the present invention, it is designed that a base station controller can designate, to a serving base station, the range of SIR_reduced, for example, a maximum decrease amount (Max_Delta_SIR_reduced ) from SIR_normal, and the serving base station can determine SIR_reduced within the designated range.

4.1) Basic Principle

Figure 16:
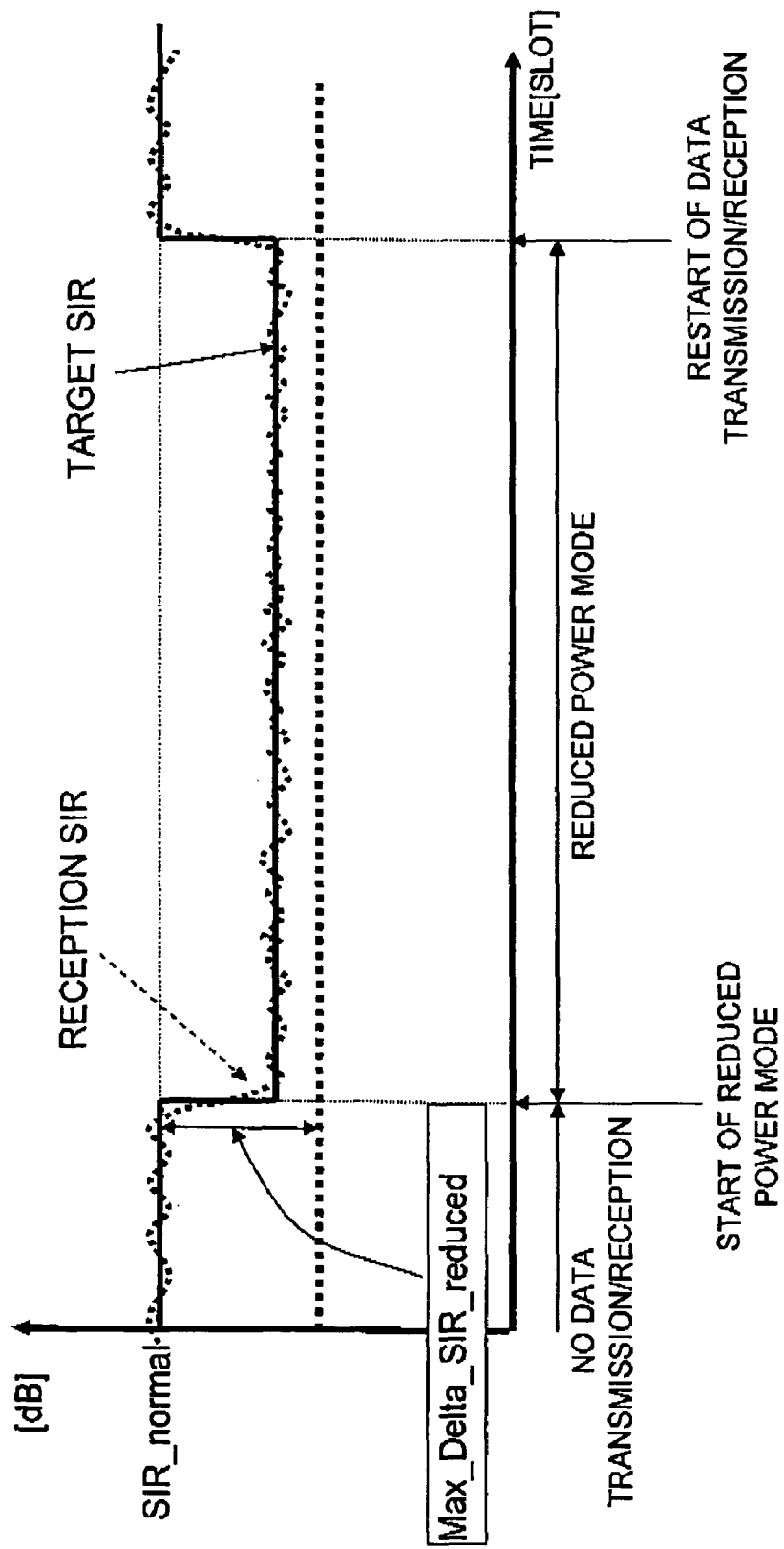
FIG. 16 is a time chart showing changes in reception quality over time at a serving station when transmission power control according to a fourth embodiment of the present invention is carried out.

FIG. 16 is a time chart showing changes in the reception quality over time at a serving base station when transmission power control according to the fourth embodiment of the present invention is carried out. Each base station is notified, from a base station controller, of the lower limit of SIR_reduced in the reduced power mode, for example, the maximum decrease amount (Max_Delta_SIR reduced) from SIR_normal. When the reduced power mode is started, a base station decreases the target SIR from SIR_normal. Such a decrease in SIR is determined to be a desired value that does not exceeds the maximum difference Max_Delta_SIR_reduced. Accordingly, the base station can arbitrarily determine SIR_reduced so that the reception SIR does not fall below the sync-securing quality threshold SIR_th.

4.2) Operational Advantages

According to the fourth embodiment, the target SIR can be set within a given permissible range. Therefore, in addition to the above-mentioned advantages of the third embodiment, the fourth embodiment has the following advantages.

a) The base station controller can perform quality control based on the priority, service class or the like of each mobile station. For example, it is conceivable that for a mobile station of a special member having a higher service class, the target SIR is set higher than a general quality level in the reduced power mode even if the mobile station is in the reduced power mode. By doing so, when the mobile station changes from the reduced power mode to the normal mode, since the mobile station of the special member can increase its transmission power to a power in the normal mode faster, a delay occurring when data transmission/reception is started can be reduced. Moreover, since the rate of power decrease during the reduced power mode is low, it is possible to reduce the probability that a dedicated channel is disconnected due to quality deterioration. As a specific example, settings can be made such that the maximum difference for a mobile station having higher priority, Max_Delta_SIR_reduced(S), is 3 dB, and the maximum difference for a mobile station in general, Max Delta_SIR_reduced(R), is 6 dB.

Based on this information, a base station obtains the target SIR in the reduced power mode (=SIR_reduced) from the target SIR in the normal mode (=SIR_normal) by using the following equation:

$$SIR\_reduced = \max[(SIR\_normal - Max\_Delta\_SIR\_reduced), (SIR\_th + \Delta\_margin)] \quad (1)$$

where $\Delta\_margin$ is a margin and is assumed to be a value of approximately 1 dB, for example.

b) The base station controller sets the range depending on whether or not soft handover (SHO) is being carried out, whereby it is possible to reduce the probability that a non-serving base station generates RL_Failure. For example, the range is set such that the lower limit becomes higher during SHO than when SHO is not being carried out.

As described earlier, in many cases, a non-serving base station has a larger path loss and hence lower reception quality than those of a serving base station during SHO. Accordingly, even if the serving base station sets the target SIR in the reduced power mode such that the reception quality at the serving base station does not fall below the sync-securing quality threshold SIR_th, there are some cases where the reception quality at the non-serving station falls below the sync-securing quality threshold SIR_th. Therefore, the lower limit of the target SIR, which can be set by the serving base station, is set higher during SHO than when SHO is not being carried out, whereby it is possible to reduce the probability that the reception quality at the non-serving base station falls below the sync-securing quality threshold. As a specific example, settings can be made such that Max_Delta_SIR reduced is set at 6 dB when SHO is not being carried out, and Max_Delta SIR_reduced is set at 3 dB during SHO.

Based on this information, a base station obtains the target SIR in the reduced power mode, for example, by using the following equation (2):

$$SIR\_reduced = \max[(SIR\_normal - Max\_Delta\_SIR\_reduced), (SIR\_th + \Delta\_margin)] \quad (2).$$

c) To more effectively make the settings during SHO, the base station controller may set the range, with consideration given to a difference in path loss between the paths from the mobile station to a serving base station and to a non-serving base station. For example, the base station controller receives, from each base station, information about the result of measurement of the reception quality of a dedicated channel transmitted from the mobile station (here, the reception SIR at a serving base station is assumed to be SIR_srv [dB], and the reception SIR at a non-serving base station is assumed to be SIR_nsrv [dB]). Then, the base station controller calculates a path loss difference $\Delta$ (=SIR_srv−SIR_nsrv [dB]) and notifies it to the serving base station as information about the range.

Based on this information, the serving base station determines the target SIR in the reduced power mode such that this target SIR is higher by the path loss difference $\Delta$ than a target SIR that does not fall below the sync-securing quality threshold SIR_th of the serving base station itself. For example, the target SIR in the reduced power mode is obtained by using the following equation:

$$SIR\_reduced = \min\{(SIR\_th + \Delta margin + \Delta), SIR\_normal\} \quad (3)$$

Thereby, if the serving and non-serving base stations have approximately the same sync-securing quality thresholds, then the reception quality that does not fall below the sync-securing quality threshold can be secured even at the non-serving base station. Accordingly, the problem that the reception quality at a non-serving base station deteriorates during SHO can hopefully be solved.

d) In addition, the base station controller may set the range, with consideration given to information about the sync-securing quality threshold of a non-serving base station. As described earlier, the sync-securing quality threshold is a value determined/set by each base station on its own. Therefore, there are some cases where the sync-securing quality threshold of a non-serving base station is higher than the sync-securing quality threshold of a serving base station. In such a case, even if the serving base station sets the target SIR such that the target SIR does not fall below the sync-securing quality threshold of the serving base station itself, the set target SIR is sometimes lower than the sync-securing quality threshold of the non-serving base station.

Therefore, the base station controller receives beforehand information about a set value of the sync-securing quality threshold from each base station, and notifies the serving base station, as the lower limit of the target SIR, of a value larger than the sync-securing quality threshold of the non-serving base station. For example, in the case where the sync-securing quality threshold of the non-serving base station is higher than that of the serving base station by Δ_thrs, the base station controller notifies this to the serving base station, and the serving base station determines the target SIR in the reduced power mode, for example, by using the following equation:

$$SIR\_reduced = \min\{(SIR\_th + \Delta\_margin + \Delta\_thrs), SIR\_normal\} \quad (4)$$

Thereby, the probability that the reception SIR at the non-serving base station becomes equal to or lower than the sync-securing quality threshold can hopefully be reduced.

Additionally, the base station controller can generates and notifies information about the range for the SIR_reduced settings, by using one or more of the above-described conditions. Moreover, the equations (1) to (4) used for a base station to calculate SIR_reduced are examples, and the calculation method is not limited to these. It suffices that SIR_reduced can be calculated based on an equation predetermined according to a condition notified from the base station controller.

4.3) Base Station

Figure 17:
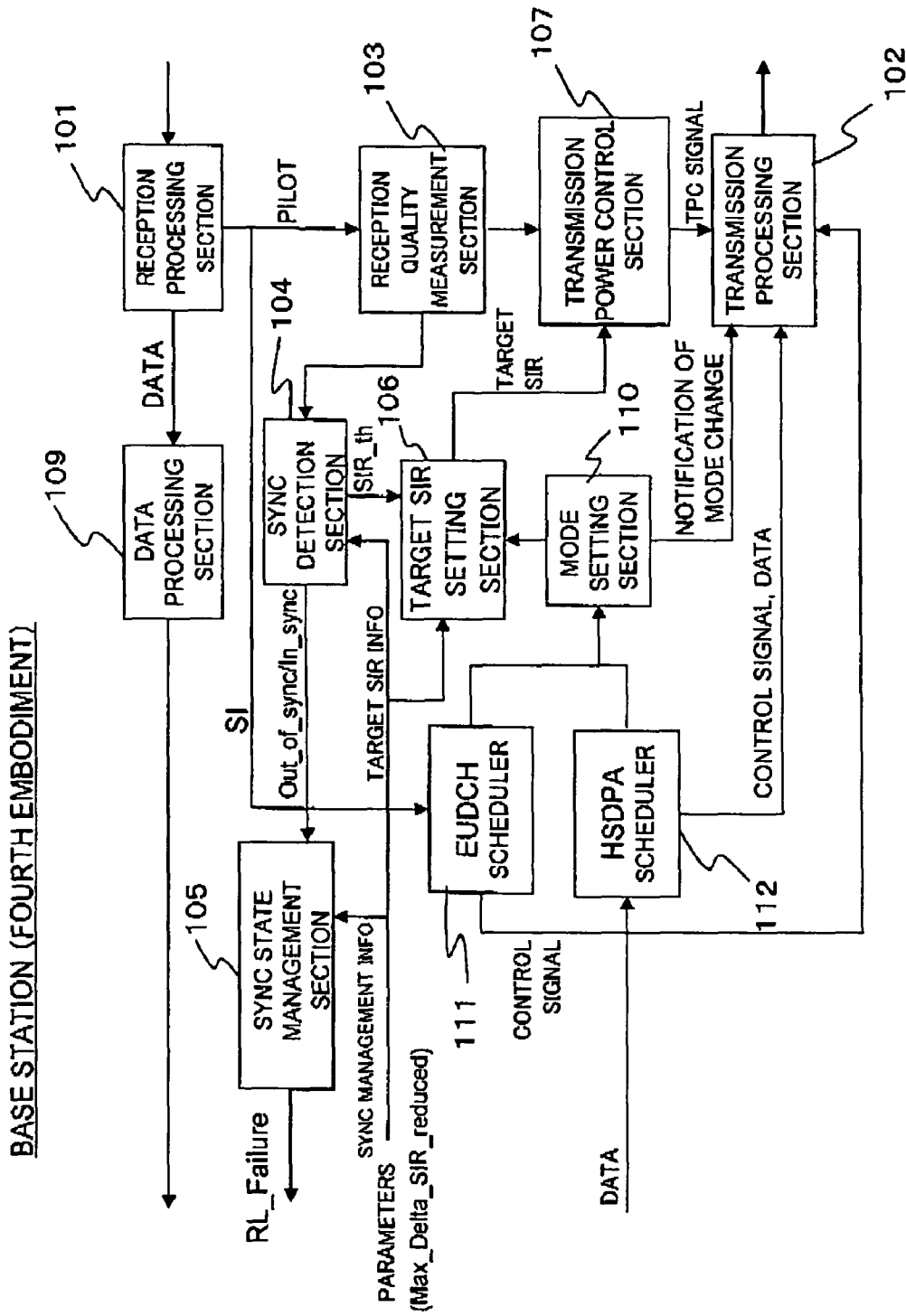
FIG. 17 is a block diagram showing a functional configuration of a base station according to the fourth embodiment of the present invention.

FIG. 17 is a block diagram showing a functional configuration of a base station according to the fourth embodiment of the present invention. Here, shown is an example of the function configuration related to the present invention. Note that the same reference numerals as in FIG. 3 are used for the blocks having functions similar to the functional blocks shown in FIG. 3.

The base station shown in FIG. 17 includes: a reception processing section 101 that receives a signal and performs despreading, signal separation, and the like; a transmission processing section 102 that performs coding, spreading, signal combining, and the like and transmits a signal; a reception quality measurement section 103; a sync detection section 104; a sync state management section 105; a target SIR setting section 106; and a transmission power control section 107. In addition to these, the base station also includes: a data processing section 109 that performs decoding, error detection, and the like; a mode setting section 110; an EUDCH scheduler 111; and a HSDPA scheduler 112. Note that a control section for controlling the operations of the entire base station is not shown.

The reception quality measurement section 103 measures the reception SIR of a pilot signal transmitted through uplink DPCCH and outputs the measurement result to each of the transmission power control section 107 and the sync detection section 104.

When the self base station is a serving base station to a mobile station in question, the mode setting section 110 determines whether or not there is data transmission/reception to/from the mobile station in question, based on the amounts of data, for each base station, managed by the HSDPA scheduler 111 and the EUDCH scheduler 112. When there is no data transmission/reception to/from the mobile station, the mode setting section 110 sets the mobile station in the reduced power mode. Otherwise, the mode setting section 110 sets the mobile station in the normal mode. Moreover, when the self base station is a non-serving base station to the mobile station in question, the mode setting section 10 always sets the mobile station in question in the normal mode. When the mode of the mobile station is changed, the mode setting section 110 notifies the target SIR setting section 106 of the ID of the mobile station and the new mode after change. The method by which the mode setting section 110 determines, for each mobile station, whether or not there is data transmission/reception to/from the mobile station is as described already.

Prior to the start of communication with the mobile station, the target SIR setting section 106 receives, from a base station controller, information related to target SIR control for the mobile station in question (target SIR information), including here SIR_normal [dB] and the maximum decrease amount Max_Delta_SIR_reduced. In addition, the target SIR setting section 106 receives the sync-securing quality threshold SIR_th [dB] of the self base station as input from the sync detection section 104. The target SIR setting section 106 records these values on a memory (not shown) in the target SIR setting section 106.

Additionally, SIR_normal can be changed by the base station controller, as deemed appropriate, depending on the communication state of a mobile station. For a mobile station in the normal mode, the target SIR setting section 106 sets SIR_normal as the target SIR, based on the mode of each mobile station inputted from the mode setting section 110.

For a mobile station in the reduced power mode, the target SIR setting section 106 determines the target SIR in the reduced power mode such that a difference between a value of the target SIR in the reduced power mode and a value of the target SIR in the normal mode is equal to or smaller than Max_Delta_SIR reduced. Specifically, the target SIR setting section 106 compares a value (=SIR_normal−Max_Delta_SIR_reduced) with SIR_reduced preset in accordance with the reception performance of the self base station and determines the lower one as the target SIR in the reduced power mode. Further, with consideration given to the sync-securing quality threshold SIR_th, the target SIR setting section 106 sets the target SIR in the reduced power mode, for example, by using the above-mentioned equation (1).

The transmission power control section 107 compares the reception SIR inputted from the reception quality measurement section 103 with the target SIR inputted from the target SIR setting section 106. When the reception SIR is lower than the target SIR, the transmission power control section 107 generates a TPC signal instructing that the power be increased otherwise, the transmission power control section 107 generates a TPC signal instructing that the power be reduced. The transmission power control section 107 outputs the generated TPC signal to the transmission processing section 102.

The sync detection section 104 receives part of the target SIR information (here, SIR_normal) from the base station controller. The sync detection section 104 notifies the sync state management section 105 of Out-of-sync when a state where the reception SIR inputted from the reception quality measurement section 103 is equal to or lower than the sync-securing quality threshold SIR_th (i.e., not greater than a value that is lower than SIR_normal by Delta_SIR) continues for a predetermined period of time T_timer1 or longer. Note that Delta_SIR and T_timer1 are parameters determined by the base station on its own before the communication is started.

As described above, when the reduced power mode is started, the base station reduces the target SIR from SIR_normal. The decrease amount then deducted is determined such that the decrease amount is a desired value that does not exceed the maximum decrease amount Max_Delta_SIR_reduced, and such that the target SIR does not fall below the sync-securing quality threshold SIR_th.

In addition, the following control is also possible. When the sync state management section 105 is likely to generate RL_Failure, the sync state management section 105 informs the target SIR setting section 106 of that effect. The target SIR setting section 106 increases SIR_reduced by a predetermined value, thereby preventing RL_Failure from being generated.

4.4) Base Station Controller and Mobile Station

The configuration and operation flow of a base station controller according to the fourth embodiment are basically the same as those of the base station controller according to the first embodiment, and therefore description thereof will be omitted. However, the base station controller according to the fourth embodiment is different from the base station controller according to the first embodiment in that the base station controller determines the maximum decrease amount Max_Delta_SIR_reduced to be subtracted from the target SIR, based on performance information and the like transmitted from each base station, and transmits this value to a base station by including it in the target SIR information.

Moreover, the configuration and operation flow of a mobile station according to the fourth embodiment are also basically the same as those of the mobile station according to the first embodiment, and therefore description thereof will be omitted.

Here, in the present embodiment, the range of the target SIR in the reduced power mode, designated by the base station controller, is a value (maximum decrease amount) relative to the target SIR in the normal mode. However, an absolute value (minimum target SIR) may be designated.

Note that in the present embodiment, it suffices that the range of SIR_reduced in the reduced power mode can be designated beforehand and SIR_reduced can be determined within this range so that a dedicated channel is not disconnected. The present invention does not depend on the base technology of the above-described system.

5. Fifth Embodiment

Figure 18:
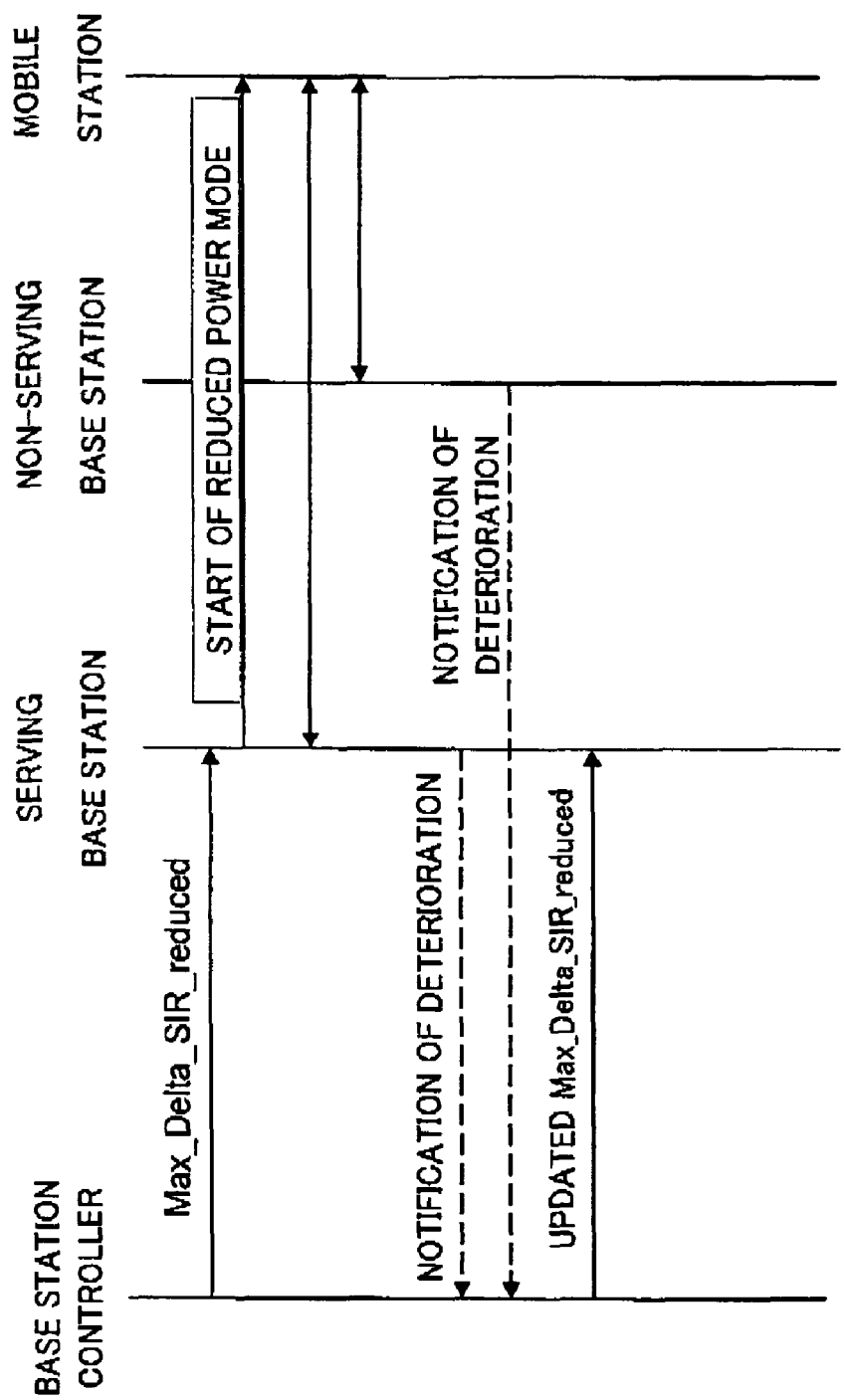
FIG. 18 is a sequence diagram showing a procedure of a transmission power control method according to a fifth embodiment of the present invention.

FIG. 18 is a sequence diagram showing a procedure of a transmission power control method according to a fifth embodiment of the present invention. First, as described in the fourth embodiment, a base station controller notifies a current serving base station of a maximum decrease amount Max_Delta_SIR_reduced for a mobile station. Then, SIR_reduced in the reduced power mode is determined within the range defined with this maximum decrease amount Max_Delta_SIR_reduced. Due to the reduced power mode, the transmission power of the mobile station in question is reduced to a level corresponding to SIR_reduced. However, due to this, the possibility increases that the base station controller receives RL_Failure notifying that the reception quality of a dedicated channel deteriorates, from the serving base station or a non-serving base station.

In the fifth embodiment, when the base station controller receives such RL_Failure, the base station controller reduces the value of the maximum decrease amount Max_Delta_SIR_reduced currently set in the serving base station for the mobile station by a predetermined value Δ and re-notifies the updated Max_Delta_SIR_reduced to the serving base station. Upon receipt of information about the new maximum decrease amount Max_Delta_SIR_reduced, the target SIR setting section 106 in the serving base station recalculates and sets the target SIR for the mobile station in question, based on the updated value, as described in the fourth embodiment.

Figure 19:
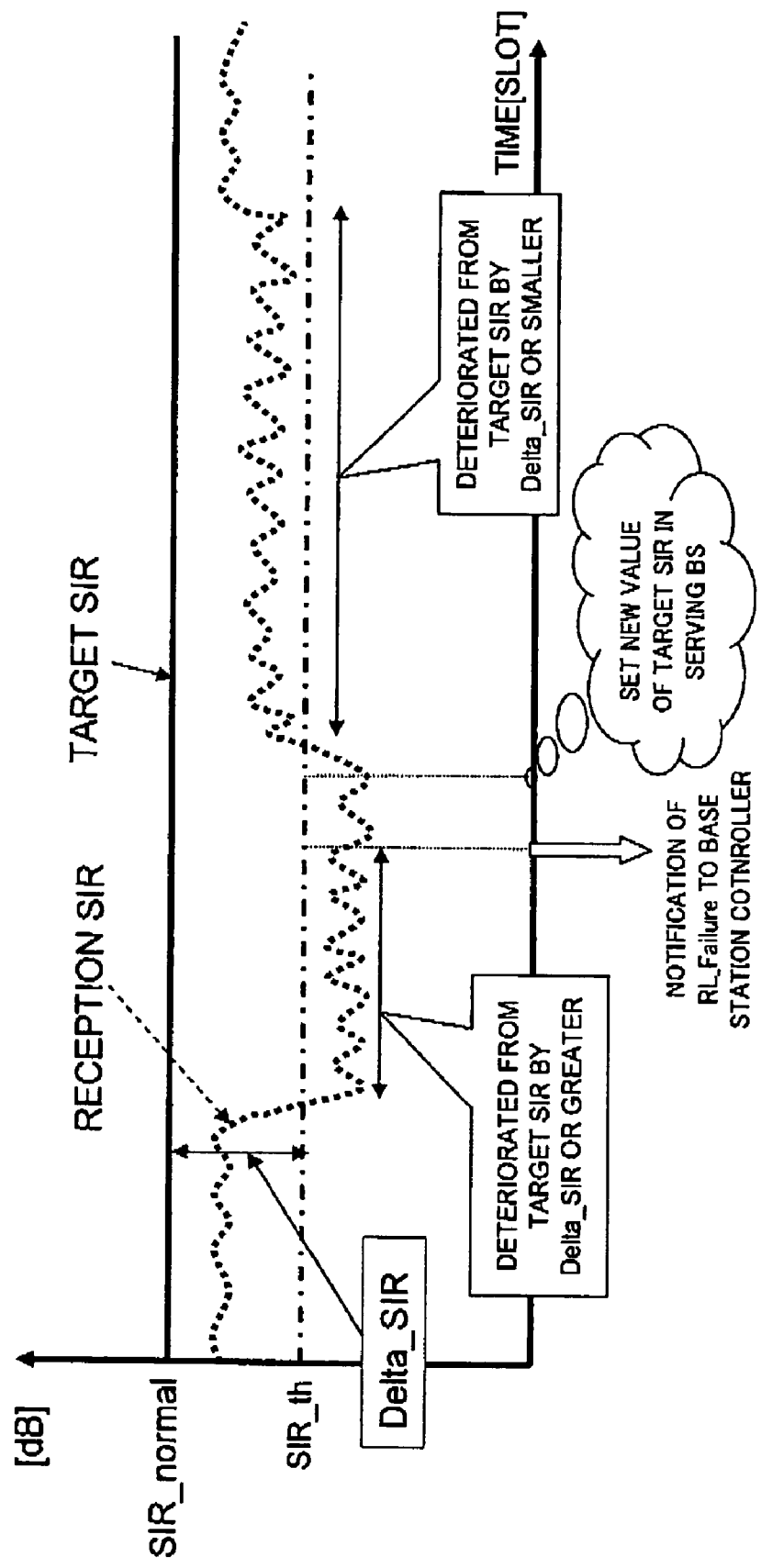
FIG. 19 is a time chart showing an example of a change in a reception SIR when RL_Failure is generated at a non-serving base station.
Figure 20:
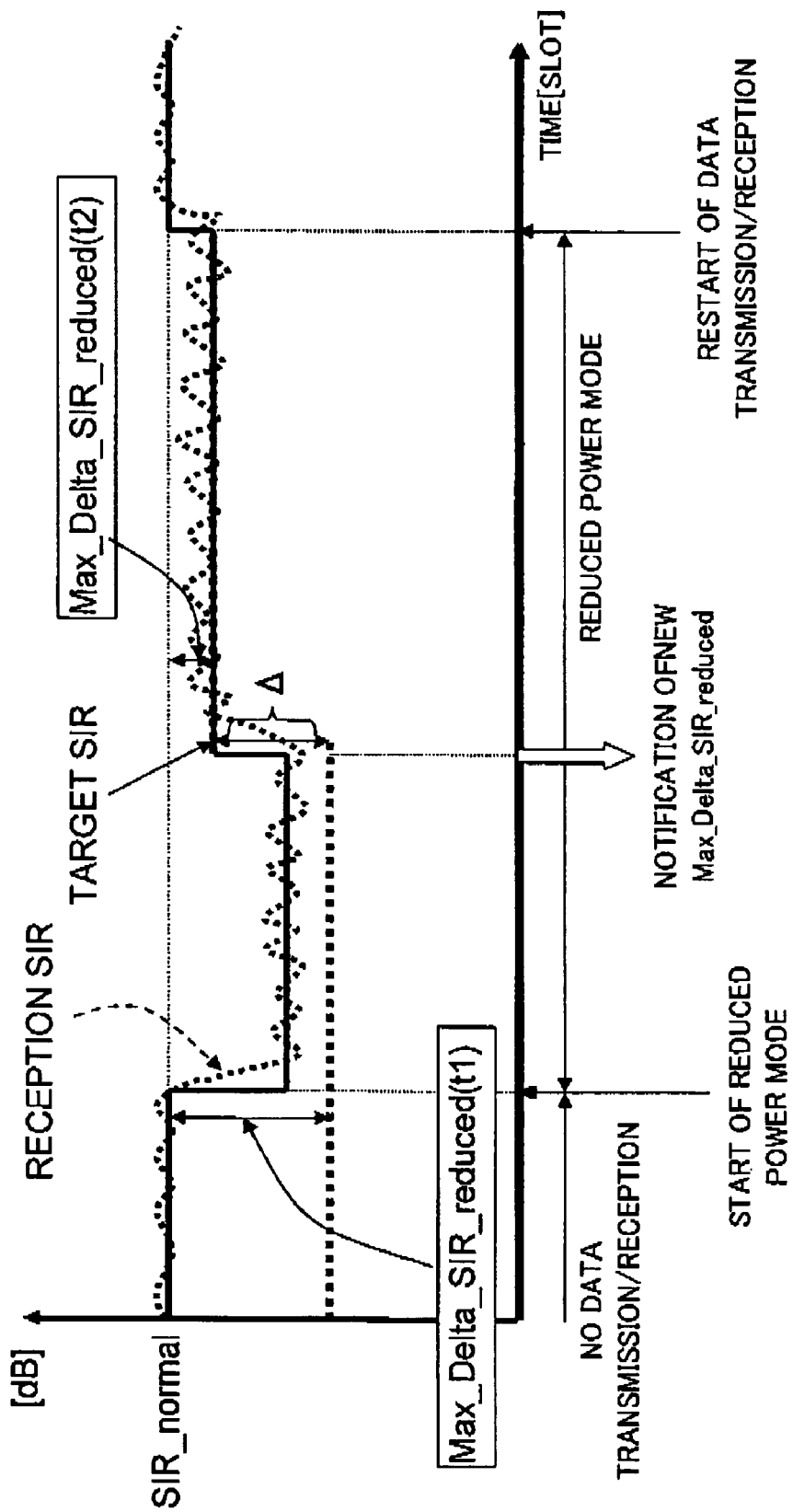
FIG. 20 is a time chart showing an example of changes in a reception SIR and a target SIR over time at a serving base station.

FIG. 19 is a time chart showing an example of a change in the reception SIR when RL_Failure is generated at a non-serving base station. FIG. 20 is a time chart showing an example of changes in the reception SIR and the target SIR over time at a serving base station. It is assumed that the serving base station has been notified of a maximum decrease amount Max_Delta_SIR_reduced(t1) from the base station controller.

Referring to FIG. 19, in the non-serving base station, the target SIR for a mobile station in question is set at SIR_normal, a value of the target SIR in the normal mode. In this state, when the serving base station sets the reduced power mode based on the current Max_Delta_SIR_reduced(t1), the transmission power of the mobile station in question is reduced, and accordingly the reception SIR at the non-serving base station is also lowered. This lowered reception SIR might fall below the sync-securing quality threshold SIR_th of the non-serving base station. As described earlier, if this deteriorated state of quality continues for a predetermined period of time, the sync state management section 105 notifies the base station controller of RL_Failure indicating the deterioration in the reception quality.

When RL_Failure is generated from at least one of the serving and non-serving base stations, the base station controller notifies the serving base station of a new value Max_Delta_SIR_reduced(t2), which is a smaller maximum decrease amount (with the lower limit raised by Δ), so that the target SIR in the reduced power mode at the serving base station is increased. As shown in FIG. 20, the serving base station recalculates and sets the target SIR, based on the new value Max_Delta_SIR_reduced(t2).

Thereby, the transmission power of the mobile station in question is increased, and the possibility increases that the reception SIR at the non-serving base station becomes equal to or higher than the sync-securing quality threshold SIR_th of this base station, as shown in FIG. 19. Accordingly, the probability decreases that a base station connecting to the mobile station in question through a dedicated channel generates RL_Failure frequently. Hence, it is possible to effectively avoid a disconnection of a dedicated channel, for example, during soft handover.

Figure 21:
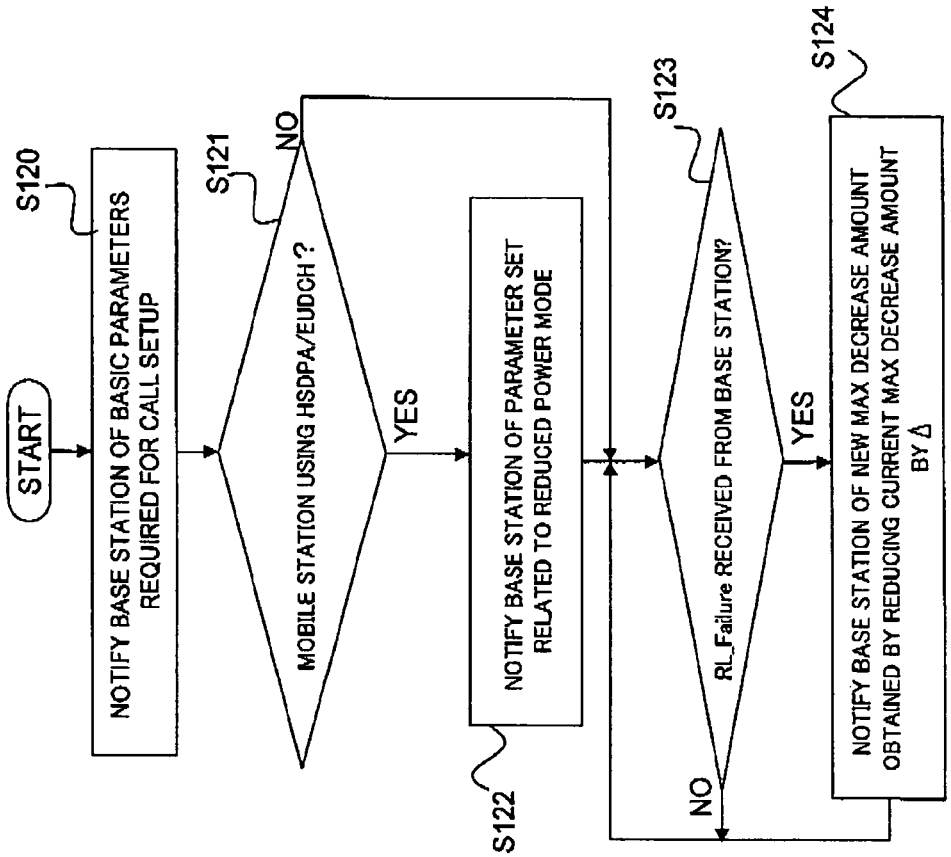
FIG. 21 is a flow chart showing an operation flow of a base station controller according to the fifth embodiment of the present invention.

FIG. 21 is a flow chart showing an operation flow of a base station controller according to the fifth embodiment of the present invention. The basic configuration of the base station controller is as shown in FIG. 6. First, the control section 121 notifies a base station of basic parameters required for call setup when data transmission/reception to/from a mobile station in question is started (step S120). For example, the parameters related to the present embodiment include: a value of the target SIR in the normal mode (SIR_normal); the number of generations of Out-of-sync (N_OUTSYNC_IND) serving as a trigger for the sync state management section to start a timer; the timer's period threshold value (T_RLFAILURE) serving as a trigger to notify RL_Failure; and the like.

Moreover, the control section 121 determines whether or not HSDPA or EUDCH is used for this data transmission/reception, based on the service of the data of which the transmission/reception is started and wireless resource information transmitted from a base station (step S121). When it is determined that HSDPA or EUDCH is used (YES in step S121), the control section 121 notifies the base station of a set of parameters related to the reduced power mode as information for the mobile station in question (step S122). In the present embodiment, the set of parameters related to the reduced power mode includes the maximum decrease amount Max_Delta_SIR_reduced.

When the control section 121 determines that HSDPA or EUDCH is not used for the mobile station in question (NO in step 3121), the control section 121 does not notify the set of parameters related to the reduced power mode as information about the mobile station in question.

Subsequently, the control section 121 determines whether or not a notification of RL_Failure is received from at least one of serving and non-serving base stations (step S123). When a notification of RL_Failure is received from at least one of the serving and non-serving base stations (YES in step S123), the control section 121 notifies the serving base station of a permissible decrease range, which is here, as the maximum decrease amount determining the lower limit of SIR_reduced, a value obtained by reducing the current value of the maximum decrease amount by a predetermined amount Δ (step S124). Thereby, since the lower limit of SIR_reduced is raised, the transmission power of the mobile station in question is increased as described above.

Incidentally, in the present embodiment, the base station controller designates the maximum decrease amount to deduct from the target SIR or permissible decrease range (Max_Delta_SIR_reduced), and the base station determines the target SIR in the reduced power mode, SIR_reduced, within the designated range on its own. However, the present invention is not limited to this. The base station controller may determine SIR_reduced and notify it to the base station for designation. Specifically, the following control is possible. When the base station controller receives RL_Failure from a non-serving base station, the base station controller increases SIR_reduced by a predetermined value Δ and re-notifies the new SIR_reduced to a serving base station. Then, the serving base station changes the target SIR to the new SIR_reduced.

Note that in the present embodiment, it suffices that SIR_reduced can be determined within the range of SIR_reduced in the reduced power mode that is changed depending on a notification of RL_Failure from at least one of serving and non-serving base stations so that a dedicated channel is not disconnected. The present invention does not depend on the base technology of the above-described system.

6. Sixth Embodiment

Figure 22:
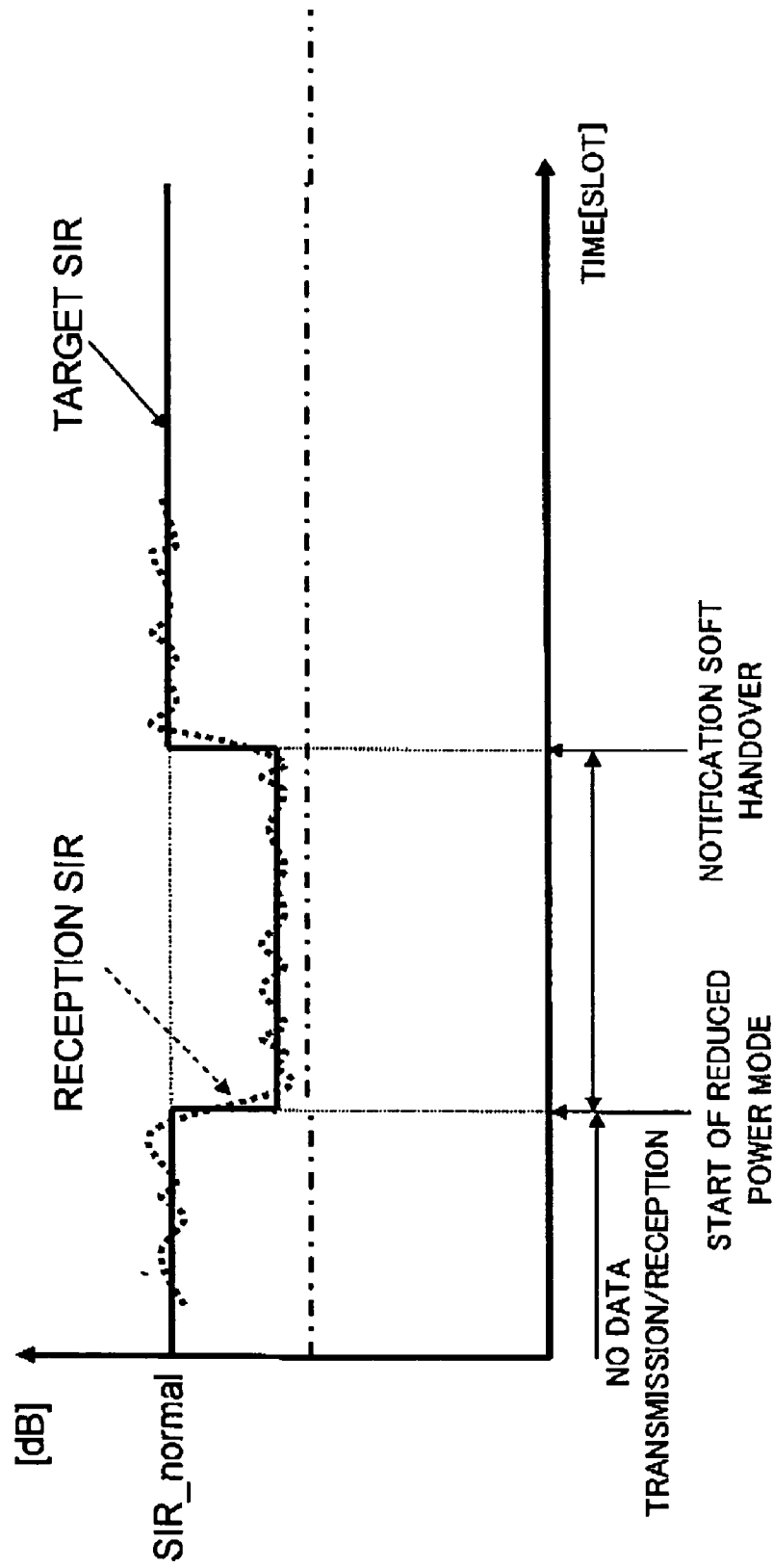
FIG. 22 is a time chart showing an example of changes in a reception SIR and a target SIR over time at a serving base station, in transmission power control according a sixth embodiment of the present invention.

FIG. 22 is a time chart showing an example of changes in the reception SIR and the target SIR over time at a serving base station, in transmission power control according a sixth embodiment of the present invention. In the sixth embodiment, a base station controller notifies a serving base station of information as to whether or not soft handover is being performed, and the serving base station performs the setting of the reduced power mode only when soft handover is not performed. For the mobile station in soft handover, the serving base station always sets the target SIR at a level higher than SIR_reduced in the reduced power mode (in FIG. 22, at the same level as in the normal mode). In other words, for the mobile station in soft handover, even during the reduced power mode, the base station according to the sixth embodiment sets the target SIR at a value higher than a value in the reduced power mode, for example, at the same value as SIR_normal, which is a value of the target SIR in the normal mode.

In general, since there are differences in path loss between a mobile station and each of base stations in soft handover, the reception qualities of uplinks received by the respective base stations are also different. Moreover, a base station having a better propagation environment, that is, a base station having a smaller path loss is generally selected as a serving base station because the serving base station transmits control signals related to scheduling. Therefore, in many cases, a non-serving base station principally has lower reception quality than a serving base station. When the serving base station lowers the target SIR during the reduced power mode, the non-serving base station may have even lower reception quality and hence higher possibility of going out of sync than the serving base station.

Therefore, for the reception quality at the non-serving base station in soft handover to be secured, when the serving base station is notified by the base station controller that a mobile station is in soft handover with a neighboring base station, the serving base station resets the target SIR at a higher level, preferably, a level in the normal mode, if the mobile station in question is in the reduced power mode.

Moreover, as described earlier, SIR_reduced is a value set by each base station on its own in accordance with the individual reception performance and therefore varies among base stations. Accordingly, as shown in FIG. 22, even if the serving base station determines SIR reduced with consideration given to the sync-securing quality threshold SIR_th of its own, this SIR_reduced may sometimes be too low for a non-serving base station in soft handover. Therefore, the reduced power mode is not brought about during soft handover, or alternatively, even during the reduced power mode, the target SIR is set at a higher level, preferably, the same level as in the normal mode. Thereby, it is possible to avoid deterioration in the quality of DPCCH at the non-serving base station, making it possible to solve the problem that the non-serving base station generates RL_Failure.

Note that in the present invention, it suffices that the reduced power mode is not brought about during soft handover, or the target SIR can be set at a higher level even during the reduced power mode. The present invention does not depend on the base technology of the above-described system.

7. Seventh Embodiment

In a seventh embodiment, a non-serving base station can transmit a special TPC signal when the non-serving base station is likely to generate RL_Failure. That is, although two types (TPC_UP and TPC_DOWN) are provided for the conventional TPC signal, three types of TPC signal or more are prepared in the present embodiment. It is assumed here that a base station can notify three types: TPC_UP, TPC_DOWN, and Priority_TPC_UP. Apart from these, TPC_HOLD instructing that the transmission power be maintained may be provided. When even one TPC signal indicating Priority_TPC_UP is among TPC signals received for each slot, a mobile station increases the DPCCH transmission power for the next slot by a predetermined value even if a TPC signal indicating TPC_DOWN is included. This predetermined value may be the same value that is used for an increase or a decrease in the case of a normal TPC signal, or may be a different value.

It is designed that a non-serving base station transmits Priority_TPC_UP when the non-serving base station is in a predetermined condition in which RL_Failure is likely to be generated. For the condition of the transmission of Priority_TPC_UP, various settings are applicable. Although the setting method is not particularly limited in the present invention, the following setting may be made, for example.

In a non-serving base station, after Out-of-sync has been generated by the sync detection section 104 a predetermined number of times (N_OUTSYNC_IND) and a timer has been started, the sync state management section 105 allows Priority_TPC_UP to be transmitted instead of TPC_UP if the reception SIR is not higher than the target SIR. After In-sync, indicating that the quality of a link is favorable, has been inputted from the sync detection section 104 while the timer in the sync state management section 105 is in action, the sync state management section 105 inhibits the transmission of Priority_TPC_UP.

7.1) Base Station

Figure 23:
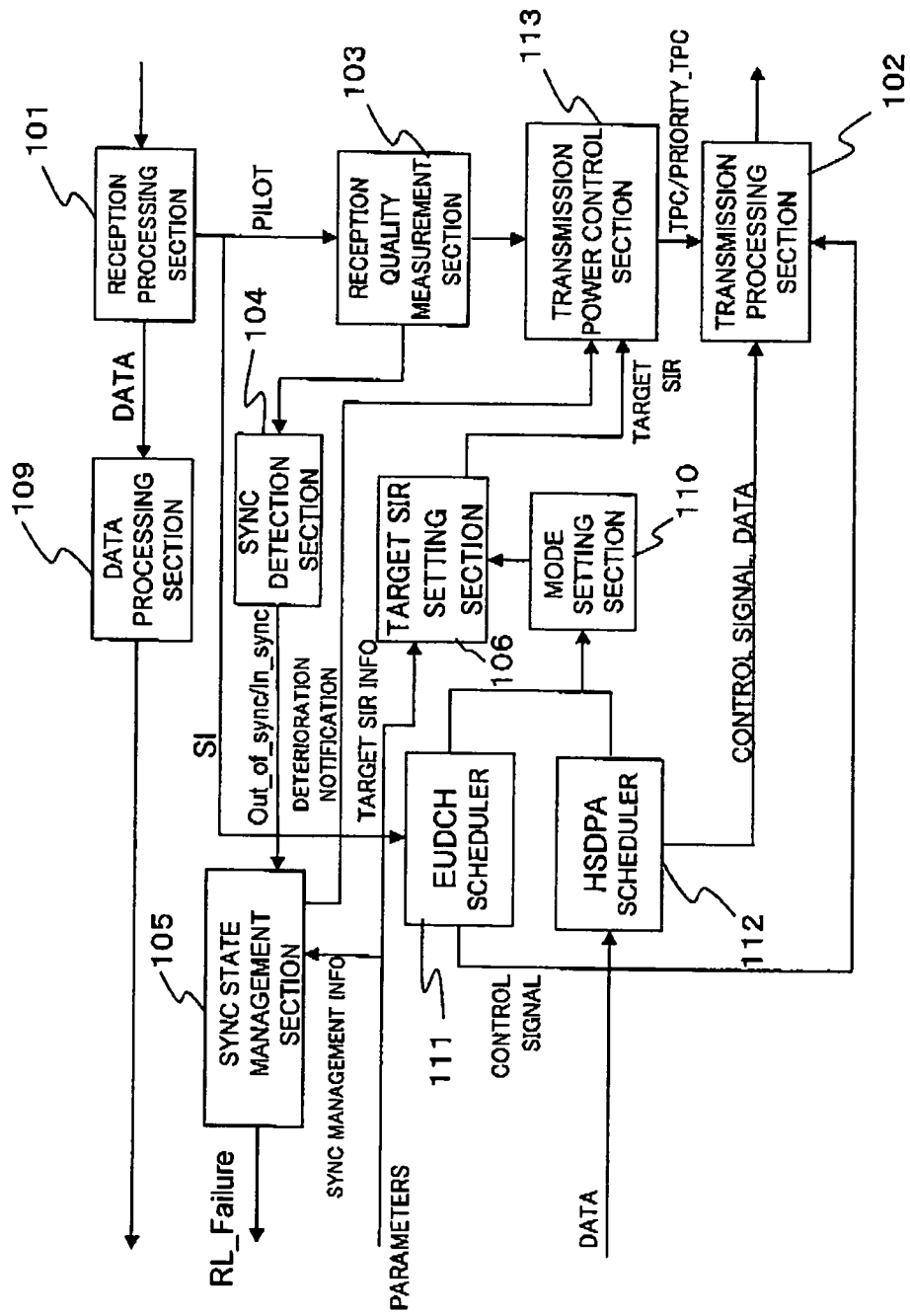
FIG. 23 is a block diagram showing a functional configuration of a base station according to a seventh embodiment of the present invention.

FIG. 23 is a block diagram showing a functional configuration of a base station according to the seventh embodiment of the present invention. Here, shown is an example of the functional configuration related to the present invention. Note that the same reference numerals as in FIG. 11 are used for the blocks having functions similar to those of the base station according to the second embodiment shown in FIG. 11, and detailed description thereof will be omitted.

The base station shown in FIG. 23 is similar to the above-described base station according to the second embodiment as to the target SIR setting control, but is different from the base station according to the second embodiment in the following points.

First, in the case where the self base station is a non-serving base station, when the sync state management section 105 detects a state likely to generate RL_Failure, the sync state management section 105 outputs a deterioration notification to that effect to the transmission power control section 113. Second, although the mode setting section 110 generates a mode change notification signal and notifies it to the transmission processing section 102 in the case of the base station according to the second embodiment, such a notification is not required in the base station according to the seventh embodiment. Third, in the case where the self base station is a non-serving base station, the transmission power control section 113 transmits a TPC signal indicating Priority_TPC_UP to a mobile station in question when receiving the deterioration notification from the sync state management section 105. The rest of the configuration of the base station according to the seventh embodiment is similar to the second embodiment, and therefore description thereof will be omitted.

7.2) Operation of Base Station

Figure 24:
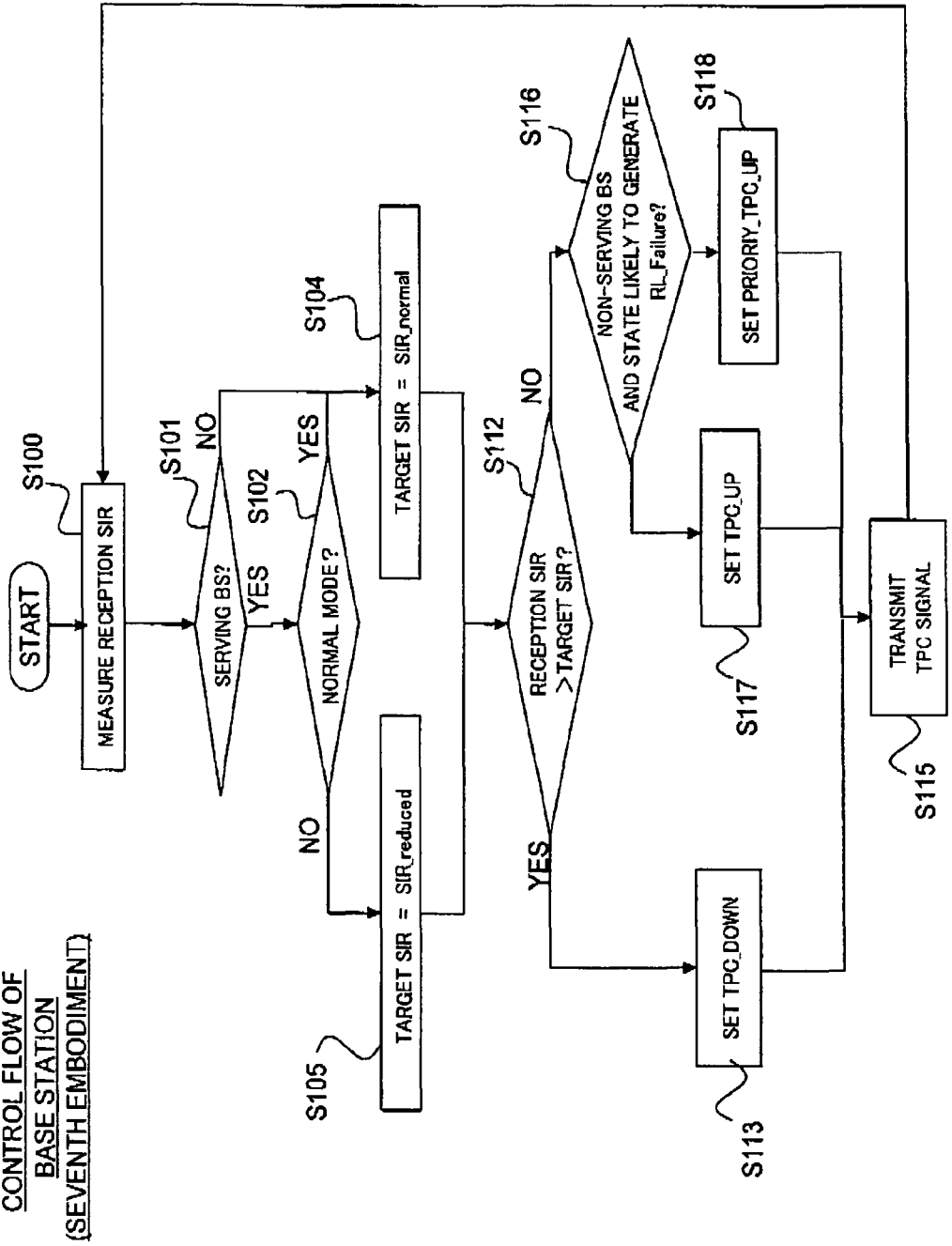
FIG. 24 is a flow chart showing an operation flow related to uplink transmission power control performed for each slot by the base station according to the seventh embodiment of the present invention.

FIG. 24 is a flow chart showing an operation flow related to uplink transmission power control performed for each slot by the base station according to the seventh embodiment of the present invention. Note that the same reference symbols and numerals as in FIG. 13 are used for the steps of the same operations as in the second embodiment shown in FIG. 13, and description thereof will be omitted. The different points of the operations of the base station according to the seventh embodiment from the operations of the base station according to the second embodiment are step S116 and subsequent steps carried out when the reception SIR is not higher than the target SIR in step S112 (NO in step S112).

Referring to FIG. 24, when it is determined that the reception SIR is not higher than the target SIR (NO in step S112), the transmission power control section 113 determines whether or not the self base station is a non-serving base station and is in a state likely to generate RL_Failure (state in which a deterioration notification has been generated) (step S116). When the self base station is a non-serving base station and is in a state likely to generate RL_Failure (state in which a deterioration notification has been generated) (YES in step S116), the transmission power control section 113 sets Priority_TPC_UP as a TPC signal (step S118). Otherwise, the transmission power control section 113 sets normal TPC_UP (step S117). The TPC signal thus set is transmitted to a mobile station in question via the transmission processing section 102 (step S115).

7.3) Configuration of Mobile Station

The configuration of a mobile station according to the seventh embodiment is similar to that of the mobile station according to the first embodiment shown in FIG. 7, and therefore description thereof will be omitted. However, the operations of the TPC signal determination section 203 and the transmission power setting section 204 are different from the first embodiment, and therefore description thereof will be given below with reference to FIG. 25.

7.4) Operation of Mobile Station

Figure 25:
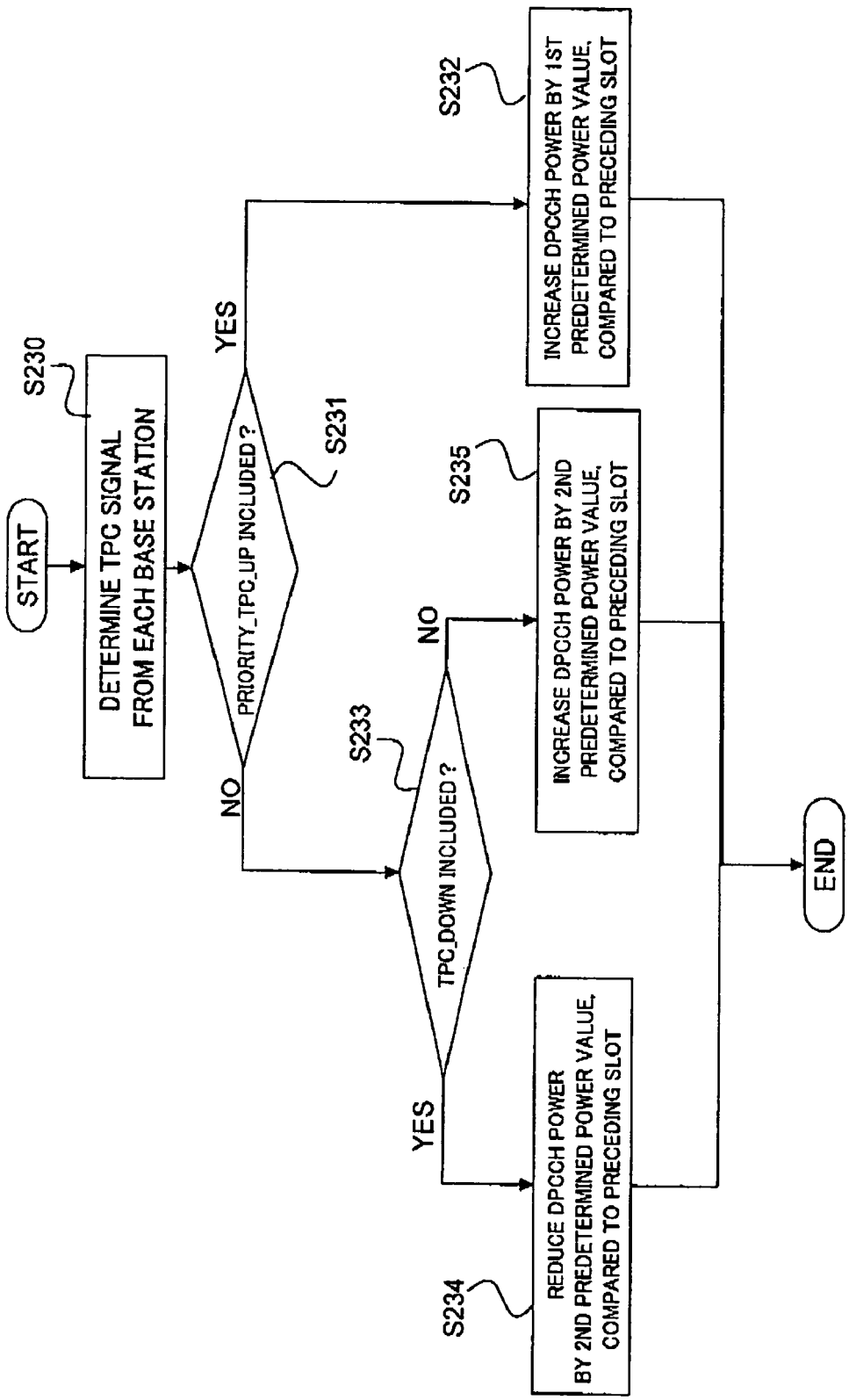
FIG. 25 is a flow chart showing an operation flow of a mobile station according to the seventh embodiment of the present invention when the mobile station determines DPCCH transmission power for each slot.

FIG. 25 is a flow chart showing an operation flow of the mobile station when the mobile station determines DPCCH transmission power for each slot according to the seventh embodiment of the present invention. The reception processing section 201 in the mobile station extracts a TPC signal included in a slot of DPCCH transmitted from each base station. The TPC signal determination section 203 determines which one of TPC_UP, TPC_DOWN, and Priority_TPC_UP the received TPC signal is (step S230).

When Priority TPC_UP is included in the determination results (YES in step S231), the TPC signal determination section 203 notifies Priority_TPC_UP to the transmission power setting section 204. The transmission power setting section 204 increases the DPCCH power of the preceding slot by a first predetermined power value (step S232).

On the other hand, when Priority_TPC_UP is not included in the determination results (NO in step S231), the operation is carried out as in the first embodiment. Specifically, the TPC signal determination section 203 determines whether or not TPC_DOWN is included in the extracted TPC signals (step S233). When TPC_DOWN is included (YES in step S233), the transmission power setting section 204 determines, as the DPCCH transmission power, a power value obtained by reducing a power of the preceding slot by a second predetermined power value (step S234). Otherwise (NO in step S233), the transmission power setting section 204 determines, as the DPCCH transmission power, a power value obtained by increasing the power of the preceding slot by the second predetermined power value (step S235). The mobile station repeats the above-described operations for each slot. Note that the above-mentioned first and second predetermined power values may be fixed values determined beforehand or may be changed as occasion requires.

Incidentally, as for the power increase amount (first predetermined power value in step S232) used when Priority_TPC_UP is received, it suffices, in general, that a base station controller determines and notifies the power increase amount to a mobile station. However, a base station may determine and notify it to a mobile station, or a mobile station may determine it on its own. Moreover, it is also possible to allow Priority_TPC_UP itself to designate the increase amount. For example, with a plurality of formats provided for Priority_TPC_UP, an increase of 1 dB can be designated by one format, and an increase of 3 dB can be designated by another format.

As described above, according to the seventh embodiment, a special TPC signal is transmitted when the reception SIR at a non-serving station deteriorates and RL_Failure is likely to be generated, whereby the transmission power of a mobile station can be increased without being affected by a TPC signal from a serving base station. Accordingly, the reception SIR at the non-serving base station is improved, making it possible to avoid the generation of RL_Failure.

Note that in the present invention, it suffices that the transmission power of a mobile station can be increased in a sort of forced manner by the transmission of a special power increase signal when the reception SIR at a non-serving base station deteriorates and RL_Failure is likely to be generated. The present invention does not depend on the base technology of the above-described system.

8. Eighth Embodiment

A non-serving base station according to an eighth embodiment, similarly to the base station according to the seventh base station, transmits a signal (Priority_TPC_UP) notifying a mobile station to increase the power when a predetermined condition for determining that RL_Failure is likely to be generated is satisfied. Here, Priority_TPC_UP in the eighth embodiment may be notified as part of a TPC signal as in the seventh embodiment or may be notified by using a signal different from a TPC signal. In addition, in the seventh embodiment, upon receipt of a power increase notification, the mobile station increases the DPCCH transmission power by a predetermined value only for the next slot. However, in the eighth embodiment, upon receipt of Priority_TPC_UP, the mobile station transmits DPCCH with a transmission power higher than a transmission power determined in normal transmission power control, for a predetermined period of time. Hereinafter, such an operation mode will be referred to as "added power mode".

For example, a mobile station in the added power mode may perform transmission always with a power obtained by adding a predetermined value to a DPCCH transmission power determined in normal transmission power control, within a predetermined period of time, or may perform transmission with the power adding on the predetermined value only when it is temporarily determined that the DPCCH transmission power for the current slot, determined in normal transmission power control, is lower than the power for the preceding slot.

On the other hand, when the non-serving base station has transmitted Priority TPC_UP a predetermined number of times, the non-serving base station thereafter transmits a normal TPC signal, that is, TPC_UP or TPC_DOWN. Further, when the mobile station receives TPC-DOWN a predetermined number of times from the base station that has transmitted Priority_TPC_UP, then the mobile station turns back to normal transmission power control. Alternatively, it may be designed that if the non-serving base station can avoid notifying RL_Failure, the non-serving base station can transmit a signal instructing the mobile station to stop adding the predetermined power value.

8.1) Base Station

The configuration and operation flow of a base station according to the eighth embodiment is basically the same as those of the base station according to the seventh embodiment, and therefore description thereof will be omitted. However, in the eighth embodiment, when the base station is likely to generate RL_Failure, the base station transmits Priority_TPC_UP through the same control channel for a TPC signal, or through another control channel.

8.2) Mobile Station

The configuration of a mobile station according to the eighth embodiment is basically the same as that of the mobile station according to the first embodiment, and therefore description thereof will be omitted. However, in the eighth embodiment, the operation of the transmission power setting section 204 is different from the first embodiment, and therefore description thereof will be given below with reference to FIGS. 26 and 27.

Figure 26:
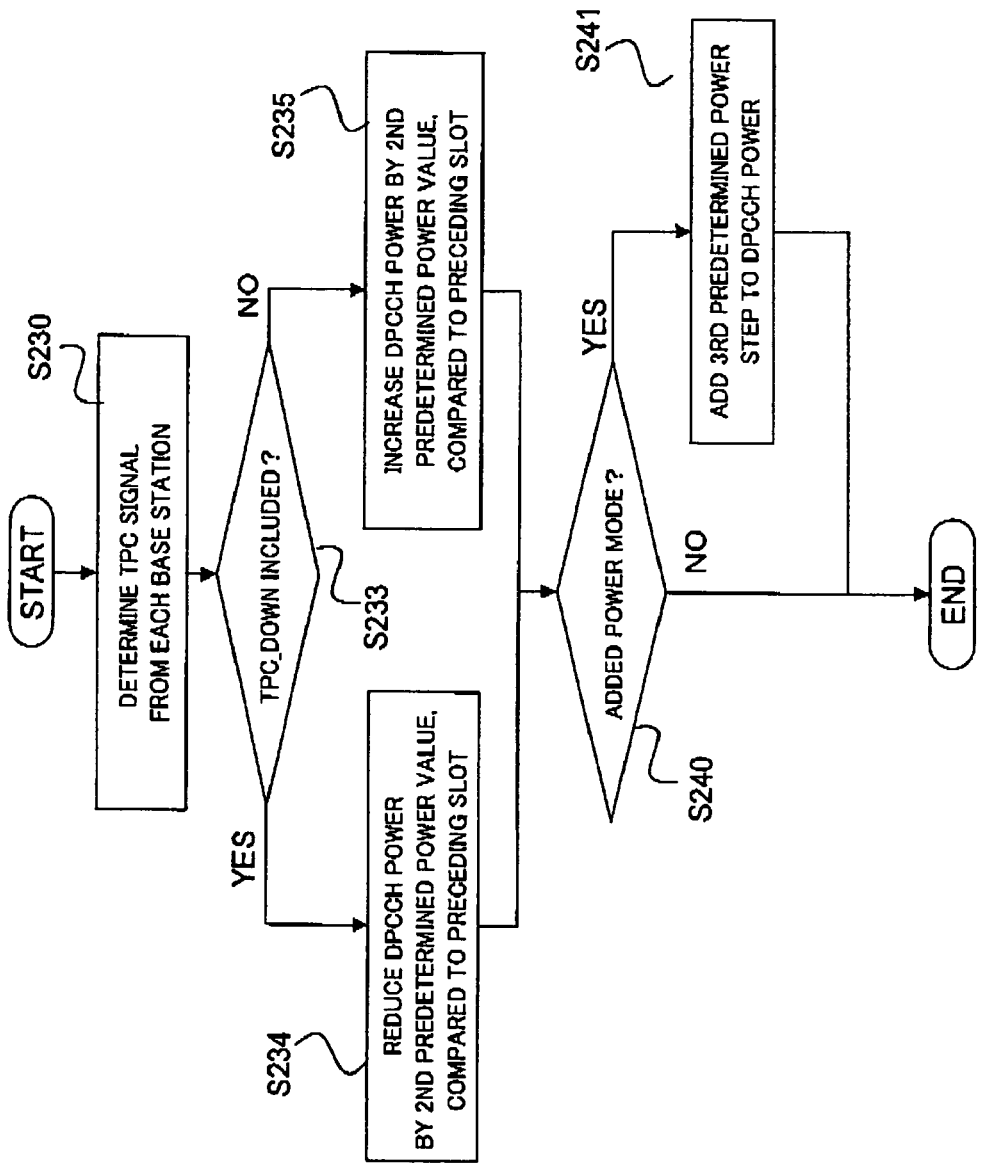
FIG. 26 is a flow chart showing an operation flow of a mobile station according to an eighth embodiment of the present invention when the mobile station determines DPCCH transmission power for each slot.

FIG. 26 is a flow chart showing an operation-flow of the mobile station when the mobile station determines DPCCH transmission power for each slot according to the eighth embodiment of the present invention. The reception processing section 201 in the mobile station extracts a TPC signal included in a slot of DPCCH transmitted from each base station. The TPC signal determination section 203 determines which of TPC_UP, TPC_DOWN, and Priority_TPC_UP the received TPC signal is (step S230).

When TPC_DOWN is included (YES in step S233), the transmission power setting section 204 determines, as the DPCCH transmission power, a power value obtained by reducing a power of the preceding slot by the second predetermined power value (step S234). Otherwise (NO in step S233), the transmission power setting section 204 determines, as the DPCCH transmission power, a power value obtained by increasing the power of the preceding slot by the second predetermined power value (step S235).

Subsequently, the transmission power setting section 204 in the mobile station determines whether or not the self mobile station is currently in the added power mode (step S240). When in the added power mode (YES in step S240), the transmission power setting section 204 increases the DPCCH power by a third predetermined power value (step S241). Otherwise, the transmission power control is carried out as in the first embodiment. Note that the first to third predetermined power values may be fixed values determined beforehand or may be changed as occasion requires.

Figure 27:
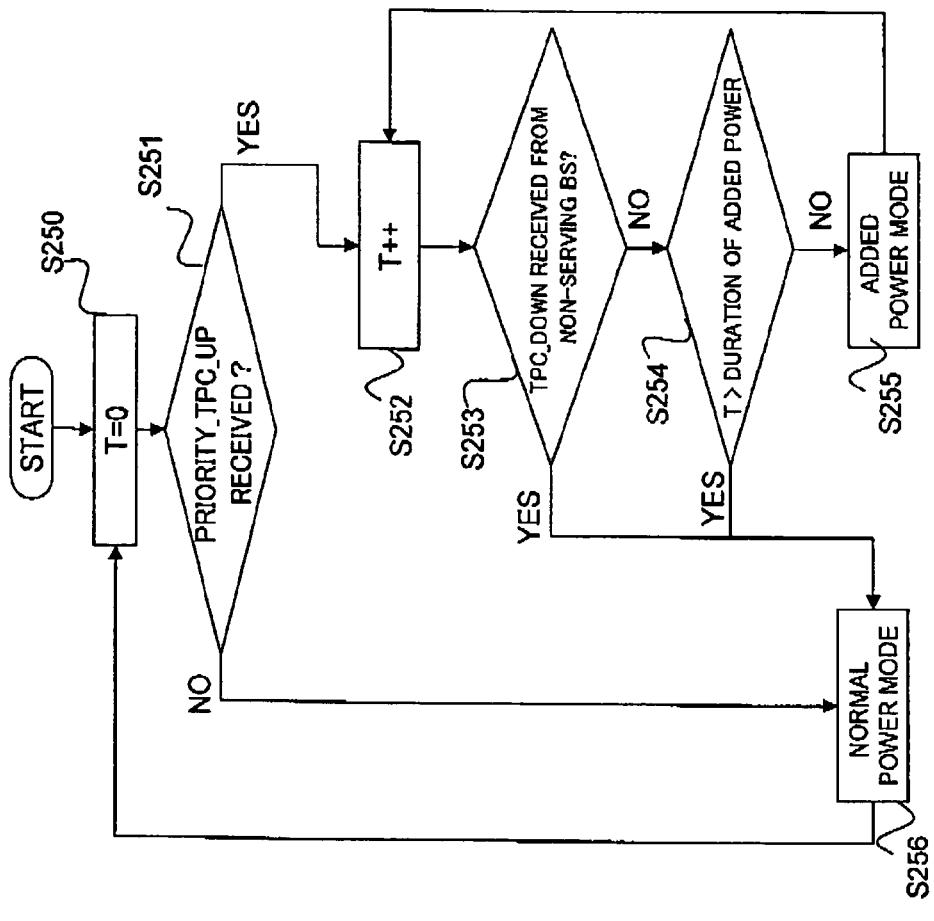
FIG. 27 is a flow chart showing an operation flow of added power mode determination performed by the mobile station according to the eighth embodiment of the present invention.

FIG. 27 is a flow chart showing an operation flow of added power mode determination performed by the mobile station according to the eighth embodiment of the present invention. The transmission power setting section 204 in the mobile station sets the initial value of a parameter T, measured by a counter (not shown), at zero (step S250), and the TPC signal determination section 203 inputs a result of determination whether or not a signal notifying Priority_TPC_UP is received from a non-serving base station (step S251). When Priority_TPC_UP is received (YES in step S251), the transmission power setting section 204 starts the counter and increments it by one (step S252).

Subsequently, the TPC signal determination section 203 determines whether or not another TPC signal transmitted from the non-serving base station that has notified Priority_TPC_UP is TPC-DOWN (step S253). When TPC_DOWN is not received from the non-serving base station (NO in step S253), and when the counter's value T is smaller than a predetermined number of increased-power slots (NO in step S254), then the transmission power setting section 204 determines the added power mode (step S255), and the control returns to step S252 for the next slot. Otherwise, the transmission power setting section 204 determines the normal mode (step S256), and the control returns to step S250 for the next slot. In this case, if even one TCP_DOWN is received from the non-serving base station (YES in step S253), the mode is changed to the normal mode. However, the added power mode may be continued until a predetermined number (>1) of TPC_DOWNs are received.

Incidentally, as for the power increase amount (third predetermined power value in step S241) in the added power mode, it suffices, in general, that a base station controller determines and notifies the power increase amount to a mobile station. However, a base station may determine and notify it to a mobile station, or a mobile station may determine it on its own. Moreover, it is also possible to allow Priority_T-PC_UP itself to designate the increase amount. For example, with a plurality of formats provided for Priority_TPC_UP, an increase of 1 dB can be designated by one format, and an increase of 3 dB can be designated by another format.

As described above, according to the eighth embodiment, a special TPC signal is transmitted when the reception SIR at a non-serving station deteriorates and RL_Failure is likely to be generated, whereby the transmission power of a mobile station can be increased by a predetermined value, as in the seventh embodiment. Accordingly, the reception SIR at the non-serving base station is improved, making it possible to avoid the generation of RL_Failure.

Note that in the present invention, it suffices that the transmission power of a mobile station can be increased in a sort of forced manner by the transmission of a special power-increase signal when the reception SIR at a non-serving base station deteriorates and RL_Failure is likely to be generated. It is also possible to use another signal having a function similar to a TPC signal. The present invention does not depend on the base technology of the above-described system.

9. Ninth Embodiment

In a ninth embodiment, different values are set in a serving base station and a non-serving base station, respectively, as the parameters related to the generation of RL_Failure, which are set by a base station controller. Specifically, these parameters include the number of generations of Out-of-sync (N_OUTSYNC_IND) serving as a trigger for the sync station management section 105 to start a timer, and/or the timer's period threshold value (T_RLFIALURE) serving as a trigger for the sync station management section 105 to notify RL_Failure. Specifically, in the non-serving base station, at least one of N_OUTSYNC_IND and T_RLFAILURE is set at a value that is larger than a value set in the serving base station, whereby the probability of the non-serving base station satisfying the condition for notification of RL_Failure is made lower than that of the serving base station. Thereby, it is possible to solve the problem that the number of control signals exchanged between a base station and a base station controller is increased due to a non-serving base station frequently notifying RL_Failure and therefore the load on a network is increased.

Incidentally, the generation of RL_Failure is impeded here by making at least one of N_OUTSYNC_IND, which is the upper limit of the number of generations of out-of-sync, and T_RLFAILURE, which is the timer's period threshold value serving as a trigger to notify RL_Failure, larger in the non-serving station. However, the following settings are also possible. Specifically, it may be designed that the timer is reset when, for example, even one In-sync is generated, by setting the number of generations of In-sync, serving as a trigger to reset the timer, at a lower value in the non-serving base station than a value in the serving base station.

Incidentally, although the base station controller changes the parameters N_OUTSYNC_IND and T_RLFAILURE and notifies them to the non-serving base station, the base station controller may only notify the non-serving base station that it is a non-serving station, and the base station may change the parameters in response to this notification on its own.

Note that in the present invention, it suffices that different conditions for notification of RL_Failure can be set in a serving base station and in a non-serving station. The present invention does not depend on the base technology of the above-described system.

10. Tenth Embodiment

Figure 28:
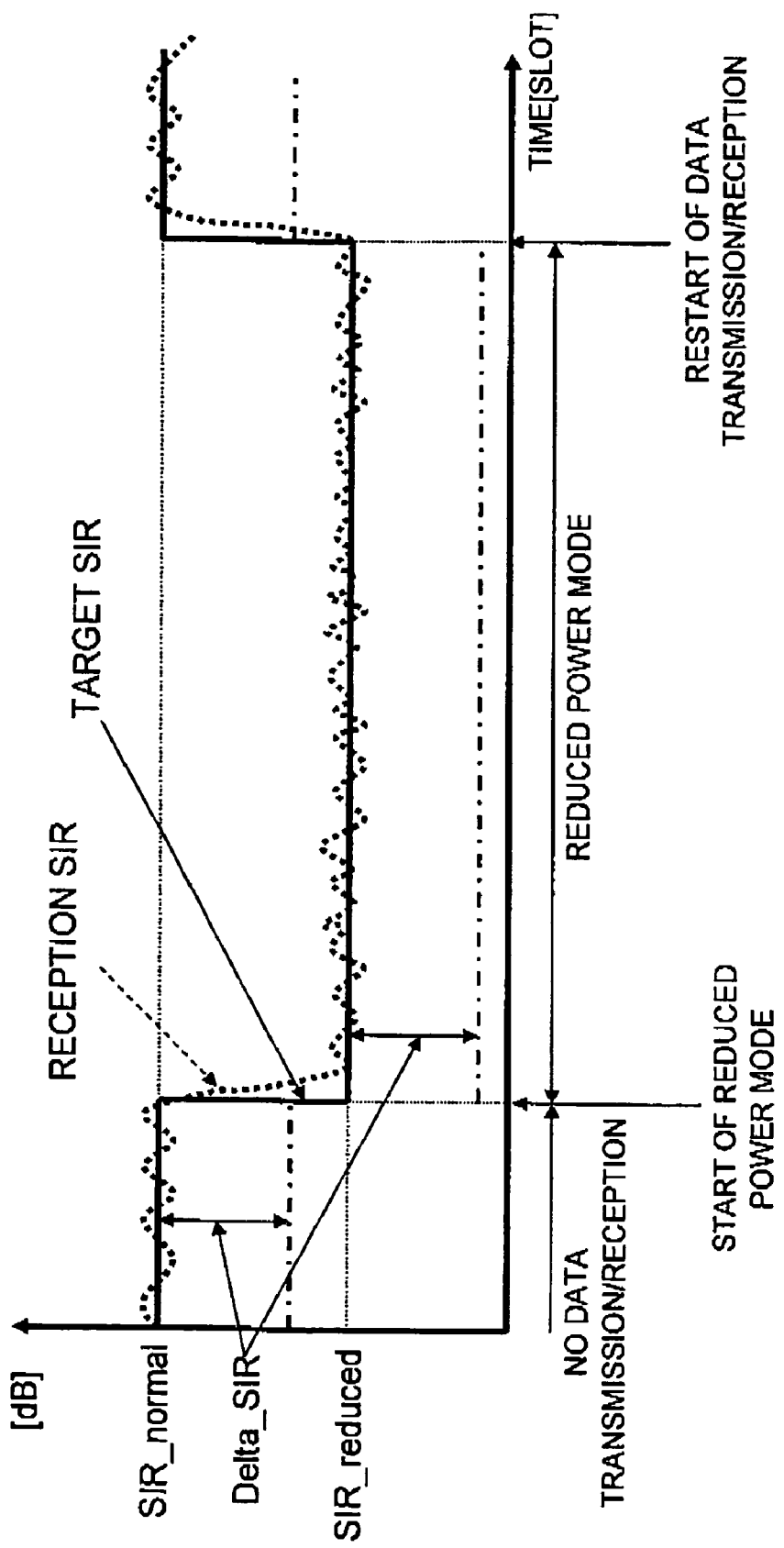
FIG. 28 is a time chart showing changes in a target SIR and a reception SIR over time, for describing the principle of transmission power control according to a tenth embodiment of the present invention.

FIG. 28 is a time chart showing changes in the target SIR and the reception SIR over time, for describing the principle of transmission power control according to a tenth embodiment of the present invention.

The configuration of a base station according to the present embodiment is basically the same as that of the base station according to the first embodiment shown in FIG. 5, but the following points are different. Specifically, when the target SIR setting section 106 determines that the target SIR is set at SIR-reduced according to the reduced power mode, the target SIR setting section 106 notifies the sync detection section 104 of this determination and a decrease amount to deduct from the target SIR, and the sync detection section 104 reduces the sync-securing quality threshold SIR_th by the same decrease amount in synchronization with the target SIR reduction.

More specifically, when the reduced power mode is determined and the sync detection section 104 receives a decrease amount to deduct from the target SIR, the sync detection section 104 reduces the sync-securing quality threshold SIR_th by the same amount as the decrease amount to deduct from the target SIR, as shown in FIG. 28. In other words, the sync-securing quality threshold is changed during the reduced power mode so that a difference Delta_SIR between the target SIR and the sync-securing quality threshold SIR_th in the normal mode is maintained. Alternatively, a desired difference may be set, without maintaining the difference Delta_SIR. As a result, it is possible to reduce the probability that the reception SIR at a serving base station becomes equal to or lower than SIR_th, and it is possible to reduce the probability that the serving base station in the reduced power mode generates Out-of-sync. When data transmission/reception is started again and the mode returns to the normal mode, the sync-securing quality threshold SIR_th attendantly also returns to a normal level. Thereby, it is possible to avoid an increase in the load on a network due to a disconnection of a dedicated channel during the reduced power mode and increased control signals.

Note that in the present embodiment, it suffices that the sync-securing quality threshold SIR_th, set in each base station on its own by the sync detection section, can be changed attendantly on a change in the target SIR. The present invention does not depend on the base technology of the above-described system.

The present invention can be applied not only to W-CDMA systems but also to general mobile communications systems carrying out transmission power control.

The invention claimed is:

1. A method for controlling transmission power of a wireless channel by using a first operation mode in which a target value of at least quality of the wireless channel is set to a first target value and a second operation mode in which the target value is set to a second target value, wherein the wireless channel is connected between a plurality of wireless communication devices including at least one movable communication device, the method comprising:

changing the first operation mode to the second operation mode; and when operating in the second operation mode, periodically increasing the second target value to a third target value at predetermined periods, wherein each of the predetermined periods comprises less than a period for detecting an out-of-synchronization,
wherein the second operation mode is a reduced power mode, and wherein the second target value is lower than the first target value.

2. The method according to claim 1, wherein the second target value is intermittently changed in the second operation mode.

3. The method according to claim 1, wherein the wireless channel is a control channel between the plurality of wireless communication devices.

4. A method of performing wireless data communication based on a wireless channel which is used to maintain at least synchronization between at least one base station and at least one mobile station, comprising:
controlling transmission power of the wireless channel by using a first operation mode in which a target value of at least quality of the wireless channel is set to a first target value and a second operation mode in which the target value is set to a second target value;
changing the first operation mode to the second operation mode; and
when operating in the second operation mode, periodically and increasing the second target value to a third target value at predetermined periods, wherein each of the predetermined periods comprises less than a period for detecting an out-of-synchronization,
wherein the second operation mode is a reduced power mode, and
wherein the second target value is lower than the first target value.

5. The method according to claim 4, wherein the third target value is equal to or greater than a synchronization-ensuring quality value set in the base station which the mobile station is using.

6. The method according to claim 4, wherein the second target value is intermittently increased to the third target value.

7. A device for controlling transmission power of a wireless channel by using a first operation mode in which a target value of at least quality of the wireless channel is set to a first target value and a second operation mode in which the target value is set to a second target value, wherein the wireless channel is connected between a plurality of wireless communication devices including at least one movable communication device, comprising:
a mode setting section for changing the first operation mode to the second operation mode; and
a target setting section for periodically increasing the second target value to a third target value at predetermined periods when operating in the second operation mode, wherein each of the predetermined periods comprises less than a period for detecting an out-of-synchronization,
wherein the second operation mode is a reduced power mode, and wherein the second target value is lower than the first target value.

8. A system of performing wireless data communications based on at least one wireless channel used to maintain at least synchronization between at least one base station and at least one mobile station, wherein each base station comprises:
a transmission power controller for controlling transmission power by using a first operation mode in which a target value of at least quality of the wireless channel is set to a first target value and a second operation mode in which the target value is set to a second target value;
a mode setting section for changing the first operation mode to the second operation mode; and
a target setting section for periodically increasing the second target value to a third target value at predetermined periods when operating in the second operation mode, wherein each of the predetermined periods comprises less than a period for detecting an out-of-synchronization, wherein the second operation mode is a reduced power mode, and wherein the second target value is lower than the first target value, and
each mobile station comprises:
a transmission power setting section for setting transmission power of the wireless channel according to transmission power control of the transmission power controller.

9. The system according to claim 8, further comprising: a base station controller for controlling said at least one base station, wherein the base station controller sets on the base station a condition for the target setting section to change the second target value.

10. A non-transitory computer readable medium including instructions that cause a computer to control transmission power of a wireless channel so that quality of the wireless channel becomes closer to a target value, wherein the wireless channel is connected between a plurality of wireless communication devices including at least one movable communication device, the computer performing a method comprising:
changing a first operation mode to a second operation mode, wherein the first operation mode is an operation mode in which a target value of at least quality of the wireless channel is set to a first target value and a second operation mode is an operation mode in which the target value is set to a second target value; and
when operating in the second operation mode, periodically increasing the second target value to a third target value at predetermined periods, wherein each of the predetermined periods comprises less than a period for detecting an out-of-synchronization,
wherein the second operation mode is a reduced power mode, wherein the second target value is lower than the first target value.

11. The non-transitory computer readable medium according to claim 10, wherein the second target value is intermittently changed in the second operation mode.

12. The non-transitory computer readable medium according to claim 10, wherein the method further comprises:
previously setting a possible range where the second target value can be changed in the second operation mode.

13. The non-transitory computer readable medium according to claim 10, wherein the method further comprises:
changing a possible range where the second target value can be changed in the second operation mode, depending on quality of another wireless channel connected between the plurality of wireless communication devices.

14. The non-transitory computer readable medium according to claim 10, wherein the method further comprises:
changing the second target value to a value higher than the second target value when another wireless channel is connected in the second operation mode.

* * * * *